(12) United States Patent
Taguchi et al.

(10) Patent No.: US 6,226,385 B1
(45) Date of Patent: May 1, 2001

(54) ENCRYPTION COMMUNICATION SYSTEM CAPABLE OF REDUCING NETWORK MANAGING WORKLOAD

(75) Inventors: Takuya Taguchi; Toru Inada; Yasuhisa Tokiniwa; Akira Watanabe; Tetsuo Ideguchi; Shigeaki Tanimoto; Hikoyuki Nakajima; Shin-Ichi Kato, all of Tokyo (JP)

(73) Assignees: Mitsubishi Denki Kabushiki Kaisha; Nippon Telegraph & Telephone Corp., both of Tokyo (JP)

( * ) Notice: Subject to any disclaimer, the term of this patent is extended or adjusted under 35 U.S.C. 154(b) by 0 days.

(21) Appl. No.: 09/081,046

(22) Filed: May 19, 1998

(30) Foreign Application Priority Data

Jun. 2, 1997 (JP) .................................................. 9-143755
Dec. 25, 1997 (JP) .................................................. 9-357491

(51) Int. Cl.[7] ........................................................ H04L 9/00
(52) U.S. Cl. ............................ 380/283; 713/162; 380/243
(58) Field of Search ................................. 380/255, 259, 380/277, 45, 243, 283; 713/166

(56) References Cited

U.S. PATENT DOCUMENTS

| | | | |
|---|---|---|---|
| 5,465,300 | 11/1995 | Altschuler et al. ................... 280/30 |
| 5,615,266 | 3/1997 | Altschuler et al. ................... 380/21 |
| 5,659,618 | * 8/1997 | Takahashi et al. ................... 380/49 |
| 5,790,677 | * 8/1998 | Fox et al. ............................. 380/24 |
| 5,835,597 | * 11/1998 | Coppersmith et al. ............... 380/28 |
| 5,995,624 | * 11/1999 | Fielder et al. ....................... 380/25 |

FOREIGN PATENT DOCUMENTS 2287160  9/1995  (GB) .............................. H04L/9/30

OTHER PUBLICATIONS

Patent Abstracts of Japan, Publication No. 06209313 A, published Jul. 26, 1994.

* cited by examiner

*Primary Examiner*—Thomas R. Peeso
*Assistant Examiner*—Todd Jack

(57) ABSTRACT

In an encryption communication system, an encrypt key ID of an encrypt apparatus appearing on a communication path between terminals is acquired by using a key seek packet, and an encrypt key ID is automatically learned based upon a key seek response packet for notifying the acquired encrypt key ID. As a result, communication data between the terminals are encrypted/decrypted, transparently relayed, and discarded by the respective encrypt apparatuses. Even when a communication network is made large and complex, the network for the encrypt communication can be readily managed.

9 Claims, 37 Drawing Sheets

| COMMUNICATION TERMINAL | PROCESSING METHOD | HOLDING TIME (SECOND) |
|---|---|---|
| A—B | ID 1 | 600 |
| A—C | DISCARD | 600 |

82

| COMMUNICATION TERMINAL | PROCESSING METHOD | HOLDING TIME (SECOND) |
|---|---|---|
| A—B | TRANSPARENT RELAY | 600 |
| B—C | ID 3 | 600 |

83

| COMMUNICATION TERMINAL | PROCESSING METHOD | HOLDING TIME (SECOND) |
|---|---|---|
| A—B | ID 1 | 600 |
| B—C | ID 2 | 600 |

84

| COMMUNICATION TERMINAL | PROCESSING METHOD | HOLDING TIME (SECOND) |
|---|---|---|
| A—C | DISCARD | 600 |
| B—C | ID 3 | 600 |

85

| COMMUNICATION TERMINAL | PROCESSING METHOD | HOLDING TIME (SECOND) |
|---|---|---|
| A—C | DISCARD | 600 |
| B—C | ID 2 | 600 |

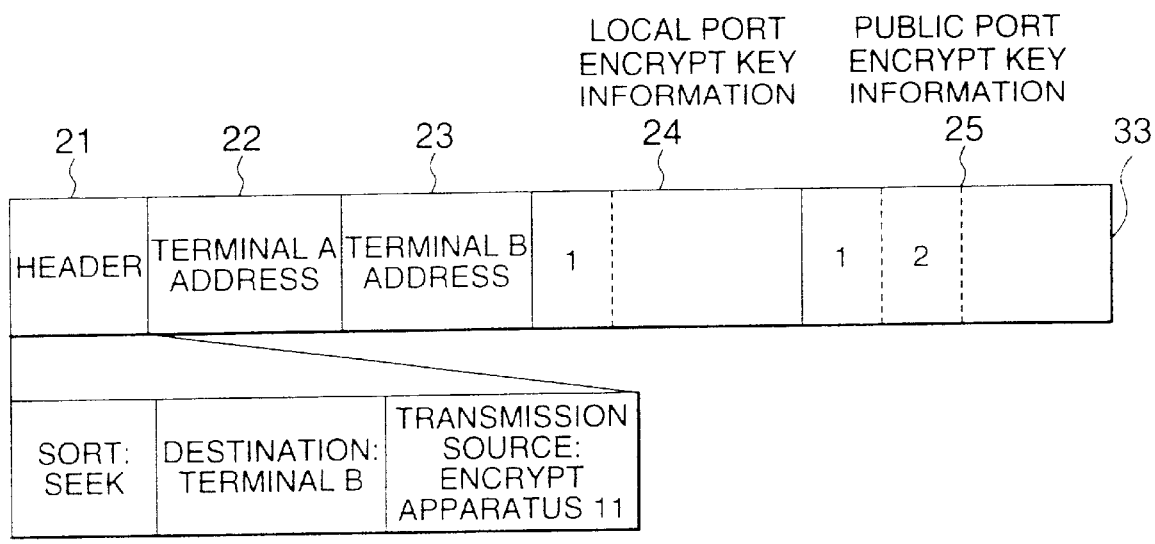
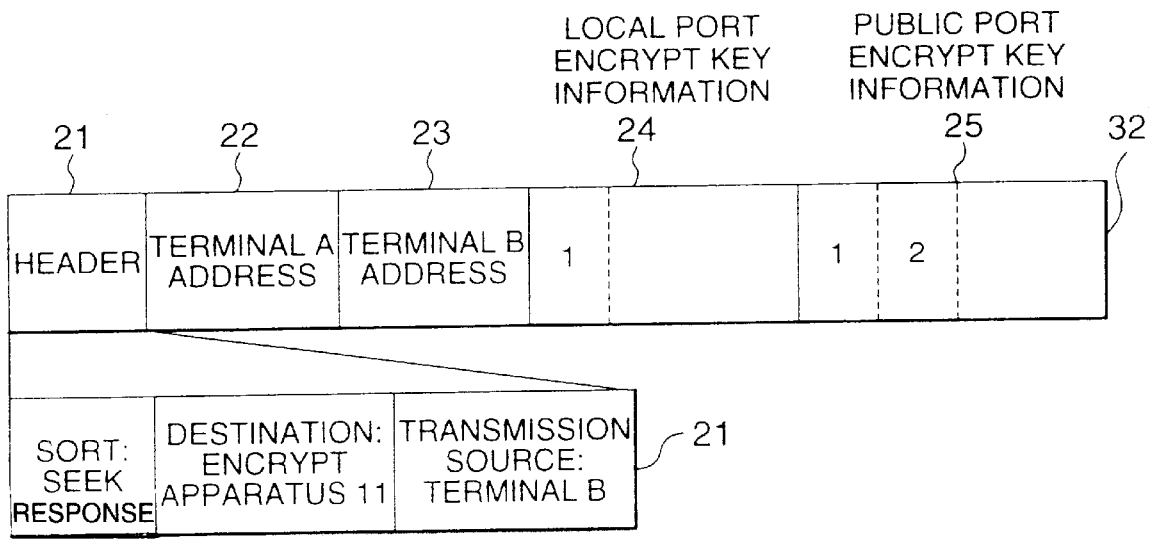

| COMMUNICATION TERMINAL | PROCESSING METHOD |
|---|---|
| A—B | ID 1 |
| A—C | DISCARD |

72

| COMMUNICATION TERMINAL | PROCESSING METHOD |
|---|---|
| A—B | TRANSPARENT RELAY |
| B—C | ID 3 |

73

| COMMUNICATION TERMINAL | PROCESSING METHOD |
|---|---|
| A—B | ID 1 |
| B—C | ID 2 |

74

| COMMUNICATION TERMINAL | PROCESSING METHOD |
|---|---|
| A—C | DISCARD |
| B—C | ID 3 |

75

| COMMUNICATION TERMINAL | PROCESSING METHOD |
|---|---|
| A—C | DISCARD |
| B—C | ID 2 |

ENCRYPTION COMMUNICATION SYSTEM CAPABLE OF REDUCING NETWORK MANAGING WORKLOAD

BACKGROUND OF THE INVENTION

1. Field of the Invention

The present invention relates to an encryption communication system in which the respective encrypt apparatuses for relaying communication data among communication terminals installed in a communication network perform encryption communications after learning own encrypt keys.

2. Description of the Related Art

Recently, in connection with popularization of computer networks, strong demands are increasingly made of encrypt techniques for communication data in order to keep secrecies of communication data used in computer networks. In general, a data encrypting /decrypting method is carried out in accordance with a table containing encrypt keys (will be referred to as an "encrypt key table" hereinafter), as described in, for example, Japanese Unexamined Patent Publication No. Hei 6-209313. This conventional encrypt technique is shown in FIG. 46, which employs the encrypt keys corresponding to one, or both of the destination addresses and the transmission source addresses of the communication data within the encrypt apparatus.

In FIG. 46, reference numeral 7 indicates the encrypt apparatus, reference numeral 2 denotes the encrypt/decrypt processing unit for encrypting/decrypting the communication data, reference numeral 3 represents the transparent relay processing unit for transparently relaying the communication data, and reference numeral 4 shows the discard processing unit for discarding the communication data. Also, reference numeral 6 is the transmission/reception processing unit for processing transmission/reception data, and reference numeral 8 shows the encrypt key table for indicating the processing method of the communication data. As shown in FIG. 48, the communication data processing methods are set as to each pair of the destination terminal and the transmission source terminal of the communication data.

As the communication data processing method, there are three different sorts of processing methods, i.e., encrypt/decrypt processing, transparent relay processing, and discard processing. In the case of the encrypt/decrypt processing method, the identifiers (will be referred to as "IDs" hereinafter) of the encrypt keys used in the encrypting/decrypting operations are set to the encrypt key table 8. In the case of the transparent relay processing method and the discard processing method, the respective processes are registered into the encrypt key table 8.

When the communication data is received by the encrypt apparatus 7, the transmission/reception processing unit 6 retrieves from the encrypt key table 8 the communication data processing method corresponding to the pair of the destination terminal and the transmission source terminal for the communication data. When the ID of the encrypt key is registered, the received communication data is notified to the encrypt/decrypt processing unit 2, and then the communication data is transmitted from such a transmission/reception processing unit 6 located opposite to the transmission/reception processing unit 6 which has received the communication data. In the case that the transparent relay processing method and the discard processing method are registered, the received communication data is notified to the transparent relay processing unit 3 and the discard processing unit 4. When the transparent relay processing method is registered, the communication data is transmitted from such a transmission/reception processing unit 6 located opposite to the transmission/reception processing unit 6 which has received the communication data. When the discard processing method is registered, the communication data is discarded.

One example of the encryption communication when the encrypt apparatus 7 is arranged as shown in FIG. 47 will now be described. It is now assumed that an encrypt apparatus 71 owns an encrypt key 1, an encrypt apparatus 72 owns an encrypt key 3, an encrypt apparatus 73 owns encrypt keys 1 and 2, an encrypt apparatus 74 owns the encrypt key 3, and an encrypt apparatus 75 owns the encrypt key 2. At a terminal A and a terminal B, communication data. is encrypted/decrypted by using the encrypt key 1 in the encrypt apparatuses 71, 73, and the communication is performed by transparently relaying the communication data between the terminals A and B in the encrypt apparatus 72 on the relay path. At the terminal B and a terminal C, the communication data is encrypted/decrypted by using the encrypt key 2 in the encrypt apparatuses 73, 75, and is further encrypted/decrypted by using the encrypt key 3 in the encrypt apparatuses 72, 74 to execute the communication. At the terminal A and the terminal C, since there are no encrypt keys made coincident with each other in the encrypt apparatuses 71, 74, 75 existing on the communication data path, the data communication cannot be executed.

To realize the above-described encryption communication, each of the encrypt apparatuses 7 employs such an encrypt key table 8 as shown in FIG. 48. Into the encrypt key table 8, the destination terminal addresses and the transmission source terminal addresses of the communication data, and also the respective processing methods adapted to the communication data are set. For instance, in the encrypt apparatus 71, when the communication data between the terminal A and the terminal B is received, the communication data is encrypted/decrypted by using the encrypt key 1, whereas when the communication data between the terminal A and the terminal C is received, this communication data is discarded. Also, in the encrypt apparatus 72, when the communication data between the terminal A and the terminal B is received, the communication data is transparently relayed, whereas when the communication data between the terminal B and the terminal C is received, this communication data is encrypted/decrypted by using the encrypt key 3. As previously explained, the encrypt key tables for describing the communication data processing methods are requested in the respective encrypt apparatuses 7.

In general, the above-described encrypt key tables are stored in the respective encrypt apparatuses, or stored in a management apparatus capable of managing in a batch mode the encrypt keys arranged on a network. In the latter case, when a data communication is commenced, an interrogation is issued from an encrypt apparatus to the management apparatus so as to acquire an encrypt key.

As represented in FIG. 48, since the encrypt key tables are different from each other with respect to each of these encrypt apparatuses, a network manager is required to form the suitable encrypt key tables for the respective encrypt apparatuses, taking account of a structure of a network. Also, when a scale of a network becomes large, a total number of communication terminals is increased, and the contents of the encrypt key tables become key complex. Therefore, there is a problem that these aspects cannot be managed by the network manager. Furthermore, the access control means for preventing the unauthorized access issued from the external network is required.

SUMMARY OF THE INVENTION

The present invention has been made to solve the above-explained problems caused by the large-scaled network and the complex network, and therefore, has an object to provide an encryption communication system capable of minimizing a workload of a network manager to realize an encryption communication and an unauthorized access preventing means even when such large-scaled and complex network are still constituted.

According to the present invention, there is provided an encryption communication system comprising: a transmission source terminal for transmitting communication data from an own terminal via a communication network to a destination terminal; a first encrypt apparatus including a first encrypt key table used to register thereinto encrypt key information for instructing a processing method of communication data in correspondence with a pair of the transmission source terminal and the destination terminal, a communication data buffer for temporarily storing the communication data, and a first automatic learn processing unit for storing the received communication data into the communication data buffer and for editing a key seek packet used to acquire encrypt key information to thereby transmit the edited key seek packet in such a case that encrypt key information for instructing the processing method of the communication data between the transmission source terminal and the destination terminal is not registered into the first encrypt key table; a second encrypt apparatus including a second automatic learn processing unit for additionally setting encrypt key information of an own apparatus to the received key seek packet to thereby transmit the additionally set key seek packet; and a destination terminal for editing a key seek response packet to be transmitted, the key seek response packet being used to notify the encrypt key information acquired based upon the received key seek packet, wherein the second encrypt apparatus includes a second encrypt key table used to register thereinto encrypt key information for designating a processing method of communication data in correspondence with a pair of a transmission source terminal and a destination terminal; and the second encrypt apparatus causes the second automatic learn processing unit to register into the second encrypt key table, such encrypt key information used to instruct any one of an encrypt/decrypt processing method, a transparent relay processing method, and a discard processing method as the processing method for the communication data between the transmission source terminal and the destination terminal based upon the encrypt key information of the received key seek response packet in such a case that the encrypt key information for instructing the processing method of the communication data between the transmission source terminal and the destination terminal is not registered into the second encrypt key table, and then transmits the key seek response packet; and the first encrypt apparatus causes the first automatic learn processing unit to register into the first encrypt key table, such encrypt key information used to instruct any one of the encrypt/decrypt processing method, the transparent relay processing method, and the discard processing method as the processing method for the communication data between the transmission source terminal and the destination terminal based upon the encrypt key information of the received key seek response packet, and also discards the key seek response packet.

According to the present invention, in the above-described encryption communication system, in such a case that the encrypt key information for instructing the processing method of the communication data between the transmission source terminal and the destination terminal is not registered into the second encrypt key table, the second encrypt apparatus causes the second automatic learn processing unit to register into the second encrypt key table, such encrypt key information used to instruct the encrypt/decrypt processing method, as the processing method for the communication data between the transmission source terminal and the destination terminal when the key seek response packet received from the destination terminal contains the same encrypt key information as the encrypt key information of the own apparatus, and then transmits the key seek response packet; and in such a case that the key seek response packet received from the second encrypt apparatus contains the same encrypt key information as the encrypt key information of the own apparatus, the first encrypt apparatus causes the first automatic learn processing unit to register into the first encrypt key table, such encrypt key information used to instruct the encrypt/decrypt processing method as the processing method for the communication data between the transmission source terminal and the destination terminal, and then discards the key seek response packet.

According to the present invention, in the encryption communication system, each of the first and second encrypt apparatuses includes a local port and a public port; each of the key seek packet and the key seek response packet contains local port encrypt key information and public port encrypt key information; in such a case that the key seek packet is received from the local port, the first or second encrypt apparatus causes either the first automatic learn processing unit or the second automatic learn processing unit to set an encrypt key owned by the own apparatus into the local port encrypt key information of the key seek packet to the destination terminal, and in such a case that the key seek packet is received from the public port, the first or second encrypt apparatus causes either the first automatic learn processing unit or the second automatic learn processing unit to relay such a key seek packet in which the encrypt key owned by the own apparatus is set into the public port encrypt key information of the key seek packet to the destination terminal; in the case that the key seek response packet is received from the public port, if the same encrypt key as the encrypt key owned by the own apparatus is contained in the public port encrypt key information, and in the case that the key seek response packet is received from the local port, if the same encrypt key as the encrypt key owned by the own apparatus is contained in the local port encrypt key information, then the first or second encrypt apparatus causes the first or second automatic learn processing unit to register into the first or second encrypt key table, such encrypt key information for instructing the encryption, or decryption with employment of the same encrypt key; in the case that the key seek response packet is received from the public port, if the same encrypt key as the encrypt key owned by the own apparatus is not contained in the public port encrypt key information, and in the case that the key seek response packet is received from the local port, if the same encrypt key as the encrypt key owned by the own apparatus is not contained in the local port encrypt key information, then the first or second encrypt apparatus causes the first or second automatic learn processing unit to register into the first or second encrypt key table, such encrypt key information for instructing a transparent relay process operation when the same encrypt key is contained in the public port encrypt key information among encrypt keys contained in the local port encrypt key information; and further in the case that the key seek response packet is received from the public port, if the same encrypt key as the encrypt key owned by the own apparatus is not contained in the public port encrypt key information, and in the case that the key seek response packet is received from the local port, if the same encrypt key as the encrypt key owned by the own apparatus is not contained in the local port encrypt key information, then the first or second encrypt apparatus caused the first or second automatic learn processing unit to register into the first or second encrypt key table, such encrypt key information for instructing a discard process operation when the same encrypt key is contained in the public port encrypt key information among encrypt keys contained in the local port encrypt key information.

According to the present invention, in the above-described encryption communication system, in such a case that the key seek response packet is received from the public port, the first or second encrypt apparatus causes the first or second automatic learn processing units to register into the first or second encrypt key table, such encrypt key information for instructing a transparent relay process operation when no encrypt key is contained in the public port encrypt key information.

According to the present invention, in the above-described encryption communication system, the first and second encrypt key tables contain holding time used to hold the encrypt key information for instructing the processing methods of the communication data registered with respect to each of the pairs; and unless the encrypt key information registered in the first or second encrypt key table is accessed by the first or second automatic learn processing unit for a time period longer than the holding time, the first and second encrypt apparatuses delete this encrypt key information from the first or second encrypt key table.

According to the present invention, in the above-described encryption communication, each of the first and second encrypt apparatuses includes an external terminal communication mode setting unit for designating either the transparent relay process operation, or the discard process operation; when the key seek response packet is received from the public port, if the public port encrypt key information does not contain the same encrypt key owned by the own apparatus and the own apparatus is not within an encrypt section, then the first and second encrypt apparatuses cause the first or second automatic learn processing unit to register into the first or second encrypt key table, such encrypt key information for instructing the transparent relay process operation, or the discard process operation based upon a content set in the external terminal communication mode setting unit; and when the key seek response packet is received from the local port, if the local port encrypt key information does not contain the same encrypt key owned by the own apparatus and the own apparatus is not within the encrypt section, then the first and second encrypt apparatuses cause the first or second automatic learn processing unit to register into the first or second encrypt key -table, such encrypt key information for instructing the transparent relay process operation, or the discard process operation based upon a content set in the external terminal communication mode setting unit.

According to the present invention, in the above-described encryption communication system, each of the first and second encrypt apparatuses includes an external terminal communication mode setting unit for designating the transparent relay process operation, the semi-transparent relay process operation, or the discard process operation; when the key seek response packet is received from the public port, if the public port encrypt key information does not contain the same encrypt key owned by the own apparatus and the own apparatus is not within an encrypt section, then the first and second encrypt apparatuses cause the first or second automatic learn processing unit to register into the first or second encrypt key table, such encrypt key information for instructing the transparent relay process operation in such a case that a content set in the external terminal communication mode setting unit is equal to the semi-transparent relay process operation; and when the key seek response packet is received from the local port, if the local port encrypt key information does not contain the same encrypt key owned by the own apparatus and the own apparatus is not within an encrypt section, then the first and second encrypt apparatuses cause the first or second automatic learn processing unit to register into the first or second encrypt key table, such encrypt key information for instructing the discard process operation in such a case that a content set in the external terminal communication mode setting unit is equal to the semi-transparent relay process operation.

According to the present invention, there is provided an encryption communication system comprising; a transmission source terminal for transmitting communication data from an own terminal via a communication network to a destination terminal; an encrypt apparatus including an encrypt key table used to register thereinto encrypt key information for instructing a processing method of communication data in correspondence with a pair of the transmission source terminal and the destination terminal, a communication data buffer for temporarily storing the communication data, and an automatic learn processing unit for storing the received communication data into the communication data buffer and for editing a key seek packet used to acquire encrypt key information to thereby transmit the edited key seek packet in such a case that encrypt key information for instructing the processing method of the communication data between the transmission source terminal and the destination terminal is not registered into the encrypt key table; and a destination terminal for editing a key seek response packet to be transmitted, the key seek response packet being used to notify the encrypt key information acquired based upon the received key seek packet, wherein: the encrypt apparatus causes the automatic learn processing unit to register into the encrypt key table, such encrypt key information used to instruct any one of a transparent relay processing method and a discard processing method as the processing method for the communication data between the transmission source terminal and the destination terminal based upon the encrypt key information of the received key seek response packet, and then discards the key seek response packet.

According to the present invention, in the above-described encryption communication system, the encrypt apparatus includes a local port and a public port; each of the key seek packet and the key seek response packet contains local port encrypt key information and public port encrypt key information; in such a case that the communication data is received from the local port, the encrypt apparatus causes the automatic learn processing unit to set an encrypt key owned by the own apparatus into the local port encrypt key information of the key seek packet; and in such a case that the communication data is received from the public port, the encrypt apparatus causes the automatic learn processing unit to relay such a key seek packet in which the encrypt key owned by. the own apparatus is set into the public port encrypt key information of the key seek packet to the destination terminal; and in the case that the key seek response packet is received from the public port, if the encrypt key is not contained in the public port encrypt key information, then the encrypt apparatus causes the automatic learn processing unit to register into the encrypt key table, such encrypt key information for instructing a transparent relay process operation.

According to the present invention, in the above-described encryption communication system, the encrypt apparatus includes an external terminal communication mode setting unit for designating either the transparent relay process operation, or the discard process operation; when the key seek response packet is received from the public port, if the public port encrypt key information does not contain the same encrypt key owned by the own apparatus and the own apparatus is not within an encrypt section, then the encrypt apparatus causes the automatic learn processing unit to register into the encrypt key table, such encrypt key information for instructing the transparent relay process operation, or the discard process operation based upon a content set in the external terminal communication mode setting unit; and when the key seek response packet is received from the local port, if the local port encrypt key information does not contain the same encrypt key owned by the own apparatus and the own apparatus is not within the encrypt section, then the encrypt apparatus causes the automatic learn processing unit to register into the encrypt key table, such encrypt key information for instructing the transparent relay process operation, or the discard process operation based upon a content set in the external terminal communication mode setting unit.

According to the present invention, in the above-described encryption communication system, the encrypt apparatus includes an external terminal communication mode setting unit for designating the transparent relay process operation, the semi-transparent relay process operation, or the discard process operation; when the key seek response packet is received from the public port, if the public port encrypt key information does not contain the same encrypt key owned by the own apparatus and the own apparatus is not within an encrypt section, then the encrypt apparatus causes the automatic learn processing unit to register into the encrypt key table, such encrypt key information for instructing the transparent relay process operation in such a case that a content set in the external terminal communication mode setting unit is equal to the semi-transparent relay process operation; and when the key seek response packet is received from the local port, if the local port encrypt key information does not contain the same encrypt key owned by the own apparatus and the own apparatus is not within an encrypt section, then the encrypt apparatus causes the automatic learn processing unit to register into the encrypt key table, such encrypt key information for instructing the discard process operation in such a case that a content set in the external terminal communication mode setting unit is equal to the semi-transparent relay process operation.

According to the present invention, there is provided an encryption communication system comprising: a transmission source terminal for transmitting communication data from an own terminal via a communication network to a destination terminal; a first encrypt apparatus including a first encrypt key table used to register thereinto encrypt key information for instructing a processing method of communication data in correspondence with a pair of the transmission source terminal and the destination terminal, and for processing the received communication data in accordance with a content of the first encrypt key table to transmit the processed communication data; a second encrypt apparatus including a second encrypt key table used to register thereinto encrypt key information for instructing a processing method of communication data in correspondence with a pair of the transmission source terminal and the destination terminal, a communication data buffer for temporarily storing the communication data, and a second automatic learn processing unit for storing the received communication data into the communication data buffer and for editing a key seek request packet used to acquire an encrypt key apparatus for sending a key seek packet to thereby transmit the edited key seek request packet in such a case that encrypt key information for instructing the processing method of the communication data between the transmission source terminal and the destination terminal is not registered into the second encrypt key table; a third encrypt apparatus including a third encrypt key table used to register thereinto encrypt key information for designating a processing method of communication data in correspondence with a pair of a transmission source terminal and a destination terminal; and a third automatic learn processing unit for additionally setting encrypt key information of an own apparatus to the received key seek packet to thereby transmit the set key seek packet, and also for registering into the third encrypt key table, such encrypt key information used to instruct any one of an encrypt/decrypt processing method, a transparent relay processing method, and a discard processing method as the processing method for the communication data between the transmission source terminal and the destination terminal based upon the encrypt key information of the received key seek response packet to thereby transmit the key seek response packet; a fourth encrypt apparatus including a fourth encrypt key table used to register thereinto encrypt key information for designating a processing method of communication data in correspondence with a pair of a transmission source terminal and a destination terminal; and a fourth automatic learn processing unit for additionally setting encrypt key information of an own apparatus to the received key seek packet to thereby transmit the set key seek packet, and also for registering into the fourth encrypt key table, such encrypt key information used to. instruct any one of an encrypt/decrypt processing method, a transparent relay processing method, and a discard processing method as the processing method for the communication data between the transmission source terminal and the destination terminal based upon the encrypt key information of the received key seek response packet to thereby transmit the key seek response packet; and a destination terminal for editing a key seek response packet to be transmitted, the key seek response packet being used to notify the encrypt key information acquired based upon the received key seek packet, wherein: the first encrypt apparatus relays the received key seek request packet, and edits a key seek packet for acquiring encrypt key information to transmit the edited key seek packet and also discards the key seek request response packet when a key seek request response packet is received; and the first encrypt apparatus includes a first automatic learn processing unit for registering into the first encrypt key table, such encrypt key information used to instruct any one of an encrypt/decrypt processing method, a transparent relay processing method, and a discard processing method as the processing method for the communication data between the transmission source terminal and the destination terminal based upon the encrypt key information of the received key seek response packet; the transmission source terminal edits the key seek request response packet based on the received key seek request packet to thereby transmit the edited key seek request response packet; and the second encrypt apparatus additionally sets encrypt key information of an own apparatus to the received key seek packet to thereby transmit the set encrypt key information, and also the second encrypt apparatus causes the second automatic learn processing unit to register into the second encrypt key table, such encrypt key information used to instruct any one of the encrypt/decrypt processing method, the transparent relay processing method, and the discard processing method as the processing method for the communication data between the transmission source terminal and the destination terminal based upon the encrypt key information of the received key seek response packet.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will

BRIEF DESCRIPTION OF THE DRAWINGS

For a better understanding of the present invention, reference is made of a detailed description to be read in conjunction with the accompanying drawings, in which:

FIG. 22 schematically indicates a diagram in which a timer is additionally provided with an encrypt key table of each of encrypt apparatuses according to a seventh embodiment of the present invention;

FIG. 33 schematically shows a frame of a key seek packet 33 indicated in FIG. 30;

FIG. 34 schematically shows a frame of a key seek response packet 35 shown in FIG. 30;

FIG. 48 schematically shows the encrypt key tables of the conventional respective encrypt apparatuses.

DESCRIPTION OF THE PREFERRED EMBODIMENTS

Embodiment 1

An encryption communication system, according to an embodiment 1 of the present invention, is featured by that when an encrypt key of a communication counter party is unknown, encrypt key information of an encrypt apparatus on a relay path between terminals is acquired prior to a commencement of a communication; encrypt key information is automatically learned based upon the acquired key information; and a communication is carried out by employing the learned encrypt key.

Figure 1:
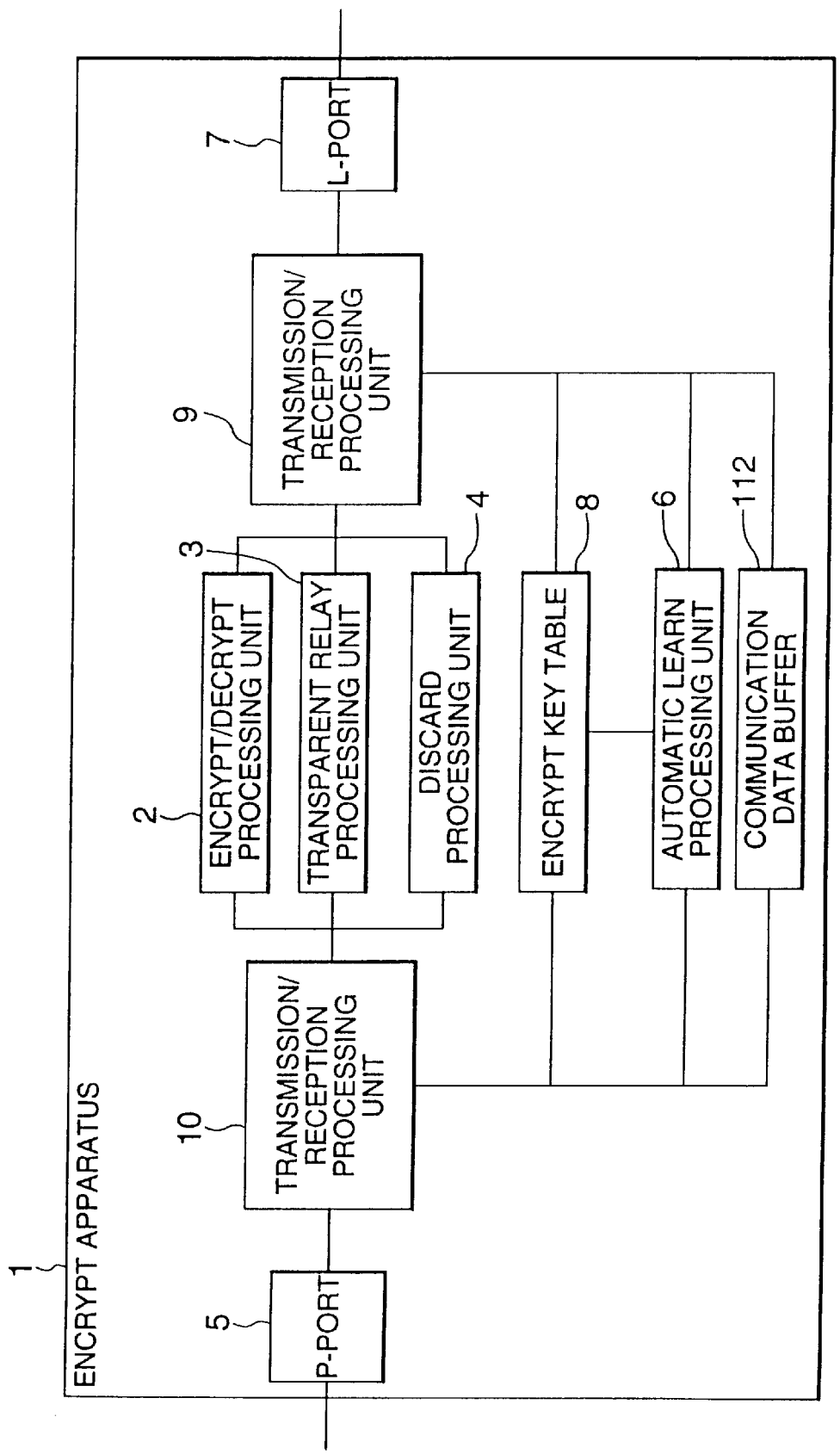
FIG. 1 is a schematic block diagram for representing an arrangement of an encrypt apparatus according to a first embodiment of the present invention.

Referring now to FIG. 1, an example of an encrypt apparatus which constitutes the encryption communication system according to this embodiment will be described. In this drawing, reference numeral 1 shows an encrypt apparatus having a learning function, reference numeral 2 represents an encrypt/decrypt processing unit for encrypting/decrypting communication data; reference numeral 3 denotes a transparent relay processing unit for transparently relaying the communication data; and reference numeral 4 is a discard processing unit for discarding the communication data. Also, reference numeral 8 indicates an encrypt key table for indicating a method of processing the communication data. As indicated in FIG. 22, the communication data processing methods are registered in this encrypt key table with respect to a pair of a destination terminal and a transmission source terminal of communication table.

As the communication data processing methods, there are three sorts of processing methods, namely an encrypt/decrypt processing method, a transparent relay processing method, and a discard processing method. In the case of the encrypt/decrypt processing method, an ID of an encrypt key used in encrypt/decrypt process operations is set to the encrypt key table 8. In the case of the transparent relay processing method and the discard processing method, the respective processing methods are registered into the encrypt key table 8.

Reference numeral 6 shows an automatic learn processing unit of the encrypt key table 8. An automatic learn processing operation is initiated in such a case that a processing method is not registered into the encrypt key table 8 in correspondence with a transmission source terminal and a destination terminal of received communication data. Reference numeral 5 shows a public port, and reference numeral 7 denotes a local port. These ports are used to discriminate as to whether the encrypt apparatus encrypts communication data, or decrypts communication data. When an instruction is made of the encrypt/decrypt processing operation, the encrypt apparatus decrypts the communication data received from the public port 5 and transmits the decrypted communication data to the local port 7. Also, the encrypt apparatus encrypts communication data received from the local port 7 and transmits the encrypted communication data to the public port 5. Reference numerals 9 and 10 denote transmission/reception processing units for executing a reception process of communication data and a transmission process of communication data. Reference numeral 112 shows a communication data buffer for temporarily storing communication data.

Next, operations of the encrypt apparatus 1 will now be described. For example, in the case that the encrypt apparatus 1 receives communication data from the local port 7, the transmission/reception processing unit 9 provided on the side of the local port 7 retrieves as to whether or not a processing method corresponding to a destination terminal address and a transmission source terminal address of the communication data is registered into the encrypt key table 8. When this processing method is registered, the transmission/reception processing unit 9 causes any one of the encrypt/decrypt processing unit 2, the transparent relay processing unit 3, and the discard processing unit 4 to continue the processing operation in accordance with this registered processing method. That is, when an ID of an encrypt key is registered as the processing method, the received communication data is supplied to the encrypt/decrypt processing unit 2. When the transparent relay process is registered as the processing method in the encrypt key table 8, the transmission/reception processing unit 9 supplies the received communication data to the transparent relay processing unit 3. When the discard/process is registered as the processing method in the encrypt key table 8, the transmission/reception processing unit 9 supplies the received communication data to the discard processing unit 4. When the encrypt/decrypt processing unit 2 receives the communication data, this encrypt/decrypt processing unit 2 encrypts the communication data in response to an encrypt key ID, and then supplies the encrypted communication data to another transmission/reception processing unit 10 provided on the side of the public port 5.

When the transparent relay processing unit 3 receives communication data, this communication data is supplied to the transmission/reception processing unit 10 on the side of the public port 5. When the discard processing unit 4 receives communication data, this communication data is discarded. The transmission/reception processing unit 10 which has received the communication data supplies this communication data to the public port 5, and then this public port 5 transmits the communication data.

Similar to the above-described operation, in the case that the encrypt apparatus 1 receives communication data from the public port 5, the transmission/reception processing unit 10 provided on the side of the public port 5 retrieves as to whether or not a processing method corresponding to a destination terminal address and a transmission source terminal address of the communication data is registered into the encrypt key table 8. When this processing method is registered, the transmission/reception processing unit 10 causes any one of the encrypt/decrypt processing unit 2, the transparent relay processing unit 3, and the discard processing unit 4 to continue the processing operation in accordance with this registered processing method. When the encrypt/decrypt processing unit 2 receives the communication data, this encrypt/decrypt processing unit 2 decrypts the communication data in accordance with the encrypt key ID, and then supplies the decrypted communication data to the transmission/reception processing unit 9 provided on the side of the local port 7.

When the transparent relay processing unit 3 receives communication data, this communication data is supplied to the transmission/reception processing unit 9 on the side of the local port 7. When the discard processing unit 4 receives communication data, this communication data is discarded. The transmission/reception processing unit 9 which has received the communication data supplies this communication data to the local port 7, and then this local port 7 transmits the communication data. Also, in the above example, if no processing method is registered into the encrypt key table 8, then this fact is notified to the automatic learn processing unit 6, and then this automatic learn processing unit 6 learns an encrypt key in conjunction with another encrypt apparatus.

Figure 2:
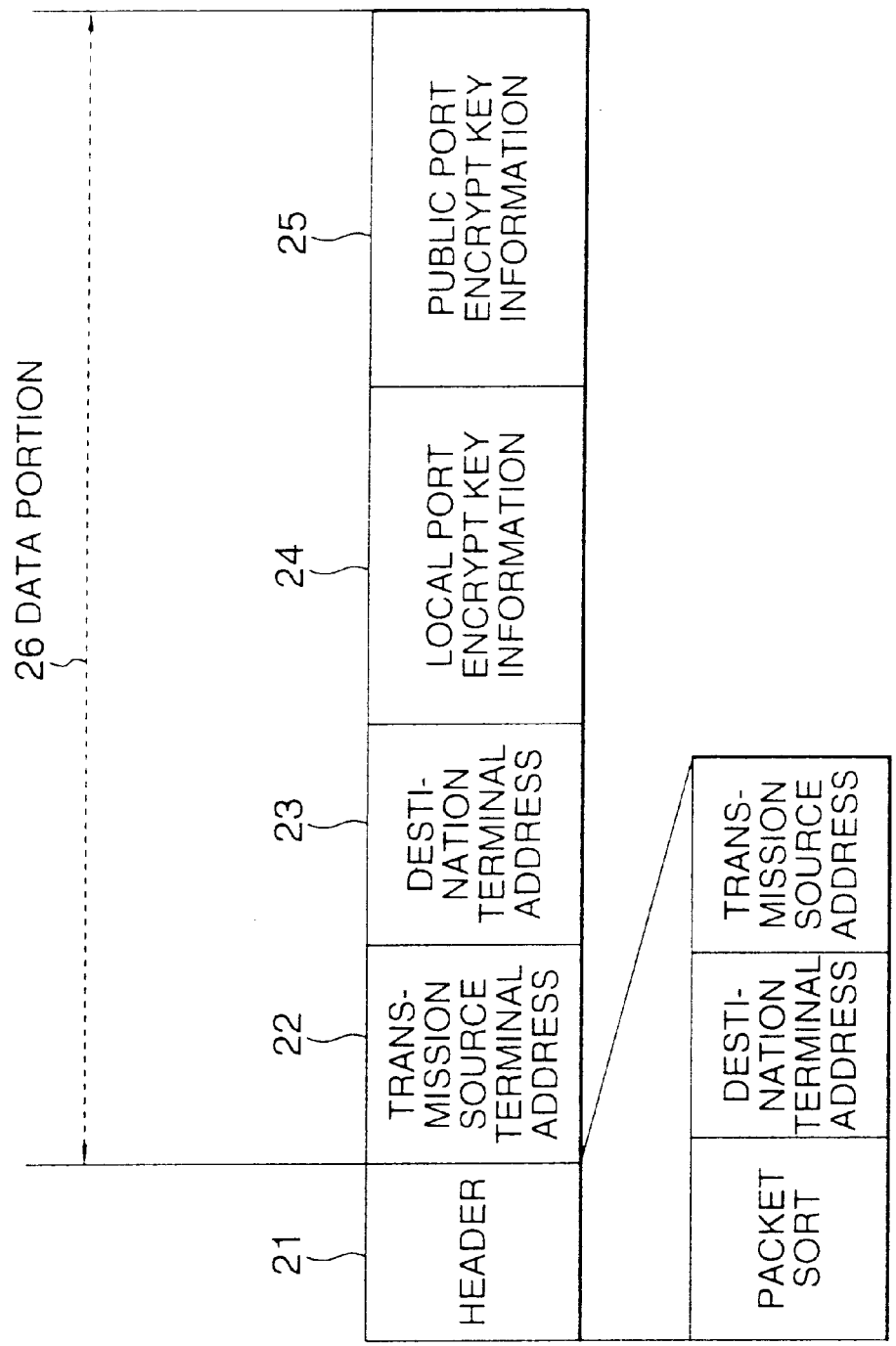
FIG. 2 illustratively indicates a frame structure of a key seek packet and a key seek response packet according to the present invention.

A description will now be made of an encryption communication system equipped with an encrypt key learn function with employment of the above-described encrypt apparatus, according to the present invention. FIG. 2 schematically represents a format of a key seek packet and a format of a key seek packet response packet. In FIG. 2, reference numeral 21 shows a header which contains a sort of a packet, a destination address of the key seek packet, a transmission source address of the key seek packet, and so on. Reference numeral 22 is an address of a transmission source terminal of the communication data received by the encrypt apparatus 1. Reference numeral 23 denotes an address of a destination terminal of the communication data received by the encrypt apparatus 1. Reference numeral 24 is local port encrypt key information, by which the encrypt apparatus 1 which receives the key seek packet from the local port 7 sets the ID of the own encrypt key. Reference numeral 25 shows public port encrypt key information, by which the encrypt apparatus 1 which receives the key seek packet from the public port 5 sets the ID of the own encrypt key. Reference numeral 26 indicates a data portion of the key seek packet and the key seek response packet, which is constituted by the transmission source terminal address 22, the destination terminal address 23, the local port encrypt key information 24, and the public port encrypt key information 25.

Figure 3:
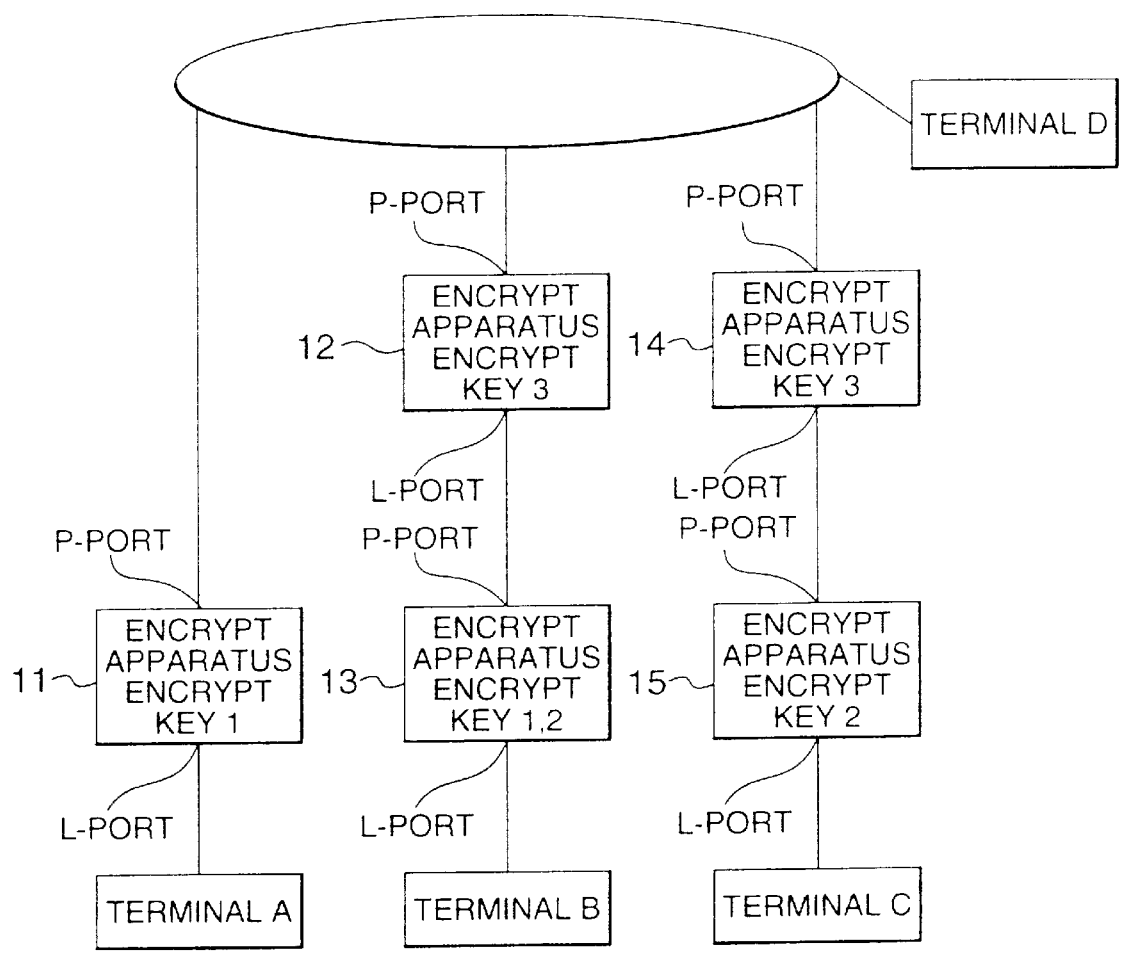
FIG. 3 schematically indicates a network structure according to the present invention.

FIG. 3 schematically shows a structural example of a network for storing terminals A, B, C and D. An encrypt apparatus 11 owns an ID of "1", and another encrypt apparatus 12 owns an ID of "3", and another encrypt apparatus 13 owns an ID of "1" and an ID of "2". An encrypt apparatus 14 owns an ID of "3", and another encrypt apparatus 15 owns an ID of "2". When an encrypt code is decrypted, the encrypt apparatus uses the encrypt keys corresponding to the respective IDs. In other words, the encrypt keys to be allocated to the respective encrypt apparatuses have been previously delivered to these encrypt apparatus to be registered. Each of the encrypt apparatuses saves one, or plural IDs of the own encrypt keys. At an initial stage, it is assumed that no key information is registered into the encrypt key table 8 contained in the respective encrypt apparatuses.

It should also be noted that an "L" port shown in this drawing indicates the local port 7 and a "P" port denotes the public port 5. Both the public port 5 of the encrypt apparatus 12 and the public port 5 of the encrypt apparatus 14 are connected to the public port 5 of the encrypt apparatus 11 shown in FIG. 3. In other encrypt apparatuses, the public port 5 is connected to the local port 7.

Figure 4:
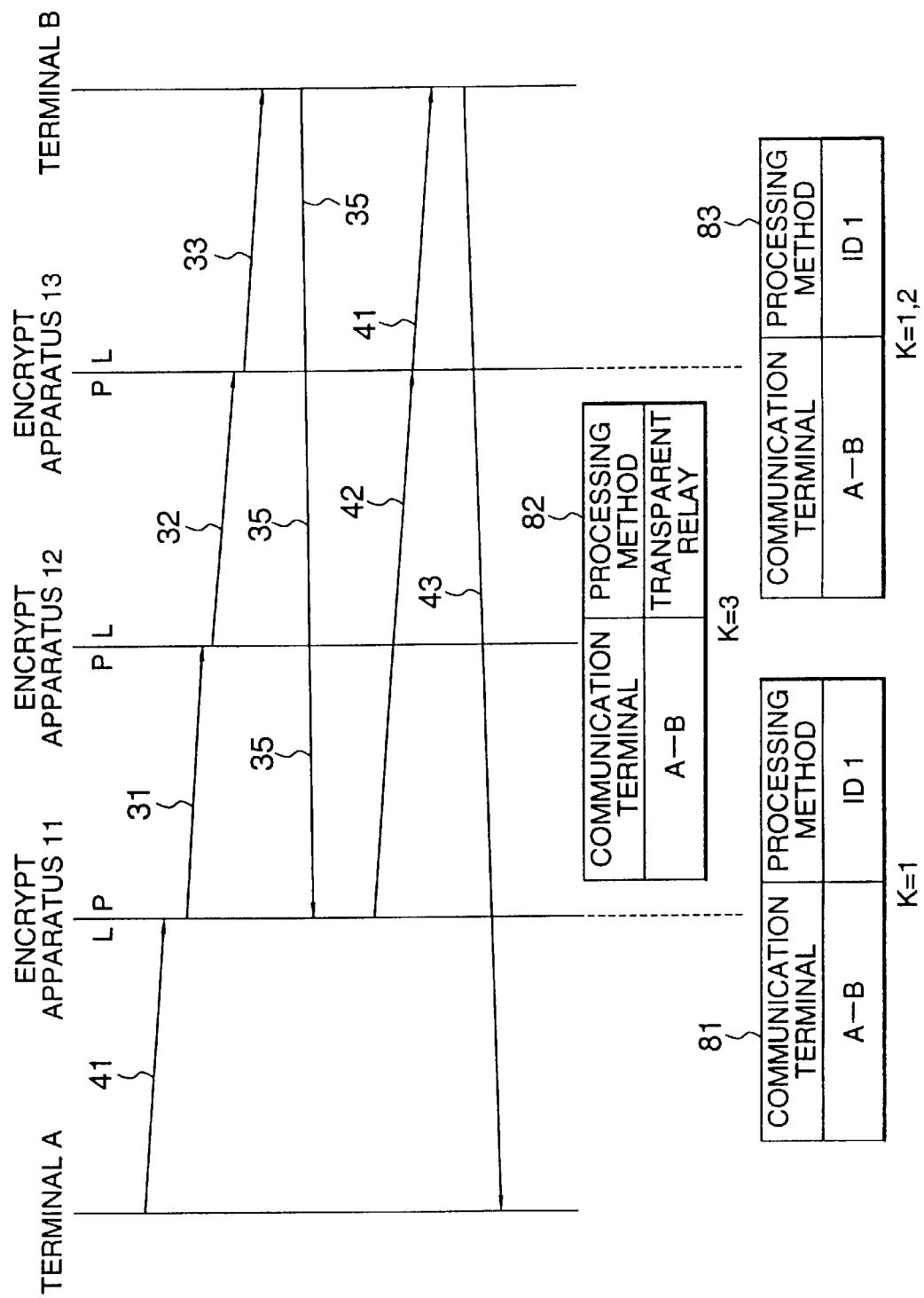
FIG. 4 is a sequence diagram for representing an encryption communication established among terminals in the network structure according to the first embodiment of the present invention.

Next, FIG. 4 shows a sequence diagram for explaining a key seek packet used to learn the encrypt key table 8 in such a case that when the data is communicated from the terminal "A" to the terminal "B" shown in FIG. 3, no processing method is registered into the encrypt key table 8 in correspondence with a pair of a transmission source terminal and a destination terminal of the communication data received from the terminal A. In this drawing, reference numeral 31 shows a key seek packet transmitted from the encrypt apparatus 11, reference numeral 32 indicates a key seek packet made by adding the ID of the encrypt key of the encrypt apparatus 12 to the key seek packet 31 by the encrypt apparatus 12, and reference numeral 33 denotes a key seek packet made by adding the ID of the encrypt key of the encrypt apparatus 13 to the key seek packet 32 by the encrypt apparatus 13. Also, reference numeral 35 indicates a key seek response packet received from the terminal B, and corresponds to a packet used to notify the ID of the encrypt key acquired by the key seek packet 33 to the respective encrypt apparatuses 1.

Reference numeral 41 shows communication data sent from the terminal A, and this communication data contains the header 21, the transmission source terminal address, the destination terminal address, and data. Reference numeral 42 is communication data made by encrypting the data portion of the communication data 41. Reference numeral 83 shows an encrypt key table of the encrypt apparatus 13, which indicates that the processing method is the encrypt/decrypt processing method between the communication terminal A and the communication terminal B, and the ID of the encrypt key is 1. Reference numeral 82 indicates an encrypt key table of the encrypt apparatus 12, which indicates that the processing method is the transparent relay processing method between the communication terminal A and the terminal B. Reference numeral 81 represents an encrypt key table of the encrypt apparatus 11, which represents that the processing method is the encrypt/decrypt processing method between the communication terminal A and the terminal B, and the ID of the encrypt key is equal to 1.

Figure 5:
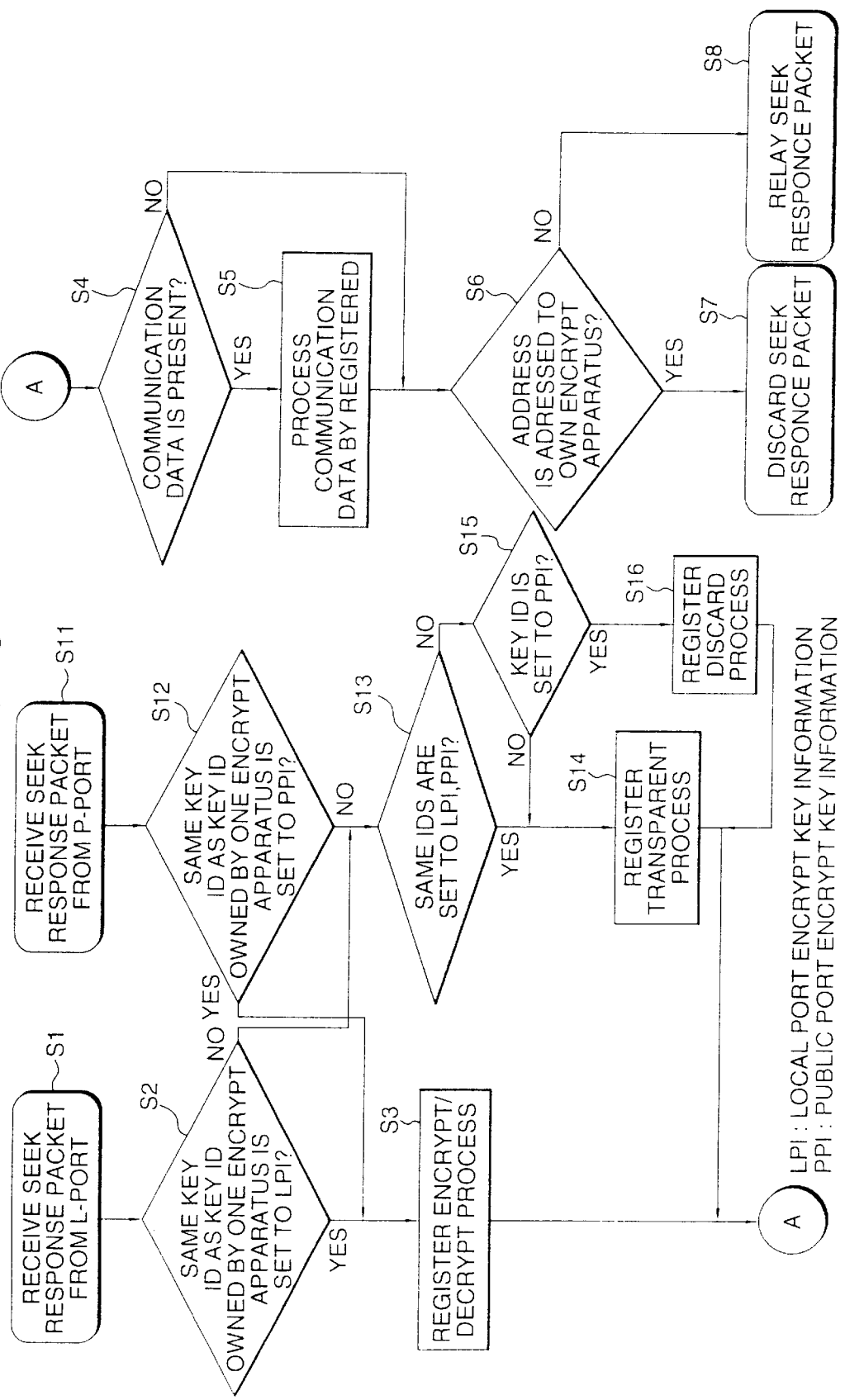
FIG. 5 schematically shows a process flow operation for the key seek response packet according to the present invention.

FIG. 5 shows a process flow chart in the case that the encrypt apparatus receives the key seek response packet. It is now assumed that no processing method is registered into the encrypt key tables 81 to 83.

Next, operations will now be explained. First, as indicated in FIG. 4, the communication data 41 is transmitted from the terminal A to the terminal B. The encrypt apparatus 11 which receives the communication data 41 from the local port 7 retrieves the internally provided encrypt key table 81. Since the processing method of the communication between the terminal A and the terminal B is not registered, this encrypt apparatus 11 edits the key seek packet 31 to transmit the edited key seek packet 31 to the public port 5, and also stores the received communication data 41 into the communication data buffer 112.

Figure 6:
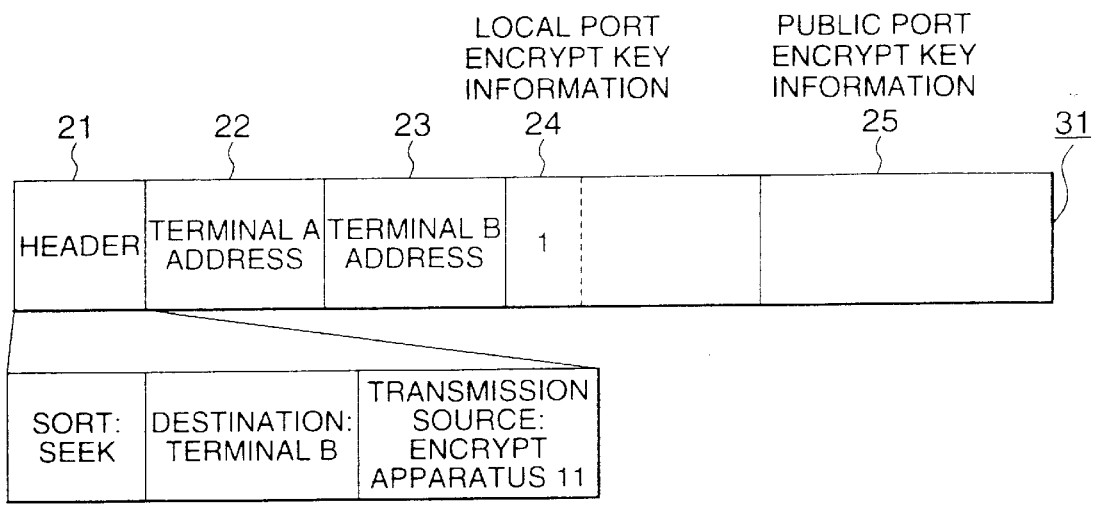
FIG. 6 schematically represents a frame of a key seek packet according to the first embodiment of the present invention.

It should be understood that the encrypt apparatus 11 edits the key seek packet 31 as indicated in FIG. 6. In other words, based upon the received communication data 41, the address of the terminal A is set to the transmission source terminal address 22, the address of the terminal B is set to the destination terminal address 23, "1" corresponding to the ID of the own encrypt key is set to the local port encrypt key information 24, and nothing is set to the public port encrypt key information 25. Also, in the header, the key seek packet is set to the packet sort, the address of the encrypt apparatus 11 is set to the transmission source address of the key seek packet, and the address of the terminal B is set to the destination address.

Figure 7:
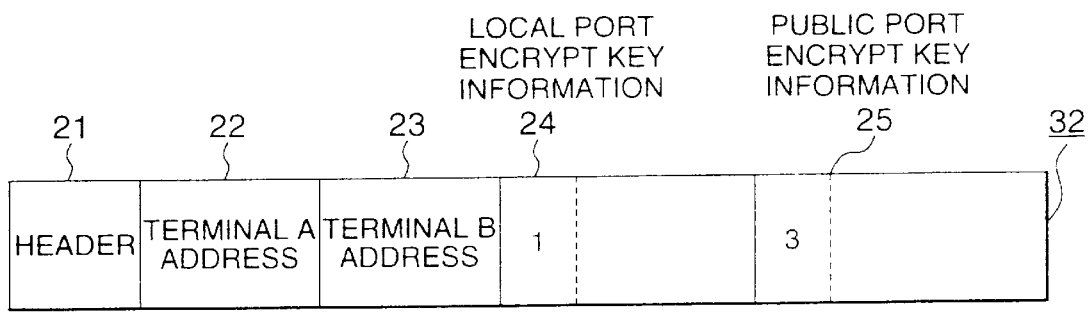
FIG. 7 schematically shows the frame of the key seek packet according to the first embodiment of the present invention.

As indicated in FIG. 7, the encrypt apparatus 12 which receives the key seek packet 31 from the public port 5 additionally sets "3" equal to the ID of the own single encrypt key to the public port encrypt key information 25, and transfers the key seek packet 32 to the local port 7.

Figure 8:
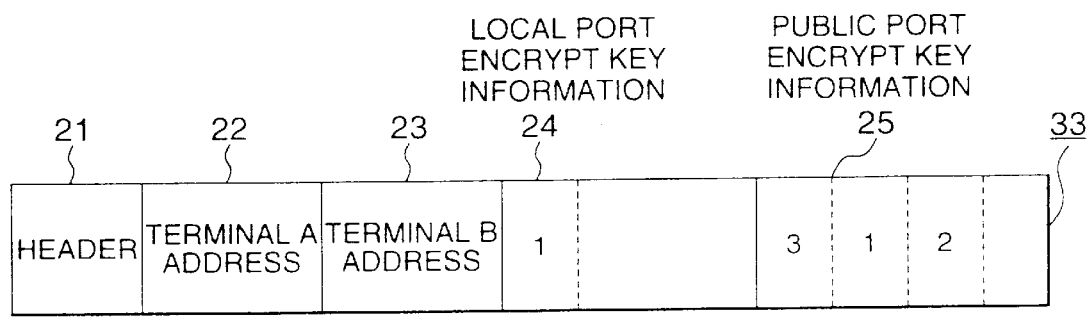
FIG. 8 schematically shows the frame of the key seek packet according to the first embodiment of the present invention.

As indicated in FIG. 8, the encrypt apparatus 13 which receives the key seek packet 32 from the public port 5 additionally sets "1" and "2" equal to the IDs of the own encrypt key to the public port encrypt key information 25, and transfers the key seek packet 33 to the local port 7.

Figure 9:
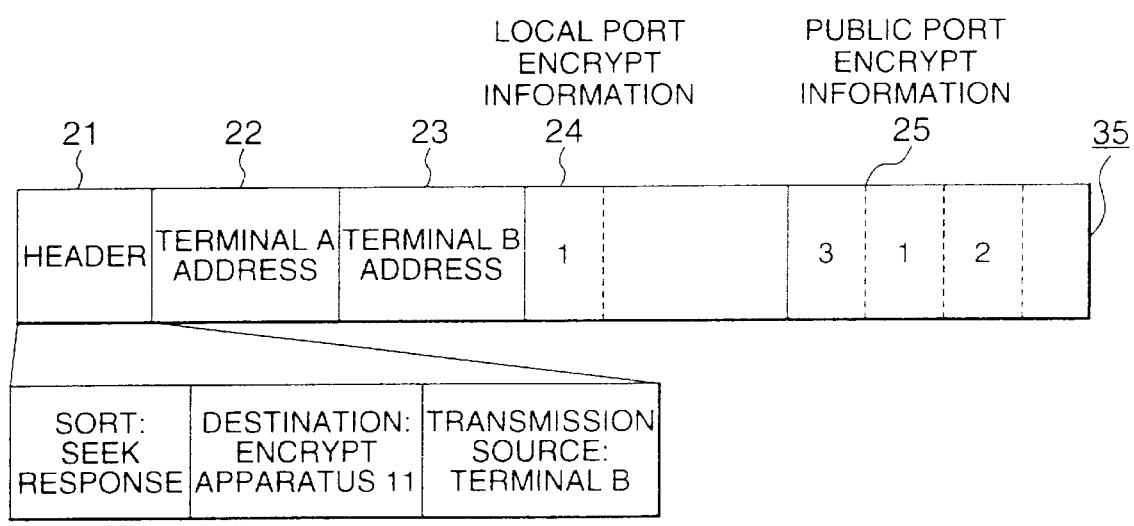
FIG. 9 schematically shows the frame of the key seek response packet according to the first embodiment of the present invention.

The terminal B which receives the key seek packet 33 copies the data portion 26 of the key seek packet 33 to a key seek response packet 35. Then, the key seek response packet 35 indicated in FIG. 9 is transmitted via the respective encrypt apparatuses to the encrypt apparatus 11. It should be noted that in the header 21 of the key seek response packet 35, the packet sort is set to the key seek response packet, the transmission source is set to the address of the terminal B, and the destination is set to the address of the encrypt apparatus 11, which are transmitted.

Upon receipt of the key seek response packet 35 from the local port 7 (step S1 of FIG. 5), the encrypt apparatus 13 retrieves as to whether or not either "1" or "2" equal to an ID corresponding to the ID of the own encrypt key is set to the local port encrypt key information 24 (step S2). In this case, since "1" equal to the ID set by the encrypt apparatus 11 has been set to the local port encrypt key information 24 of the key seek response packet, the encrypt apparatus 13 registers into the encrypt key table 83 shown in FIG. 4, such an operation that the communication data between the terminal A and the terminal B is encrypted/decrypted by the encrypt key having the ID equal to "1" (step S3). Since the communication data buffer contains no communication data to be transmitted (step S4) and the destination address of the header 21 of the key seek response packet 35 is not addressed to the own encrypt apparatus 13 (step S6), the encrypt apparatus 13 relays the received key seek response packet 35 to the encrypt apparatus 12 (step S8).

Upon receipt of the key seek response packet 35 from the local port 7 (step S1 of FIG. 5), the encrypt apparatus 12 retrieves as to whether or not "3" equal to an ID corresponding to the ID of the own encrypt key is set to the local port encrypt key information 24 of the key seek response packet 35 (step S2). In this case, since the same ID cannot be found out, the encrypt apparatus 12 checks as to whether or not the same encrypt key ID as the encrypt key ID present in the local port encrypt key information 24 of the key seek response packet 35 is present in the public port encrypt key information 25 (step S13).

Then, as shown in FIG. 9, since the encrypt key ID "1" of the encrypt apparatus 11 is made coincident with the encrypt key ID "1" of the encrypt apparatus 13, the encrypt apparatus 12 registers into the encrypt key table 82, such an operation that the communication data between the terminal A and the terminal B is transparently relayed to the encrypt key table 82 of FIG. 4 (step S14). Since the communication data buffer contains no communication data to be transmitted (step S4) and also the destination address of the header 21 of the key seek response packet 35 is not addressed to the own encrypt apparatus 12 (step S6), the encrypt apparatus 12 relays the received key seek response packet 35 to the encrypt apparatus 11 (step S8).

Upon receipt of the key seek response packet 35 from the public port 5 (step S11), the encrypt apparatus 11 retrieves as to whether or not "1" equal to an ID corresponding to the ID of the own encrypt key is set to the public port encrypt key information 25 of the key seek response packet 35 (step S12). In this case, since the ID "1" of the encrypt key has been set to the public port encrypt key information 25 of the key seek response packet 35 among two encrypt keys set by the encrypt apparatus 13, the encrypt apparatus 11 registers into the encrypt key table 81 shown in FIG. 4, such an operation that the communication data between the terminal A and the terminal B is encrypted/decrypted by the encrypt key having the ID equal to "1" (step S3).

Since the communication data buffer contains communication data 41 to be transmitted (step S4), the communication data 41 is encrypted by the encrypt/decrypt processing unit 2 by using the encrypt key 1 in accordance with the content of the encrypt key table 81, and then the encrypted communication data is transmitted as communication data 42 to the terminal B (step S5). Next, since the destination address is addressed to the encrypt apparatus 11 in the header 21 of the received key seek response packet 35 (step S6), the encrypt apparatus 11 discards the key seek response packet 35 (step S7).

The communication data 42 encrypted by the encrypt apparatus 11 is transparently relayed by the encrypt apparatus 12 in accordance with the content of the encrypt key table 82. In the encrypt apparatus 13, the communication data 42 supplied from the public port 5 is decrypted based on the encrypt key 1 in accordance with the content of the encrypt key table 83, and the decrypted communication data 41 is transmitted via the local port 7 to the terminal B.

The communication data 43 sent from the terminal B to the terminal A is transparently relayed in accordance with the content of the encrypt key table 83 in the encrypt apparatus 13, and the communication data 43 supplied from the local port 7 is encrypted based upon the encrypt key 1. In the encrypt apparatus 12, the communication data 43 is transparently related in accordance with the content of the encrypt key table 82. In the encrypt apparatus 11, the communication data 43 derived from the public port 5 is decrypted by the encrypt key 1 in accordance with the content of the encrypt key table 81, and then the decrypted communication data is allowed to reach via the local port 7 to the terminal A.

Although the key seek packet is transmitted to the destination terminal in the above-described example, this key seek packet may be transmitted to the encrypt apparatus for storing the destination terminal. In this alternative case, the key seek packet is allowed to reach to such an encrypt apparatus, while acquiring the encrypt key information of the encrypt apparatus on the relay path, which stores the destination terminal, and then notifies the key seek response packet from the encrypt apparatus for storing this destination terminal to the encrypt apparatus on the relay path.

Alternatively, the key seek packet may be transmitted not from the encrypt apparatus on the side of the transmission source, but from the encrypt apparatus for storing the transmission source terminal. In this alternative case, an instruction is made such that the key seek packet is sent from the encrypt apparatus on the side of the transmission source to the encrypt apparatus for storing the transmission source terminal. The key seek packet sent from the instructed encrypt apparatus acquires the encrypt key information of the encrypt apparatus on the relay path, and then the key seek response packet is notified from the destination terminal to the encrypt apparatus on the relay path.

As previously described, the key information of the encrypt apparatus on the communication path between the terminals is acquired by employing the key seek packet under such a condition that the encrypt key of the communication counter party is unknown. Based on the acquired key information, the encrypt key information is automatically learned. Then, the communication data between the terminals is encrypted/decrypted and transparently relayed by the respective encrypt apparatuses. As a consequence, the encrypt key information is set to the encrypt apparatus on the communication path between the terminals in such a manner that the encryption communication can be manually performed. Accordingly, there is no operation mistake, and the network can be readily managed. Also, when the functions of the encrypt apparatuses 11, 13, 15 shown in FIG. 3 are contained in the terminals A, B, C, a similar effect can be achieved.

Embodiment 2

Figure 10:
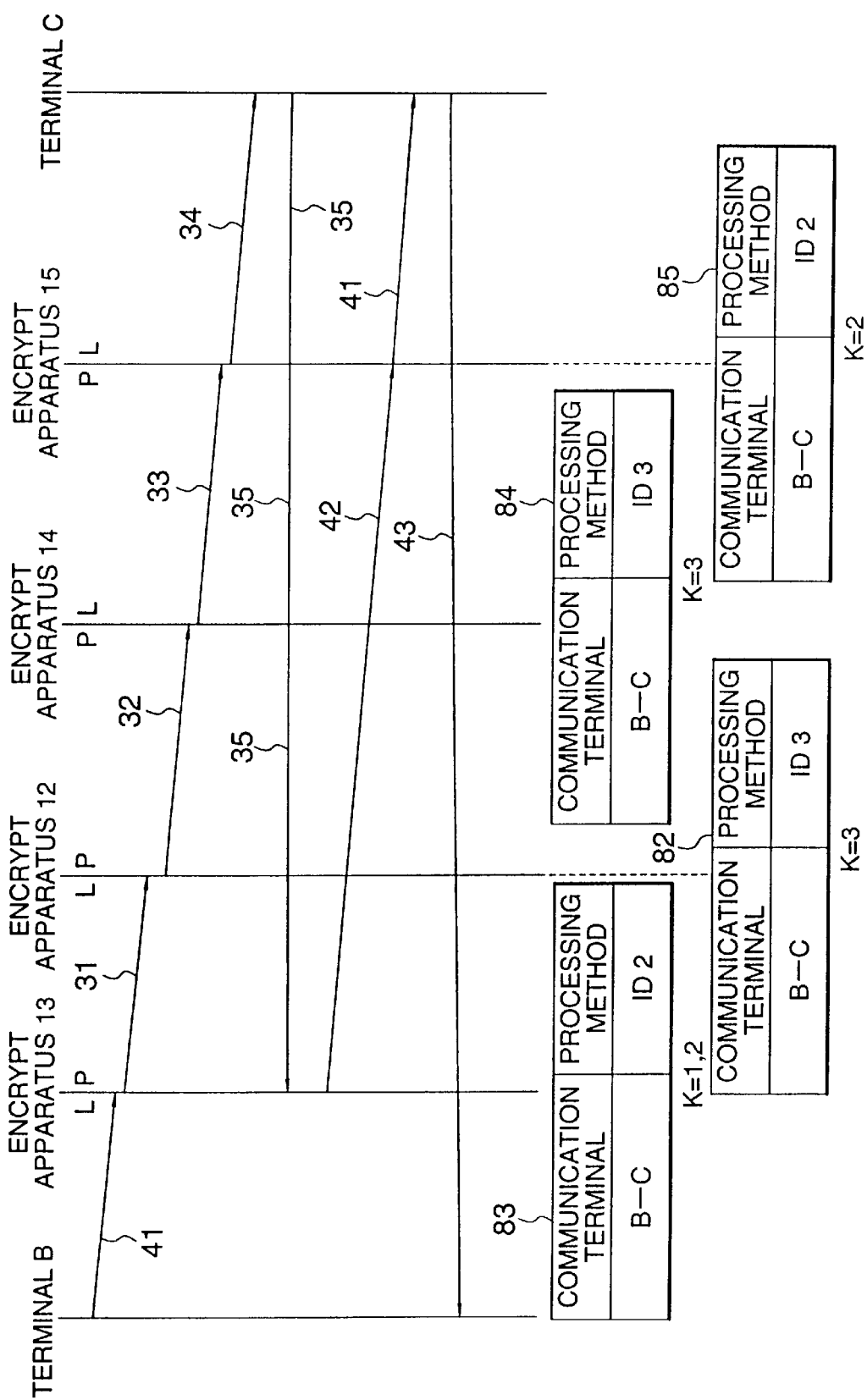
FIG. 10 is a sequence diagram for illustratively showing an example in which an encryption communication of dual key is carried out among terminals in a network structure according to a second embodiment of the present invention.

An encryption communication system, according to an embodiment 2 of the present invention, is featured by processing dual encryption. FIG. 10 is a sequence diagram for describing such an operation that when data is communicated from the terminal B to the terminal C shown in FIG. 3, each of the encrypt apparatuses 1 learns the encrypt key table 8 based upon a key seek packet and a key seek response packet.

In FIG. 10, reference numeral 41 shows communication data transmitted from the terminal B, reference numeral 42 represents communication data produced by encrypting the communication data 41, and reference numeral 43 indicates communication data sent from the terminal C to the terminal B. Reference numerals 31 to 34 denote key seek packets which are transmitted from the encrypt apparatus 13, are relayed by the encrypt apparatuses 12, 14, 15, and then are sent to the terminal C. Reference numeral 35 shows a key seek response packet which is transmitted from the terminal C and is relayed by the encrypt apparatuses 15, 14, 12.

Reference numeral 82 indicates an encrypt key table of the encrypt apparatus 12, and also indicates that the processing method is the encrypt/decrypt processing method, and an ID of an encrypt key is equal to 3 between the communication terminal B and the communication terminal C. Reference numeral 83 is an encrypt key table of the encrypt apparatus 13, and indicates that the processing method is the encrypt/decrypt processing method, and an ID of an encrypt key is equal to 2 between the communication terminal B and the communication terminal C.

Reference numeral 84 indicates an encrypt key table of the encrypt apparatus 14, and also indicates that the processing method is the encrypt/decrypt processing method, and an ID of an encrypt key is equal to 3 between the communication terminal B and the communication terminal C. Reference numeral 85 is an encrypt key table of the encrypt apparatus 15, and indicates that the processing method is the encrypt/decrypt processing method, and an ID of an encrypt key is equal to 2 between the communication terminal B and the communication terminal C.

FIG. 5 shows a process flow chart in the case that the encrypt apparatus receives the key seek response packet.

Next, operations will now be explained. It is now assumed that no processing method is registered into the encrypt key tables 82 to 85.

When the terminal B transmits the communication data 41, the encrypt apparatus 13 which receives this communication data 41 checks as to whether or not the data processing method for the terminal B to the terminal C is registered into the own encrypt key table 83. In this case, similar to the above-described embodiment 1, since the data processing method is not registered in this encrypt key table 83, the encrypt apparatus 13 transmits the key seek packet 31 to which the IDs 1 and 2 of the own encrypt key has been set to the local port encrypt key information 24 of the key seek packet. It should be noted that in the header 21 of the key seek packet 31, the key seek packet is set to the packet sort, the address of the encrypt apparatus 13 is set to the transmission source of the key seek packet, and the address of the terminal C is set to the destination, which are transmitted via the encrypt apparatus 12 to the terminal C.

The encrypt apparatus 12 which receives the seek packet 31 from the local port 7 transmits such a key seek packet 32 produced by adding the ID3 of the own encrypt key to the local port encrypt key information 24 of the key seek packet 31. The encrypt apparatus 14 transmits such a key seek packet 33 produced by adding the ID3 of the own encrypt key to the public port encrypt key information 25 of the key seek packet 32 received from the public port 5. The encrypt apparatus 15 transmits such a key seek packet 34 produced by adding the ID2 of the own encrypt key to the public port encrypt key information 25 of the key seek packet 33 received from the public port 5.

Figure 11:
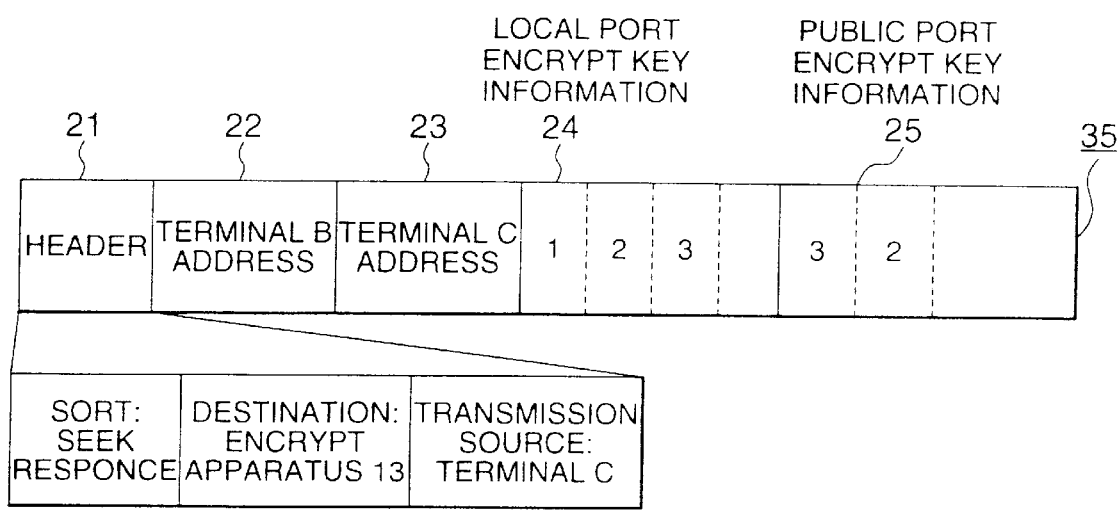
FIG. 11 schematically indicates a frame of a key seek response packet in the second embodiment of the present invention.

Next, the terminal C which receives the key seek packet 34 directed to the own terminal from the encrypt apparatus 15 copies the data portion 26 of the key seek packet 34 to the data portion 26 of the key seek response packet 35. Then, the key seek response packet 35 indicated in FIG. 11 is transmitted via the encrypt apparatus 15 to the terminal B. It should also be noted that in the header 21 of the key seek response packet 35, the key seek response packet is set to the packet sort, the address of the terminal C is set to the transmission source address, and the address of the encrypt apparatus 13 is set to the destination, which are transmitted.

Upon receipt of the key seek response packet 35 from the local port 7 (step S1 of FIG. 5), the encrypt apparatus 15 retrieves as to whether or not "2" equal to an ID corresponding to the ID of the own encrypt key is set to the local port encrypt key information 24 (step S2).

In this case, since "2" equal to the ID set by the encrypt apparatus 15 has been set to the local port encrypt key information 24 of the key seek response packet 35, the encrypt apparatus 15 registers into the encrypt key table 85 shown in FIG. 10, such an operation that the communication data 41 between the terminal B and the terminal C is encrypted/decrypted by the encrypt key having the ID equal to "2" (step S3). Since the communication data buffer contains no communication data 41 to be transmitted (step S4) and the destination address of the header 21 of the key seek response packet 35 is not addressed to the own encrypt apparatus 15 (step S6), the encrypt apparatus 15 relays the received key seek response packet 35 to the encrypt apparatus 14 (step S8).

Subsequently, similarly, in accordance with the flow chart shown in FIG. 5, upon receipt of the key seek response packet 35 from the local port 7, the encrypt apparatus 14 retrieves the ID of the encrypt key registered in the local port encrypt key information 24 of the key seek response packet 35, and then acquires the encrypt key having the ID of "3". Then, this encrypt apparatus 14 registers into the own encrypt key table 84, such an operation that the communication data between the terminal B and the terminal C is encrypted/decrypted based on the encrypt key having the ID of "3", and also relays the key seek response packet 35 to the encrypt apparatus 12.

Also, upon receipt of the key seek response packet 35 from the public port 5, the encrypt apparatus 12 retrieves as to whether or not "3" equal to an encrypt ID corresponding to the ID of the own encrypt key is set to the public port encrypt key information 25 of the key seek response packet 35. Since this encrypt key is the same as the encrypt key of the ID3, the encrypt apparatus 12 registers into the own encrypt key table 82, such an operation that the communication data between the terminal B and the terminal C is encrypted/decrypted based upon the encrypt key having the ID of "3", and then relays this encrypted/decrypted data to the encrypt apparatus 13.

Upon receipt of the key seek response packet 35 from the public port 5, the encrypt apparatus 13 retrieves as to whether or not either "1" or "2" equal to an encrypt ID corresponding to the ID of the own encrypt key is set to the public port encrypt key information 25 of the key seek response packet 35. Since this encrypt key is the same as the encrypt key of the ID2, the encrypt apparatus 13 registers into the own encrypt key table 83, such an operation that the communication data between the terminal B and the termi-nal C is encrypted/decrypted based upon the encrypt key having the ID of "2".

Similar to the embodiment 1, subsequently, the encrypt apparatus 13 encrypts the communication data 41 which has been stored in the communication data buffer 112 and is derived from the local port 7 in accordance with the content of the encrypt key table 83 in the encrypt/decrypt processing unit 2 with employment of the encrypt key 2. Then, this encrypt apparatus 13 transmits the encrypted communication data 42 from the public port 5 via the encrypt apparatus 12 to the terminal C. Also, since the destination address contained in the header 21 of the key seek response packet 35 is directed to the encrypt apparatus 13, the key seek response packet 35 is discarded by the encrypt apparatus 13.

The encrypt apparatus 12 which receives the communication data 42 encrypted by the encrypt apparatus 13 from the local port 7 encrypts this communication data 42 based on the encrypt key 3 in accordance with the content of the encrypt key table 82, and the encrypt apparatus 14 decrypts the communication data 42 by the encrypt key 3 via the public port 5 in accordance with the content of the encrypt key table 84. Then, the communication data from the public port 5 is decrypted by the encrypt key 2 in the encrypt apparatus 15 in accordance with the content of the encrypt key table 85, and thus the decrypted communication data is allowed to reach via the local port 7 to the terminal C.

The communication data 43 sent from the terminal C to the terminal B is encrypted based on the content of the encrypt key table 85 by the encrypt apparatus 15, and also the communication data 43 derived from the local port 7 is encrypted by the encrypt key 2. The communication data 43 derived from the local port 7 is encrypted by the encrypt key 3 in accordance with the content of the encrypt key table 84 by the encrypt apparatus 14. Also, the communication data 43 derived from the public port 5 is decrypted based on the encrypt key 3 in accordance with the content of the encrypt key table 82 by the encrypt apparatus 12. Also, the communication data 43 from the public port 5 is decrypted by the encrypt key 2 in the encrypt apparatus 13 in accordance with the content of the encrypt key table 83, and thus the decrypted communication data is allowed to reach via the local port 7 to the terminal B.

As previously described, since the communication data which has been encrypted by the encrypt apparatuses 13 and 15 is furthermore encrypted by the encrypt apparatuses 12 and 14, it is possible to realize the encryption communication with high secrecies. Alternatively, the encrypt/decrypt process operations may not be carried out in the encrypt apparatuses 12 and 14, but the transparent relay processing operations may be carried out in order that after the communication data is once encrypted between the terminal B and the terminal C, this encrypted communication data is not again encrypted. As a result, delays contained in the communication data caused by the encrypt/decrypt process operations can be reduced. Even when the functions of the encrypt apparatuses 11, 13, 15 shown in FIG. 3 are contained in the terminals A, B, C, a similar effect may be achieved.

Embodiment 3

As indicated in FIG. 3, when the communication is performed between the terminal A and the terminal C, a description will now be made of operation in such a case that the IDs of the encrypt keys saved in the encrypt apparatuses 11, 14, 15 are 1, 3, 2, namely are not made coincident with each other.

Figure 12:
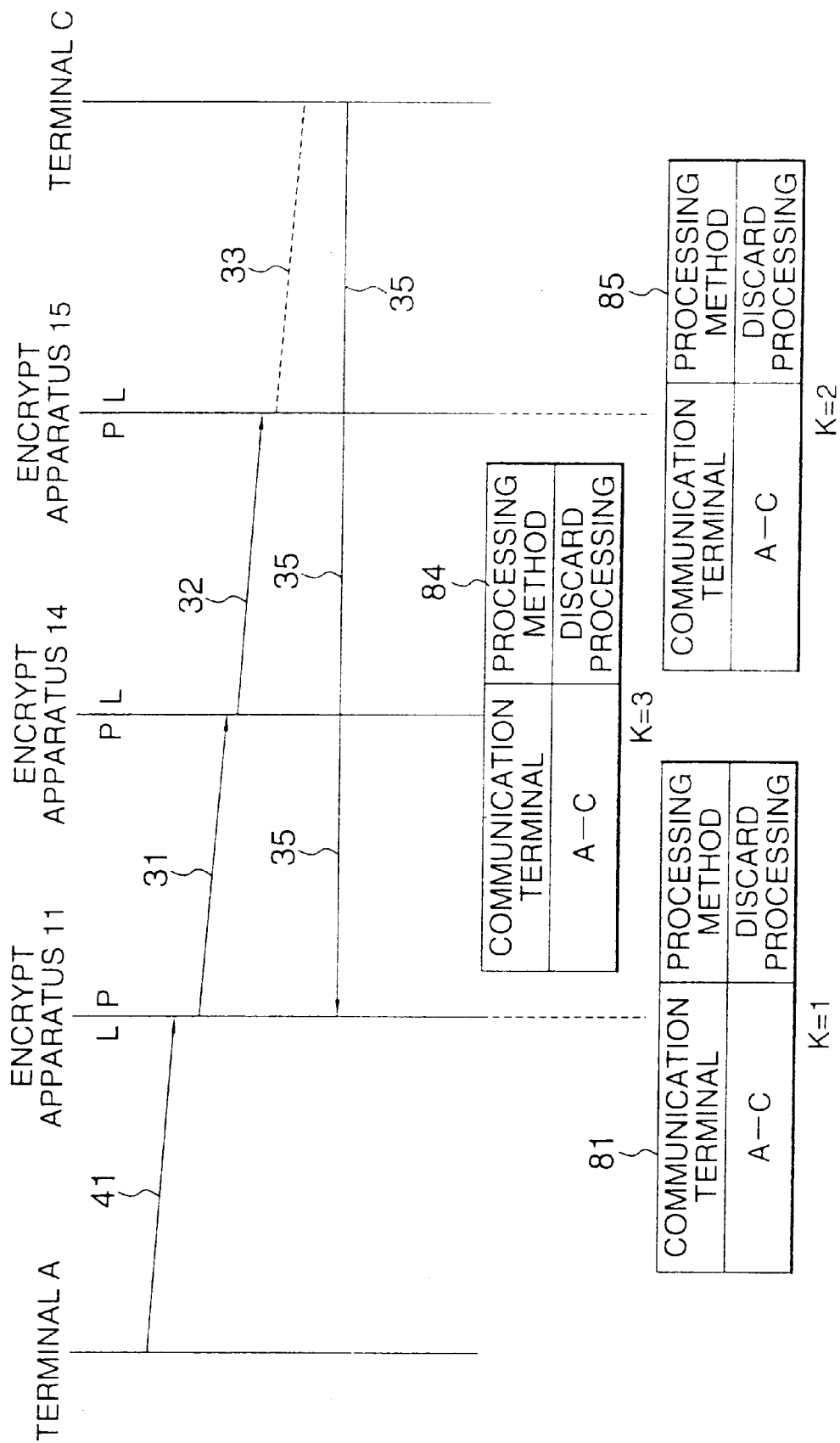
FIG. 12 is a sequence diagram for showing an example when a data communication is performed among terminals via a plurality of encrypt apparatuses in the network structure of a third embodiment of the present invention, and the encryption communication is not carried out unless the plural encrypt apparatuses own the same keys.

First, as indicated in FIG. 12, the communication data 41 is transmitted from the terminal A to the terminal C. The encrypt apparatus 11 which receives the communication data 41 from the local port 7 retrieves the internally provided encrypt key table 81. When the processing method for the data communication between the terminal A and the terminal C is not registered, this encrypt apparatus 11 edits the key seek packet 31 to transmit the edited key seek packet to the public port 5, and also stores the received communication data 41 into the communication data buffer 112.

Then, based upon the received communication data 41, the encrypt apparatus 11 edits the key seek packet 31 as follows: That is, the encrypt apparatus 11 sets a terminal "A" address to the transmission source terminal address 22, sets a terminal "C" address to the destination terminal address 23, and sets "1" equal to the ID of the own encrypt key to the local port encrypt key information 24, and further sets nothing to the public port encrypt key information 25. Also as to the header 21, the key seek packet is set to the packet sort, an address of the encrypt apparatus 11 is set to the transmission source address of the key seek packet, and the address of the terminal C is set to the destination address, which are transmitted via the encrypt apparatus 14 to the terminal C.

Figure 13:
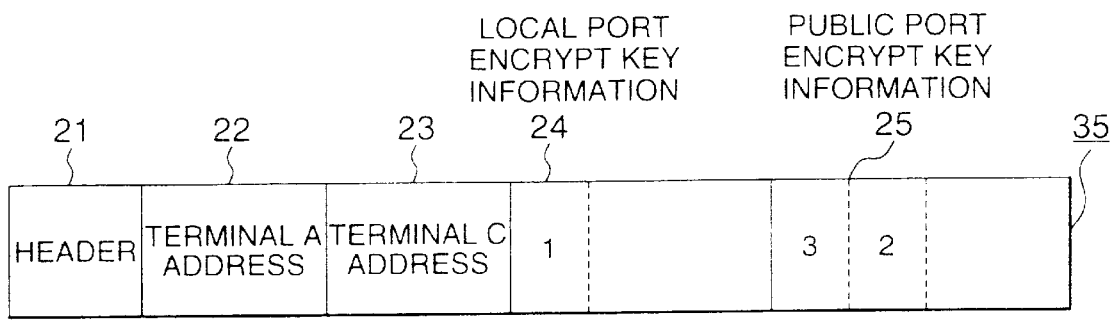
FIG. 13 schematically indicates a frame of a key seek response packet according to the third embodiment of the present invention.

The key seek packet 31 sent from the encrypt apparatus 11 reaches the terminal C while the own encrypt key ID is added to the public port key information 25 by the encrypt apparatuses 14 and 15. The terminal C copies the data portion 26 of the key seek packet 33 to the seek response packet 35 as shown in FIG. 13. It should also be noted that in the header 21, the key seek response packet is set to the packet sort, the address of the terminal C is set to the transmission source address, and the address of the encrypt apparatus 11 is set to the destination, and thus the key seek response packet 35 is transmitted via the encrypt apparatus 15 to the encrypt apparatus 11.

FIG. 5 shows a process flow chart in the case that the encrypt apparatus receives the key seek response packet. Next, operations will now be explained with reference to this flow chart.

Upon receipt of the key seek response packet 35 from the local port 7 (step S1 of FIG. 5), the encrypt apparatus 15 retrieves as to whether or not "2" equal to an ID corresponding to the ID of the own encrypt key is set to the local port encrypt key information 24 of the key seek response packet 35 (step S2).

In this case, since the same encrypt key ID as the encrypt key ID 2 owned by the encrypt apparatus 15 has not been set to the local port encrypt key information 24 of the key seek response packet 35, the encrypt apparatus 15 checks as to whether or not the same encrypt key IDs are present in the local port encrypt key information 24 and the public port encrypt key information 25 (step S13). Since there are no same encrypt key IDs, another check is made as to whether or not no ID of the encrypt key is set to either the local port encrypt key information 24 or the public port encrypt key information 25 (step S15). Since this ID of the encrypt key is set to both the local port encrypt key information 24 and the public port encrypt key information 25, the discard processing operation is registered into the encrypt key table 85 (step S16). Then, the process operation is advanced to a step S4. Since the communication data buffer 112 contains no communication data to be transmitted (step S4) and the destination address of the header 21 of the key seek response packet 35 is not addressed to the own encrypt apparatus 15 (step S6), the encrypt apparatus 15 relays the received key seek response packet 35 to the encrypt apparatus 14 (step S8).

Subsequently, upon receipt of the key seek response packet 35 from the local port 7, the encrypt apparatus 14 similarly registers the discard processing operation into the encrypt key table 84, and relays the key seek response packet 35 to the encrypt apparatus 11. Upon receipt of the key seek response packet 35 from the public port 5, the encrypt apparatus 11 registers into the own encrypt key table 81, such an operation that the communication data between the terminal A and the terminal C is discard-processed. Then, the communication data stored in the communication data buffer 112 is discarded in accordance with the content of the encrypt key table 81.

Also, since the destination address contained in the header 21 of the key seek response packet 35 is directed to the encrypt apparatus 11, the encrypt apparatus 11 discards the key seek response packet 35.

As indicated in FIG. 13, in the above embodiment, since there are no IDs of the encrypt keys coincident with each other, such an operation that the communication data between the terminal A and the terminal C is discarded is registered into the respective encrypt key tables 81, 84, 85 of the encrypt apparatuses 11, 14, 15. As a result, the communication data between the terminal A and the terminal C is discarded by each of the encrypt apparatuses.

As previously described, in the case that the same encrypt key IDs are not present in the respective encrypt apparatuses on the relay path between the terminal A and the terminal C, since the respective encrypt apparatuses discard the communication data between the terminal A and the terminal C, this encryption communication system can avoid the unauthorized access operation and also the leakage of secrecies.

Embodiment 4

Figure 14:
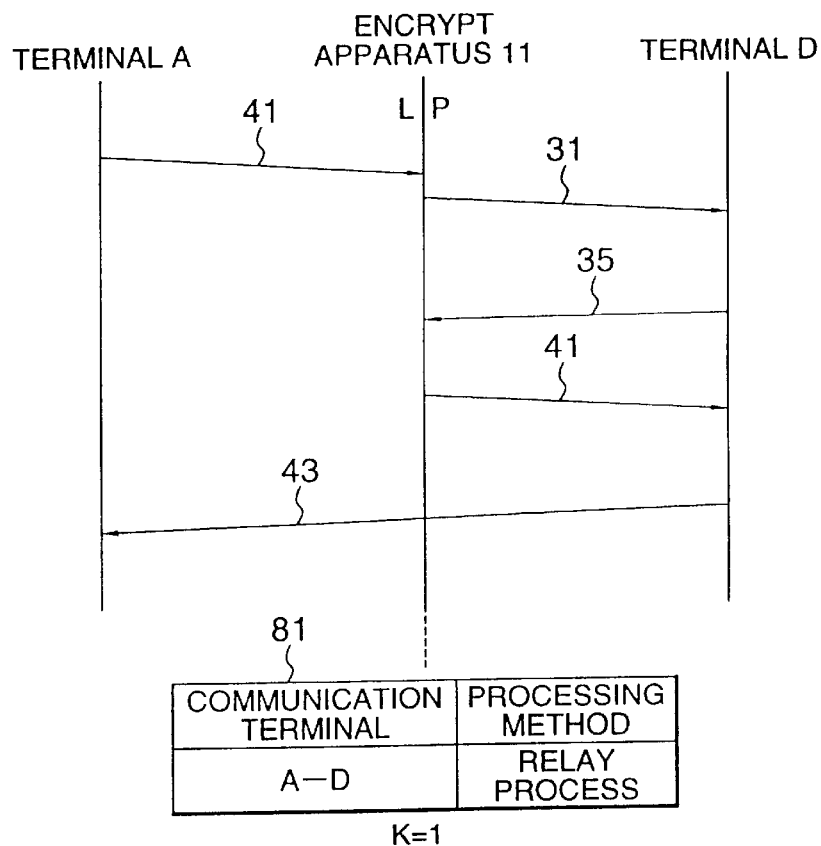
FIG. 14 is a sequence diagram for indicating such an example when an encryption communication is carried out among terminals via one encrypt apparatus in a network structure according to a fourth embodiment of the present invention.
Figure 15:
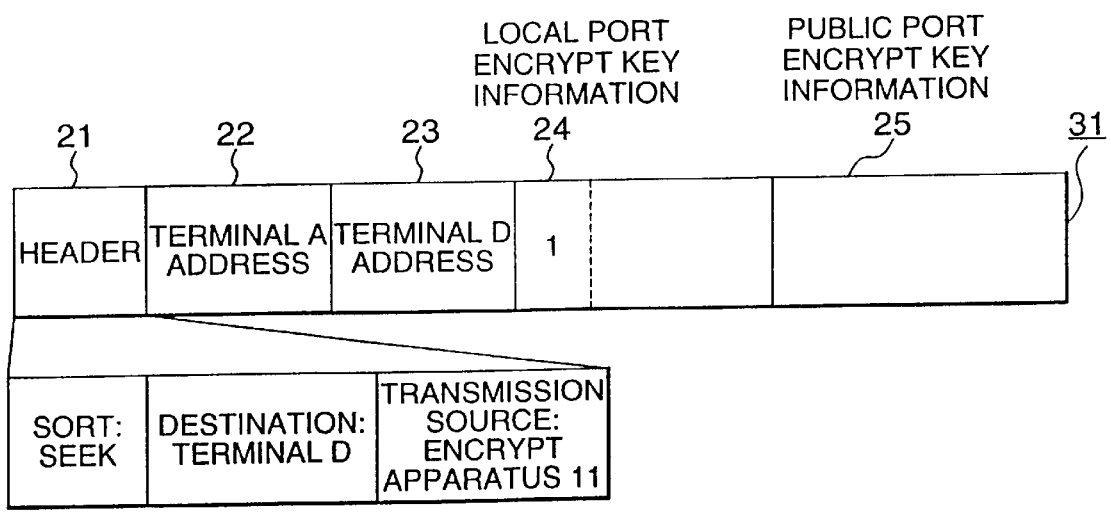
FIG. 15 schematically represents a frame of a key seek response packet according to the fourth embodiment of the present invention.

Referring now to FIG. 3, FIG. 14, and FIG. 15, a description will be made of such an example that a communication is carried out via one encrypt apparatus between two terminals. FIG. 14 is a sequence diagram of a key seek packet executed to learn an encrypt key table when a communication is performed from the terminal A to the terminal D shown in FIG. 3.

In FIG. 14, reference numeral 41 shows communication data transmitted from the terminal A, reference numeral 31 indicates a key seek packet transmitted from the encrypt apparatus 11, reference numeral 35 represents a key seek response packet transmitted from the terminal D, and reference numerals 41 and 43 denote communication data between the terminal A and the terminal D after learning the encrypt key table. Also, reference numeral 81 is an encrypt key table of the encrypt apparatus 11.

FIG. 15 is a process flow chart for describing operations when an encrypt apparatus receives a key seek response packet.

Since the processing method of the communication data between the terminal A and the terminal D is not registered into the encrypt key table 81 owned by the encrypt apparatus 11, this encrypt apparatus 11 which receives the communication data 41 sent from the terminal A via the local port 7 edits the key seek packet 31 shown in FIG. 15, and then transmits the edited key seek packet 31 to the terminal D. Also, the encrypt apparatus 11 stores the communication data 41 into the communication data buffer 112.

It should be noted that the encrypt apparatus 11 edits the key seek packet 31 as represented in FIG. 15. That is, based on the received communication data 41, the encrypt apparatus 11 sets a terminal "A" address to the transmission source terminal address 22, sets a terminal "D" address to the destination terminal address 23 and sets "1" equal to the ID of the own encrypt key to the local port encrypt key information 24, and further sets nothing to the public port encrypt key information 25. Also, as to the header 21, the key seek packet is set to the packet sort, an address of the encrypt apparatus 11 is set to the transmission source address of the key seek packet, and the address of the terminal D is set to the destination address.

The terminal D which receives the key seek packet 31 copies the data portion of the key seek packet to the data portion of the key seek response packet 35. Also, as to the header 21, the key seek response packet is set to the packet sort, an address of the encrypt apparatus 11 is set to the transmission source address of the key seek packet, and the address of the terminal D is set to the transmission source address, which are transmitted to the encrypt apparatus 11.

The encrypt apparatus 11 which receives the key seek response packet 35 from the public port 5 (step S11 of FIG. 5) retrieves as to whether or not the same ID as "1" equal to the ID of the own encrypt key is set to the public port encrypt key information 25 (step S12). In this embodiment case, since the same ID of "1" is not set, another check is made as to whether or not the same encrypt keys ID are present in both the local port encrypt key information 24 and the public port encrypt key information 25 (step S13). Nothing is set to the public port encrypt key information 25. In other words, this implies that there is no encrypt apparatus which has received the key seek packet 31 transmitted from the encrypt apparatus 11 via the public port 5 (namely, there is no encrypt apparatus for decrypting data). As a consequence, the encrypt apparatus 11 registers into the encrypt key table 81, such an operation that the communication data between the terminal A and the terminal D is transparently relayed (step S14).

Then, the communication data 41 which has been stored in the communication data buffer 112, the communication data between the terminal A and the terminal D is transparently relayed, in accordance with the encrypt key table 81 (step S5). Also, the key seek response packet 35 addressed to the own encrypt apparatus (step S6) is discarded (step S7). As a result, the communication data 41 is allowed to reach to the terminal D without any encryption. Also, the communication data 43 derived from the terminal D is transparently relayed in accordance with the encrypt key table 81 and then is allowed to reach to the terminal A without any encryption.

As previously explained, in such a case that the encrypt key ID is not present in the public port key information 25 of the key seek response packet 35, the encrypt apparatus 11 registers into the encrypt key table 81, such an operation that the communication data between the terminal A and the terminal D is transparently relayed. As a consequence, the communication can be performed between the terminals via the encrypt apparatus without any encryption. Although the data communication can be done without any encryption in the above embodiment, the communication may not be permitted.

Embodiment 5

The above-explained embodiments 1 and 2 have described the encryption communication systems in which the respective encrypt apparatuses are set under initial conditions, namely nothing is set to the encrypt key tables. The following encryption communications are different from the above encryption communications. That is, no encryption communication can be performed in such a case that after each of the encrypt apparatuses has learned the encrypt key table 8, an encrypt key table 8 contained in an encrypt apparatus installed on a communication path is deleted due to a power interruption and other reasons.

It should be understood in the below-mentioned descriptions that as to the encrypt apparatuses 13, 14, 15 containing the encrypt key tables whose contents are not deleted by a failure and the like, since there is such a risk that these contents of the encrypt key tables are changed, the encrypt key is again registered into the encrypt key tables in accordance with the key seek response packet.

For instance, referring now to FIG. 16, a description will be made of operations in such a case that while continuing the data communication between the terminal B and the terminal C in FIG. 3 in accordance with the method of the embodiment 2, the encrypt key table 82 already learned by the encrypt apparatus 12 is deleted by the failure.

Figure 16:
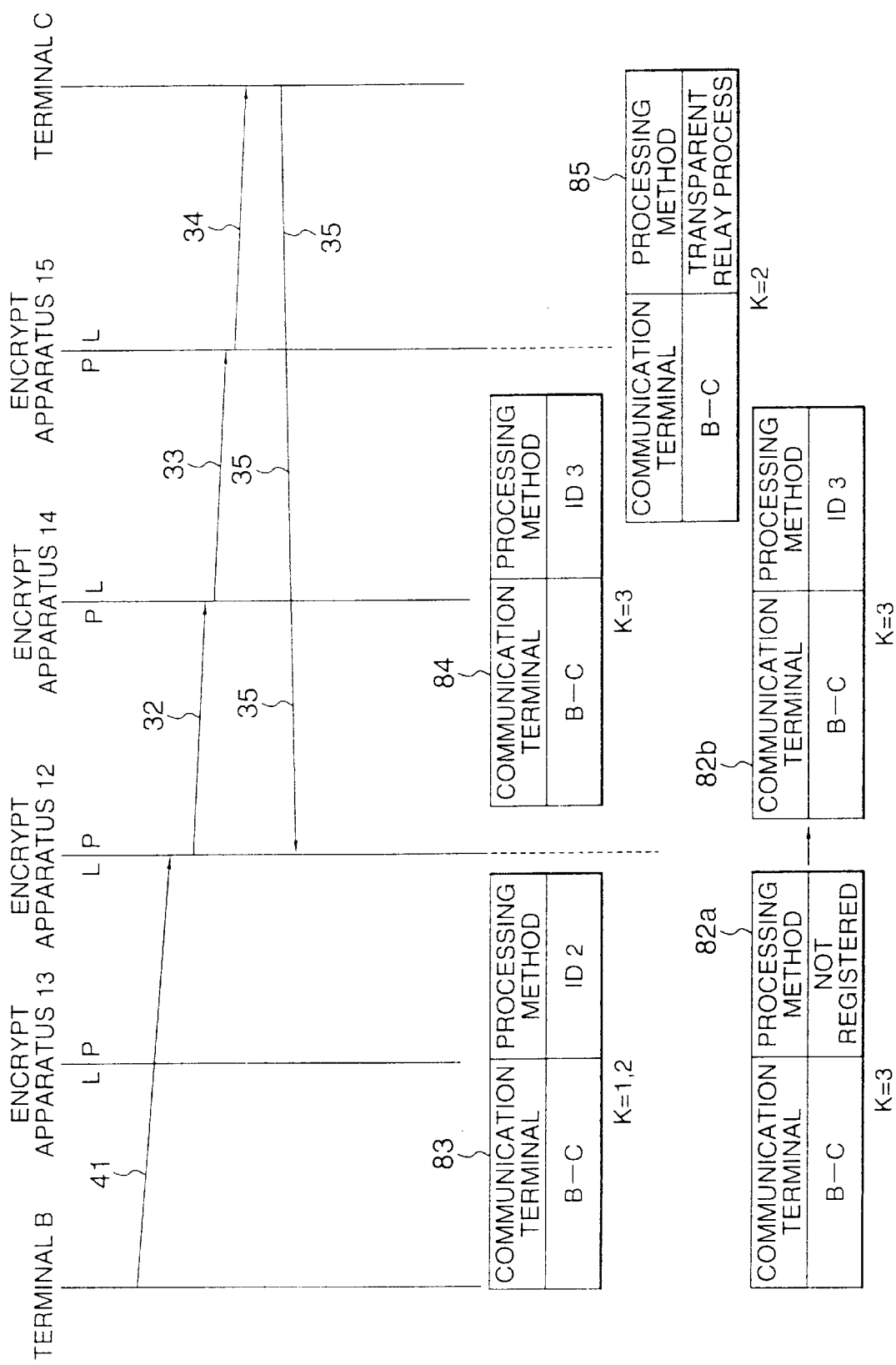
FIG. 16 is a sequence diagram for showing an example in the case when an encrypt key table of an encrypt apparatus is deleted in a network structure according to a fifth embodiment of the present invention, an encryption communication among terminals is brought into an abnormal state.

It should also be noted that reference numeral "82a" shown in FIG. 16 indicates a deleted encrypt key table, and reference numeral "82b" denotes a re-registered encrypt key table. FIG. 5 is a process flow chart for explaining operations when an encrypt apparatus receives a key seek response packet.

Upon receipt of the communication data 41 transmitted from the terminal B to the terminal C from the local port 7, the encrypt apparatus 13 refers to the encrypt key table 83. Since the encrypt key 2 is registered to the processing method, the encrypt apparatus 13 encrypts the communication data 41 by the encrypt key 2 to send the encrypted communication data. When the encrypt apparatus 12 which receives the encrypted communication data 41 refers to the encrypt key table 82a, since the processing method for the communication data between the terminal B and the terminal C is not registered, this encrypt apparatus 12 edits the key seek packet 32 to send out the edited key seek packet via the encrypt apparatuses 14 and 15 to the terminal C.

It should also be noted that the encrypt apparatus 12 sets the encrypt key ID3 of the encrypt apparatus 12 to the local port encrypt key information 24 of the key seek packet 32, and transmits the key seek packet 32 via the encrypt apparatus 14 to the terminal C, while in the header 21 of the key seek packet 32, the key seek packet is set to the packet sort; the address of the encrypt apparatus 12 is set to the transmission source address; and the address of the terminal C is set to the destination address.

The encrypt apparatus 14 which receives the key seek packet 32 from the public port 5 transmits such a key seek packet 33 produced by adding the ID of the own encrypt key to the public port encrypt key information 25 of the key seek packet 32. The encrypt apparatus 15 which receives the key seek packet 33 from the public port 5 transmits such a key seek packet 34 produced by adding the ID of the own encrypt key to the public port encrypt key information 25 of the key seek packet 33 to the terminal C.

Figure 17:
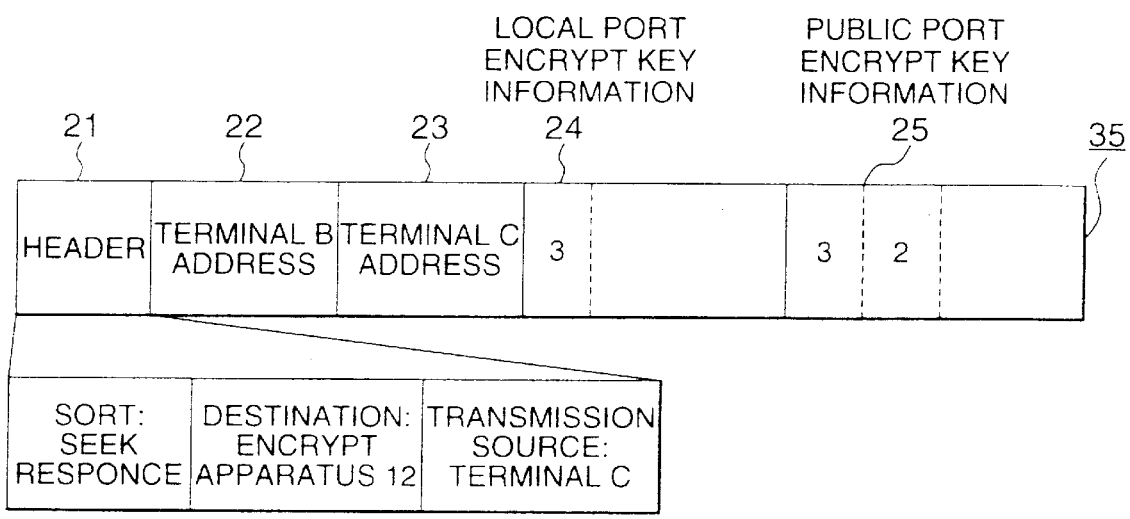
FIG. 17 schematically represents a frame of a key seek response packet according to the fifth embodiment of the present invention.

The terminal C which receives the key seek packet 34 copies the data portion 26 of the key seek packet 34 to the data portion 26 of the key seek response packet 35 as shown in FIG. 17. It should also be noted that in the header 21 of the key seek response packet 35, the key seek response packet is set to the packet sort, the address of the terminal C is set to the transmission source address, and the address of the encrypt apparatus 12 is set to the destination, the key seek response packet 35 being transmitted via the encrypt apparatus 15 to the encrypt apparatus 12.

Upon receipt of the key seek response packet 35 from the local port 7 (step S1 of FIG. 5), the encrypt apparatus 15 checks as to whether or not "2" equal to an ID corresponding to the ID of the own encrypt key is set to the local port encrypt key information 24 (step S2). Since no the same ID is set, this encrypt apparatus 15 checks as to whether or not IDs of the same encrypt keys are present in both the local port encrypt key information 24 and the public port encrypt key information 25 (step S13). In this case, since the IDs of the same encrypt keys are present, the transparent relay processing operation is registered as the processing method into the encrypt key table 85 (step S14). Since there is no communication data to be transmitted (step S4) and the communication is not directed to the own encrypt apparatus (step S6), the key seek response packet 35 is relayed to the encrypt apparatus 14 (step S8).

Similarly, the encrypt apparatus 14 which receives the key seek response packet 35 registers into the encrypt key table 84, such an operation that the processing method for the data between the terminal B and the terminal C is the encrypt/decrypt processing method, and the ID of the encrypt key is equal to "3", and relays the key seek response packet 35 to the encrypt apparatus 12.

Upon receipt of the key seek response packet 35 from the public port 7 (step S11 of FIG. 5), the encrypt apparatus 12 checks as to whether or not "3" equal to an ID corresponding to the ID of the own encrypt key is set to the public port encrypt key information 25 (step S12). In this case, since "3" equal to the ID has been set to the public port encrypt key information 25 (step S12), the encrypt apparatus 12 registers into the encrypt key table 82b, such an operation that the encrypt/decrypt processing operation is set as the processing method, and the ID of the encrypt key is equal to "3". Then, the encrypt apparatus 12 checks as to whether or not the communication data buffer 112 contains communication data to be transmitted (step S4). Since the communication data buffer 112 contains the communication data to be transmitted, this communication data is transmitted (step S5). Since the key seek response packet 35 is directed to the own encrypt apparatus 12 (step S6), this key seek response packet 35 is discarded (step S7).

As a consequence, the encrypt apparatus 12 registers into the encrypt key table 82b, such a fact that the processing method between the terminal B and the terminal C is the encrypt/decrypt processing method, and the ID of the encrypt key is equal to 3. Also, the encrypt apparatus 14 registers into the encrypt key table 84, such a fact that the processing method between the terminal B and the terminal C is the encrypt/decrypt processing method, and the ID of the encrypt key is equal to 3. Also, the encrypt apparatus 15 registers such a fact that the processing method between the terminal B and the terminal C is the transparent relay processing method into the encrypt key table 85.

Then the communication data transmitted from the terminal B is encrypted by the encrypt key having the ID of "2" in the encrypt apparatus 13; is encrypted by the encrypt key having the ID of "3" in the encrypt apparatus 12; is decrypted by the encrypt key having the ID of "3" in the encrypt apparatus 14; and is transparently relayed in the encrypt apparatus 15. As a result, the data which reaches the terminal C is under encrypted state by the encrypt key having the ID of "2", namely no communication can be done.

Now, a description will be made of a method for recurring a data communication without my communication trouble even when an encrypt apparatus mistakenly deletes a content of an encrypt key table in accordance with this embodiment.

Figure 18:
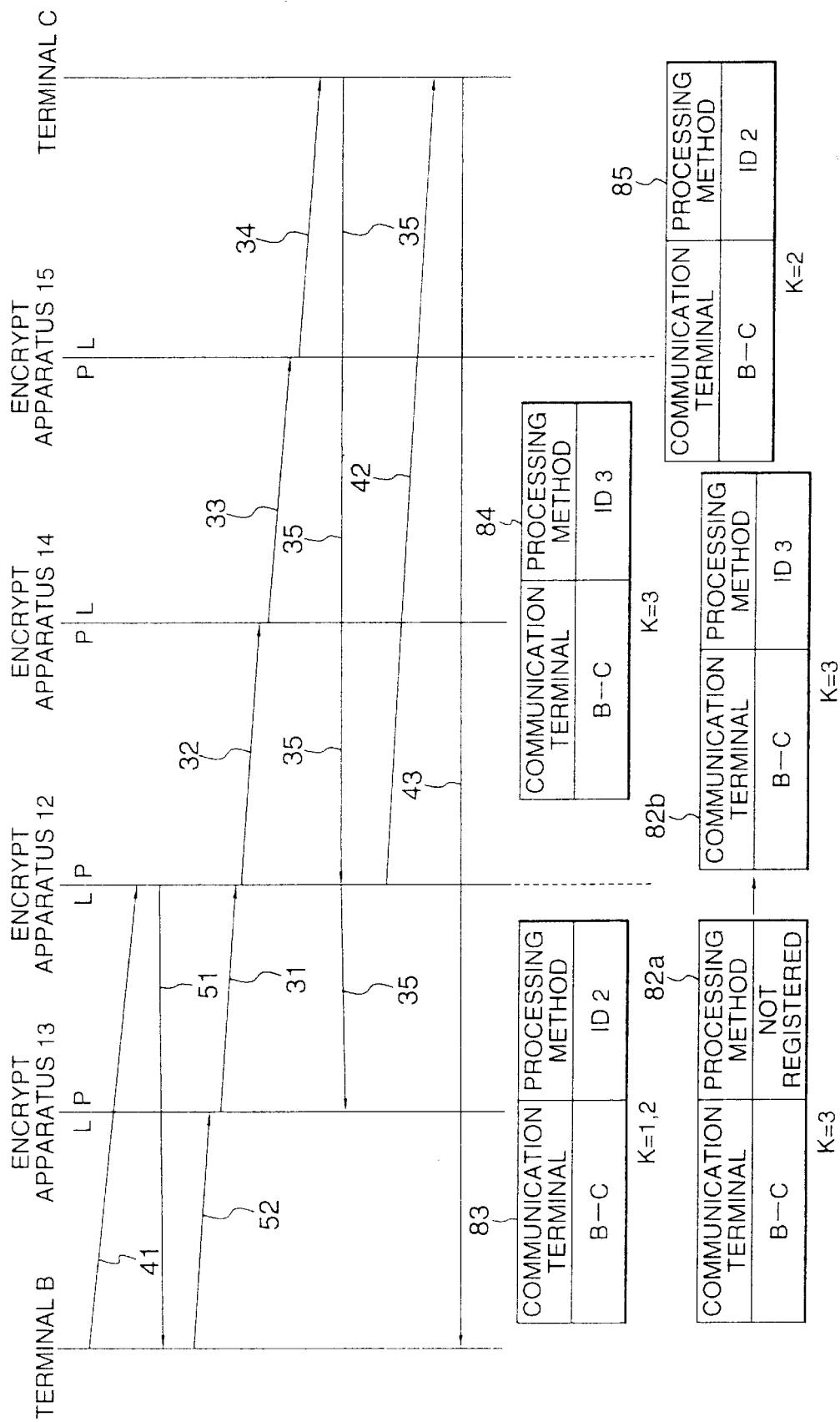
FIG. 18 is a sequence diagram for showing an example in the case when an encrypt key table of an encrypt apparatus is deleted in a network structure according to a sixth embodiment of the present invention, an encryption communication among terminals can be done under normal state.

FIG. 18 is a sequence diagram for describing operations in such a case that while continuing the data communication between the terminal B and the terminal C in FIG. 3, the encrypt key table 82 already learned by the encrypt apparatus 12 is deleted by the failure.

It should also be noted that reference numeral "82a" shown in FIG. 18 indicates a deleted encrypt key table of the encrypt apparatus 12, and reference numeral "82b" denotes a re-registered encrypt key table of the encrypt apparatus 12, reference numeral 83 shows an encrypt key table of the encrypt apparatus 13, reference numeral 84 represents an encrypt key table of the encrypt apparatus 14, and reference numeral 85 shows an encrypt key table of the encrypt apparatus 15.

It is now assumed that the encrypt key table 83 of the encrypt apparatus 13 registers thereinto the encrypt key 2 for the communication data between the terminal B and the terminal C. Further, the encrypt key table 84 of the encrypt apparatus 14 registers thereinto the encrypt key 3 for the communication data between the terminal B and the terminal C. Further, the encrypt key table 85 of the encrypt apparatus 15 registers thereinto the encrypt key 2 for the communication data between the terminal B and the terminal C.

Figure 19:
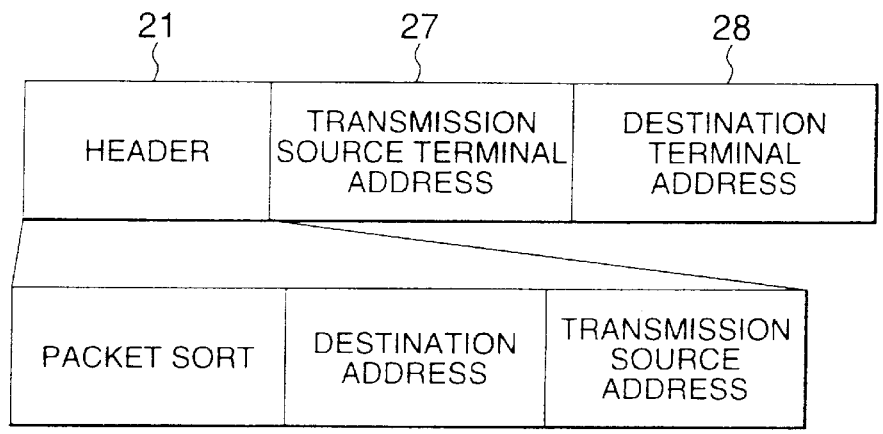
FIG. 19 schematically shows frame structures of a key seek request packet and a key seek request response packet according to the sixth embodiment of the present invention.

FIG. 19 schematically represents a format of a key seek packet. In FIG. 19, reference numeral 21 shows a header which contains a sort of a packet, a destination address of the key seek packet (terminal B in this example), a transmission source address (encrypt apparatus 12 in this example) of the key seek packet, and so on. Reference numeral 27 is a transmission source terminal of the communication data received by an encrypt apparatus. Reference numeral 24 is an address of a destination terminal of communication data received by an encrypt apparatus.

Figure 20:
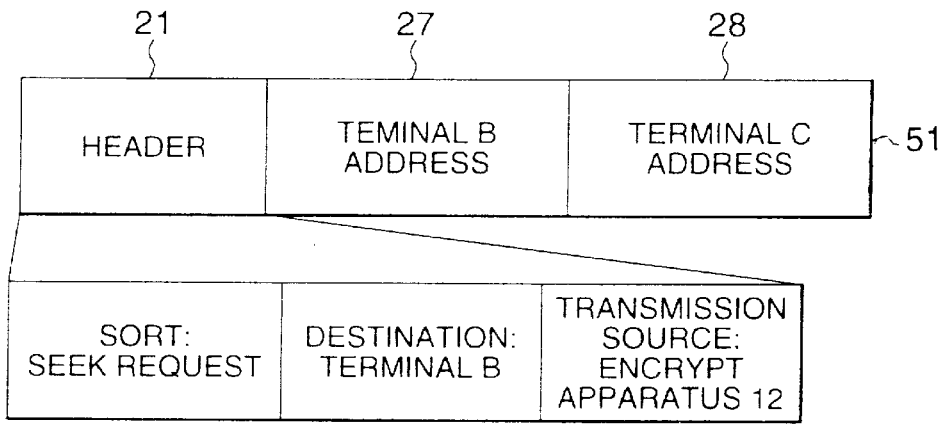
FIG. 20 schematically represents the frame of the key seek request packet according to the sixth embodiment of the present invention.

FIG. 20 represents an example of a key seek request packet 51, in which a terminal "B" address is set to the transmission source terminal address 27, and a terminal "C" address is set to the destination terminal address 28.

Figure 21:
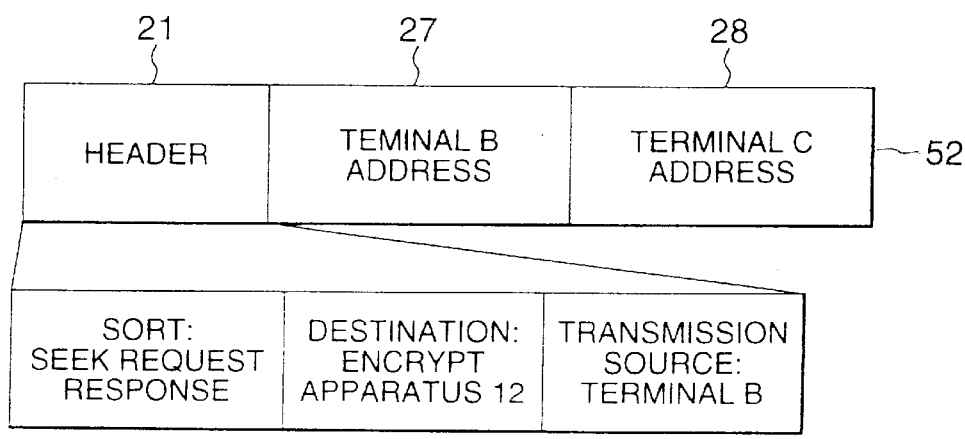
FIG. 21 schematically shows the frame of the key seek request response packet according to the sixth embodiment of the present invention.

FIG. 21 represents an example of a key seek request packet 52, in which a terminal "B" address is set to the transmission source terminal address 27, and a terminal "C" address is set to the destination terminal address 28.

Next, operations will now be described. The encrypt apparatus 13 which receives the communication data 41 transmitted from the terminal B via the local port 7 relays the communication data 41 encrypted by the encrypt key having the ID of "2" to the encrypt apparatus 12 in accordance with the processing method registered in the encrypt key table 83.

Since the processing method for the communication data between the terminal B and the terminal C is not registered into the encrypt key table 82a, the encrypt apparatus 12 which receives the encrypted communication data 41 sets the address of the terminal B to the transmission source terminal address 27 of the key seek request packet 51, and also sets the address of the terminal C to the destination terminal address 28, as shown in FIG. 20. Also, the encrypt apparatus 12 transmits the key seek packet 51 to the transmission source terminal request of the communication data, namely the terminal B, while in the header 21 of this key seek packet 51, the key seek packet is set to the packet sort; the address of the encrypt apparatus 12 is set to the transmission source address; and the address of the terminal B is set to the destination address. Further, the communication data 41 is stored in the communication data buffer 112.

Since the reception packet corresponds to the key seek request packet 51 directed to the terminal B, the encrypt apparatus 13 which receives the key seek request packet 51 relays this packet 51 to the terminal B. As indicated in FIG. 20 and FIG. 21, the terminal B which receives the key seek request packet 51 copies both the transmission source terminal address 27 and the destination terminal address 28 to the transmission source terminal address 27 and the destination terminal address 28 of the key seek request response packet 52. The encrypt apparatus 13 transmits the key seek request response packet 52, while in the header 21 of the key seek request response packet 52, the key seek request response packet is set to the packet sort; the address of the terminal B is set to the transmission source address; and the address of the terminal C encrypt apparatus 12 is set to the destination address.

The encrypt apparatus 13 which receives the key seek request response packet 52 copies the transmission source terminal address 27 set into the key seek request response packet 52 to the transmission source terminal address 27 of the key seek packet 31, and also copies the transmission source address 28 set into the key seek request response packet 52 to the destination terminal address 28.

In this case, the address of the terminal B is set into the transmission source terminal address 27, and the address of the terminal C is set into the destination terminal address 28. Also, the key seek packet 31 is transmitted, while in the header 21 of the key seek packet 31, the key seek packet is set to the packet sort; the address of the encrypt apparatus 13 is set to the transmission source address; and the address of the terminal C is set to the destination address. Then, the encrypt apparatus 13 discards the received key seek request response packet 52 irrespective to any destination address of the header 21 of the key seek request response packet 52.

It should be noted that a subsequent process step of the key seek packet is the same as that of the embodiment 2. The encrypt apparatus 13 sends out the key seek packet 31 via the encrypt apparatuses 12, 14, 15 to the terminal C. The encrypt apparatus 13 which transmits the key seek packet 31, and the encrypt apparatuses 12, 14, 15 which relay the key seek packet 31 transmit the key seek packets 32, 33, 34 produced by adding the ID of the own encrypt key to the key seek packets 31, 32, 33. In other words, the encrypt apparatuses 13 and 12 set the ID of the own encrypt key to the local port encrypt key information 24, whereas the encrypt apparatuses 14 and 15 set the ID of the own encrypt key to the public port encrypt key information 25.

The terminal C which receives the key seek packet 34 copies the data portion 26 of the key seek packet 34 to the data portion 26 of the key seek response packet 35. Then, the key seek response packet 35 is transmitted via the encrypt apparatus 15 to the encrypt apparatus 13. It should also be noted that in the header 21 of the key seek response packet 35, the key seek response packet is set to the packet sort, the address of the terminal C is set to the transmission source address, and the address of the encrypt apparatus 13 is set to the destination, and this key seek response packet 35 is transmitted.

Upon receipt of the key seek response packet 35 from the local port 7 (step S1 of FIG. 5), the encrypt apparatus 15 retrieves as to whether or not "2" equal to an ID corresponding to the ID of the own encrypt key is set to the local port encrypt key information 24 (step S2).

In this case, since "2" equal to the ID set by the encrypt apparatus 15 has been set to the local port encrypt key information 24 of the key seek response packet 35, the encrypt apparatus 15 registers into the encrypt key table 85 shown in FIG. 18, such an operation that the communication data 41 between the terminal B and the terminal C is encrypted/decrypted by the encrypt key having the ID equal to "2" (step S3). Since the communication data buffer contains no communication data 41 to be transmitted (step S4) and the destination address of the header 21 of the key seek response packet 35 is not addressed to the own encrypt apparatus 15 (step S6), the encrypt apparatus 15 relays the received key seek response packet 35 to the encrypt apparatus 14 (step S8).

Subsequently, similarly, in accordance with the flow chart shown in FIG. 5, upon receipt of the key seek response packet 35 from the local port 7, the encrypt apparatus 14 retrieves the ID of the encrypt key registered in the local port encrypt key information 24 of the key seek response packet 35, and then acquires the encrypt key having the ID of "3". Then, this encrypt apparatus 14 registers into the own encrypt key table 84, such an operation that the communication data between the terminal B and the terminal C is encrypted/decrypted based on the encrypt key having the ID of "3", and also relays the key seek response packet 35 to the encrypt apparatus 12.

Also, upon receipt of the key seek response packet 35 from the public port 5, the encrypt apparatus 12 retrieves the ID of the encrypt key set to the public port encrypt key information 25 of the key seek response packet 35 to acquire the encrypt key having the ID of "3". Then, the encrypt apparatus 12 encrypts the communication data 41 which has been stored in the communication data buffer 112 and is derived from the local port 7 in accordance with the content of the encrypt key table 82 in the encrypt/decrypt processing unit 2 with employment of the encrypt key 3. Then, this encrypt apparatus 12 transmits the encrypted communication data 42 via the encrypt apparatus 14 to the terminal C.

Also, the key seek response packet 35 is relayed to the encrypt apparatus 13. Upon receipt of the key seek response packet 35 from the public port 5, the encrypt apparatus 13 retrieves the ID of the encrypt key set into in the public port encrypt key information 25 of the key seek response packet 35, and then acquires the encrypt key having the ID of "2". Then, this encrypt apparatus 13 registers into the own encrypt key table 83, such an operation that the communication data between the terminal B and the terminal C is encrypted/decrypted based on the encrypt key having the ID of "2". Subsequently, similar to the embodiment 1, since the destination address contained in the header 21 of the key seek response packet 35 is addressed to the encrypt apparatus 13, the encrypt apparatus 13 discards the key seek response packet 35.

The encrypt apparatus 12 which receives the communication data 42 encrypted by the encrypt apparatus 13 from the local port 7 encrypts this communication data 42 based on the encrypt key 3 in accordance with the content of the encrypt key table 82, and the encrypt apparatus 14 decrypts the communication data 42 by the encrypt key 3 via the public ports 5 in accordance with the content of the encrypt key table 84. Then, the communication data from the public port 5 is decrypted by the encrypt key 2 in the encrypt apparatus 15 in accordance with the content of the encrypt key table 85, and thus the decrypted communication data is allowed to reach via the local port 7 to the terminal C. As a consequence, when the communication data 41 derived from the terminal B is relayed, the encrypt apparatus 12 encrypts this data 41 by the encrypt key having ID2 in accordance with the encrypt key table 83; the encrypt apparatus 13 encrypts this data 41 by the encrypt key having ID3 in accordance with the encrypt key table 82b; the encrypt apparatus 14 decrypts this data 41 by the encrypt key having ID3 in accordance with the encrypt key table 84; and the encrypt apparatus 15 decrypts this data 41 by the encrypt key having ID2 in accordance with the encrypt key table 85 to thereby send the resultant data to the terminal C.

The communication data 43 sent from the terminal C to the terminal B is encrypted based on the content of the encrypt key table 85 by the encrypt apparatus 15, and also the communication data 43 derived from the local port 7 is encrypted by the encrypt key 2. The communication data 43 derived from the local port 7 is encrypted by the encrypt key 3 in accordance with the content of the encrypt key table 84 by the encrypt apparatus 14. Also, the communication data 43 derived from the public port 5 is decrypted based on the encrypt key 3 in accordance with the content of the encrypt key table 82 by the encrypt apparatus 12. Also, the communication data 43 from the public port 5 is decrypted by the encrypt key 2 in the encrypt apparatus 13 in accordance with the content of the encrypt key table 83, and thus the decrypted communication data is allowed to reach via the local port 7 to the terminal B.

As previously described, the bidirectional encrypt communication can be carried out by using the key seek packet under such a condition that the encrypt key of the communication counter party is unknown.

As explained above, since the key seek packet is transmitted from the encrypt apparatus 13 which is located at the nearest position from the transmission source terminal of the communication data, even when the encrypt apparatus deletes the encrypt key table, the encrypt communication can be established without any contradictories, and also the encrypt key learning operation can be performed.

In the above embodiment, the key seek request packet has been transmitted to the transmission source terminal of the communication data. Alternatively, even when this key seek request packet is transmitted to the destination terminal of the communication data, a similar effect may be achieved.

Also, a similar effect may be achieved by employing the following alternative operation. That is, the key seek packet is firstly transmitted to the terminal B corresponding to the transmission source terminal of the communication data from the encrypt apparatus 12 without sending the key seek request packet. Then, the information about the ID of the encrypt key owned by the encrypt apparatus 13 is once acquired by the encrypt apparatus 12, and the key seek packet having the acquired information is transmitted from the encrypt apparatus 12. This key seek packet is such a key seek packet in which the data portion thereof is set in such a manner that as if this packet were transmitted from the encrypt apparatus 13, and the encrypt apparatus 12 additionally sets the ID of the own encrypt key.

Although the key seek packet has been transmitted to the destination terminal in the above example, this key seek packet may be sent to an encrypt apparatus for storing this destination terminal. In this case, the key seek packet is notified to the encrypt apparatus on the relay path from such an encrypt apparatus for acquiring the encrypt key information of the encrypt apparatus appearing on the relay path and for string the destination terminal.

Also, the key seek packet may not be transmitted from the encrypt apparatus provided on the side of the transmission source terminal, but may be transmitted from the encrypt apparatus for storing the transmission source terminal. In this case, the encrypt apparatus provided on the side of the transmission source terminal instructs the encrypt apparatus for storing the transmission source terminal to send out the key seek packet. The key seek packet transmitted from the designated encrypt apparatus acquires the encrypt key information of the encrypt apparatus on the relay path, and then the key seek packet is notified from the destination terminal to the encrypt apparatus on the relay path.

Embodiment 6

An encryption communication system, according to an embodiment 6 of the present invention, is featured by that encrypt key information corresponding to a combination of the communication terminals (will be referred to as a "terminal pair" hereinafter) which do not execute the data communication during a preselected time period in the embodiment 5 is deleted from an encrypt key table.

Every terminal pair of encrypt key tables, holding time of, for example, 600 seconds as an initial value is owned as shown in FIG. 22. The automatic learn processing unit 6 counts down this holding time every a constant time period, for instance, every 1 second. When the count value becomes zero, the registered encrypt key information of this terminal pair is deleted from the encrypt key table. If the same terminal pair issues again a request for relaying communication data after deleting this encrypt key information under such a condition that the encrypt key information of the deleted terminal pair has not yet been registered into the encrypt key table, then the encrypt key learn processing operation is carried out to restart the data communication, as shown in the embodiment 5.

Also, when the holding time is not equal to 0, namely the terminal pair issues a request to relay communication data within 600 seconds, the holding time is set to the initial value, for example, 600 seconds. Then, the processing method of the encrypt key information is continuously saved in the encrypt key table.

With respect to the registering operation of the encrypt key table registered in the embodiment 5, as indicated in FIG. 22, when the encrypt key table exceeds the holding time limit, the registering operation of this encrypt key table is deleted. As a result, such encrypt key information of a terminal pair whose communication frequency is low is no longer stored into the encrypt key table, so that the storage capacity of the encrypt key table can be lowered.

Also, even when a terminal is moved and thus a communication path is changed, since encrypt key information obtained before the communication path is changed is deleted after preselected time has passed, the communication path can be readily changed.

Alternatively, the initial value of the holding time may be changed based on the relay conditions such as the encrypt key under use, encryption, transparent relay, and discard.

Embodiment 7

An encryption communication system, according to an embodiment 7 of the present invention, is featured by that an external terminal communication mode for instructing either a transparent relay processing method or a discard processing method is provided with a corresponding encrypt apparatus; and if a relay section during which no encrypt communication is carried out is present within a relay section during which an encrypt communication is performed between two terminals, then an external terminal communication mode of an encrypt apparatus within this relay section is set to either the transparent relay processing method or the discard processing method. As a consequence, the communication data can be transparent-processed, or discard-processed.

A first description will now be made of such an example that an encrypt data communication is performed via one encrypt apparatus between two terminals. A subsequent description will be made of such an example that an encrypt data communication is performed via a plurality of encrypt apparatuses between two terminals.

Figure 23:
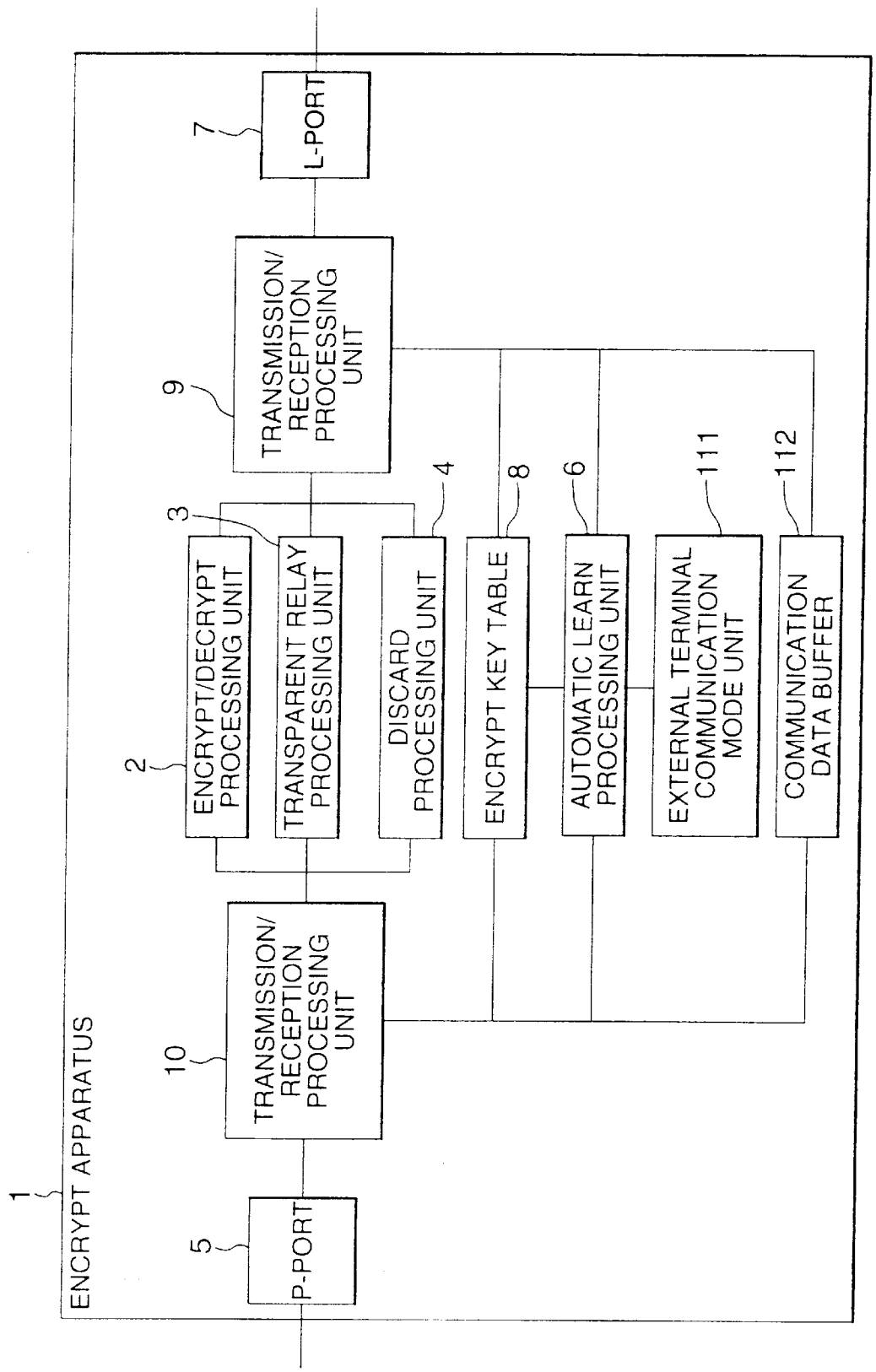
FIG. 23 is a structural diagram for indicating encrypt apparatuses according to seventh and eighth embodiments of the present invention.

FIG. 23 schematically indicates a structural example of an encrypt apparatus for constituting the encryption communication system of the present invention. In FIG. 23, reference numerals 1 to 10 and 112 are similar to those of the embodiment 1, and therefore, descriptions thereof are omitted. Also, reference numeral 111 denotes an external terminal communication mode setting unit, which is provided with the corresponding encrypt apparatus. This external terminal communication mode setting unit instructs that communication data is transparent-processed, or discard-processed. When an encrypt key table is learned, the automatic learn processing unit 6 refers to this external terminal communication mode setting unit 111. It should be understood that both a key seek packet and a key seek response packet have the formats identical to those of the embodiment 1.

Figure 24:
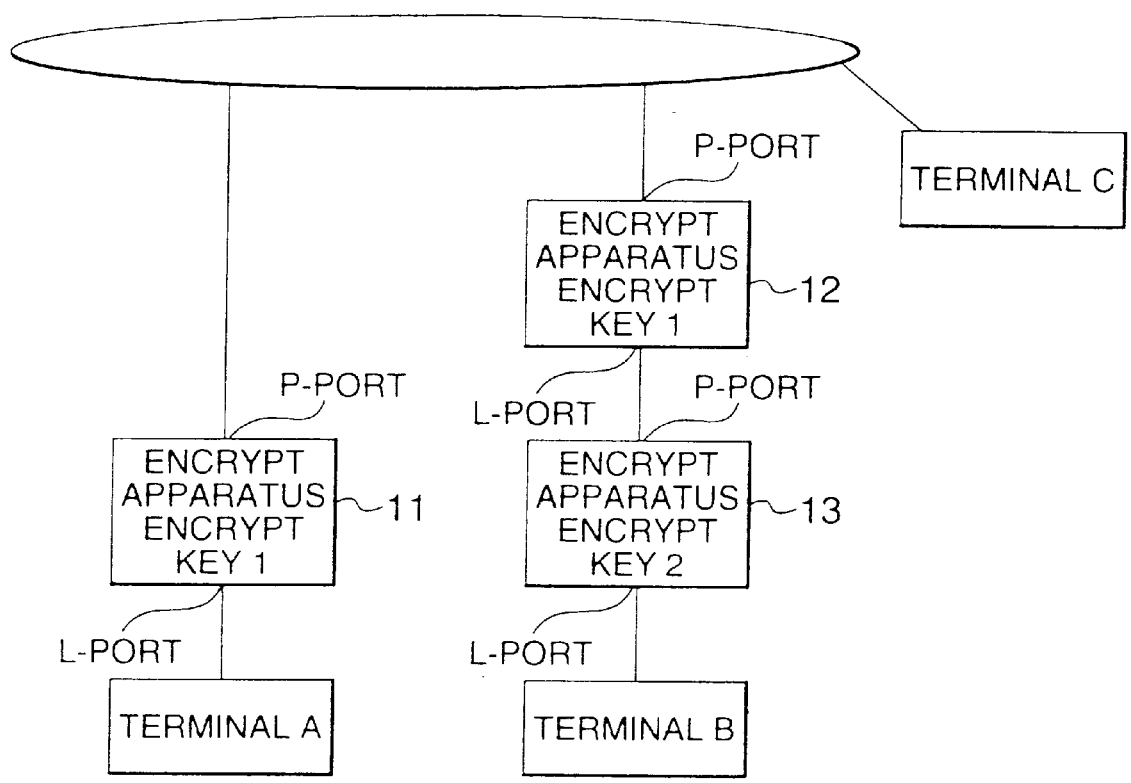
FIG. 24 schematically shows network structures according to the seventh and eighth embodiments of the present invention.

FIG. 24 schematically indicates a structural example of a network for storing terminals A, B, C. In this drawing, reference numeral 11 is an encrypt apparatus holding an encrypt key with an ID of "1", reference numeral 12 shows an encrypt apparatus holding an encrypt key with an ID of "1", and reference numeral 13 indicates an encrypt apparatus holding an encrypt key with an ID of "2". When encrypt data is decrypted, these encrypt apparatuses use the encrypt keys corresponding to these IDs. In other words, the encrypt keys to be allocated to the respective encrypt apparatuses are previously delivered to be registered. Each of the encrypt apparatuses holds therein one or plural own encrypt key IDs. It is now assumed that no key information has been registered into the encrypt key tables 8 employed in the respective encrypt apparatuses at an initial stage.

It should be noted that in this drawing, an L-port shows the local port 7, and a P-port indicates the public port 5. Also, the public port 5 of the encrypt apparatus 11 is connected to the public port 5 of the encrypt apparatus 11 shown in FIG. 24. In other encrypt apparatuses, the public port 5 is connected to the local port 7.

Next, a description will now be made of operations in such a case that a communication is carried out via one encrypt apparatus between two terminals.

In the beginning, while the external terminal communication mode setting unit 111 of the encrypt apparatus 11 shown in FIG. 24 is set to the transparent relay processing method, learning process operations of the encrypt key table 81 when the communication starts from the terminal A and is made with the terminal C will be indicated.

Figure 25:
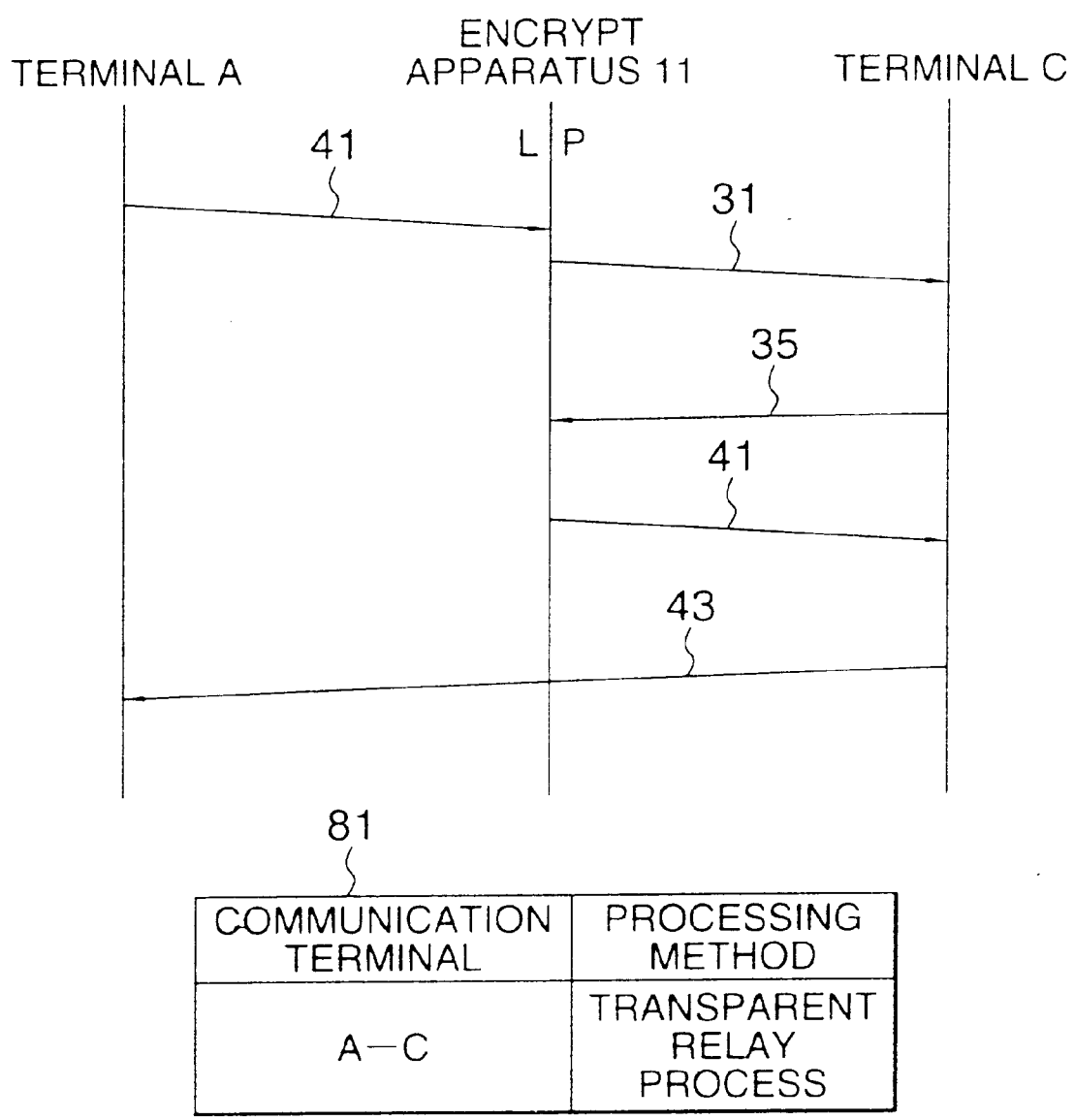
FIG. 25 is a sequence diagram for indicating such an example that an encryption communication is carried out between terminals A and C via one encrypt apparatus where an external terminal communication mode is set as a transparent relay in the network structure of the seventh embodiment of the present invention.

FIG. 25 shows a sequence diagram for explaining a key seek packet used to learn the encrypt key table 81 in such a case that when the data is communicated from the terminal "A" to the terminal "C", no processing method is registered into the encrypt key table 81 of the encrypt apparatus 11 in correspondence with a pair of a transmission source terminal and a destination terminal of the communication data received from the terminal A.

In this drawing, reference numerals 41, 43 are communication data, reference numeral 31 shows a key seek packet transmitted from the encrypt apparatus 11. Also, reference numeral 35 indicates a key seek response packet received from the terminal C, and reference numeral 81 is an encrypt key table of the encrypt apparatuses 11.

Figure 26:
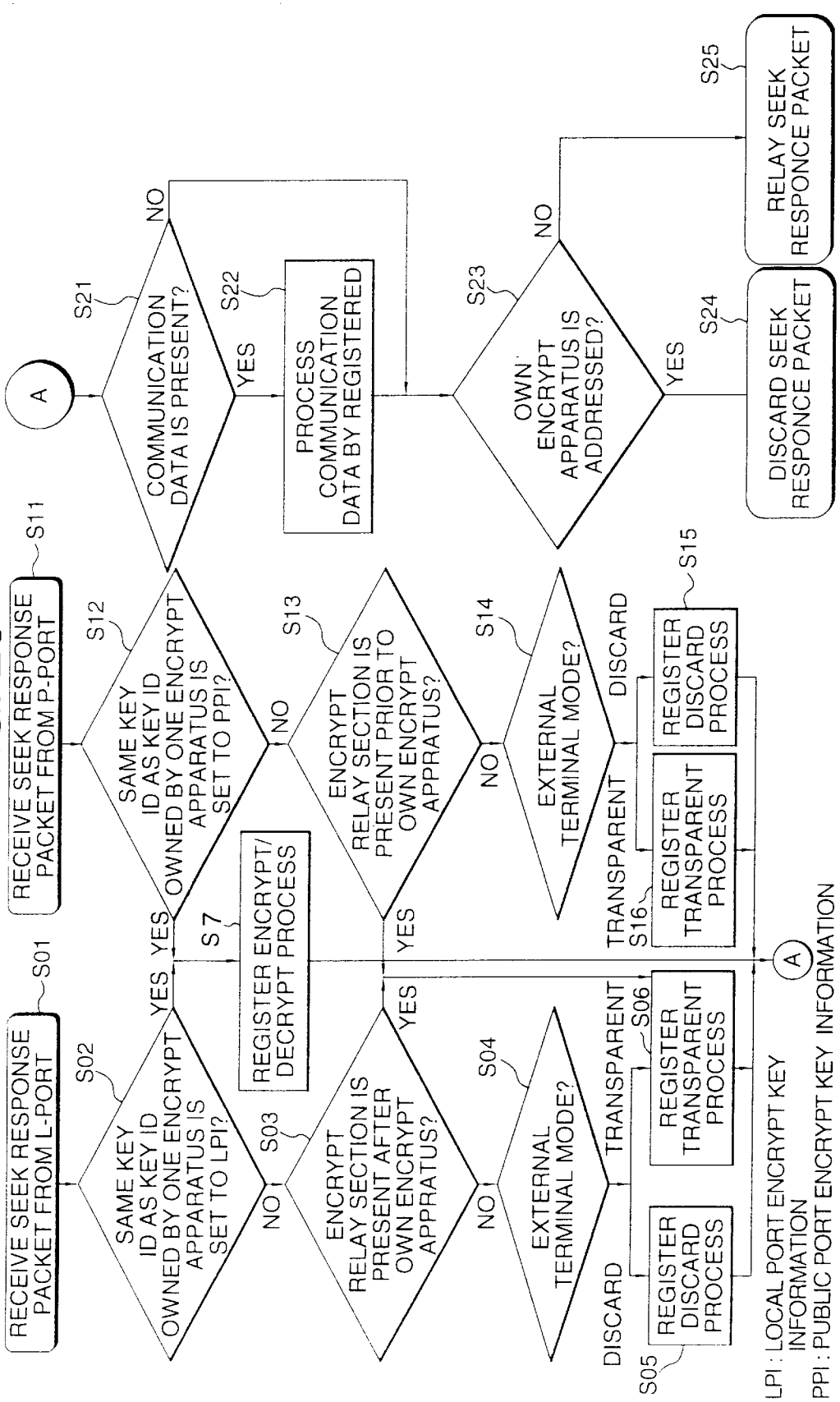
FIG. 26 schematically indicates a process flow operation of a key seek response packet according to the seventh embodiment of the present invention.

FIG. 26 shows a process flow chart for describing operation when an encrypt apparatus receives a key seek response packet. It should be understood that symbol "LPI" shown in this drawing indicates local port encrypt key information 24, and symbol "PPI" denotes public port encrypt key information 25. It should also be noted that formats of the key seek packet and the key seek response packet are indicated as those shown in FIG. 2 of the embodiment 1.

Figure 27:
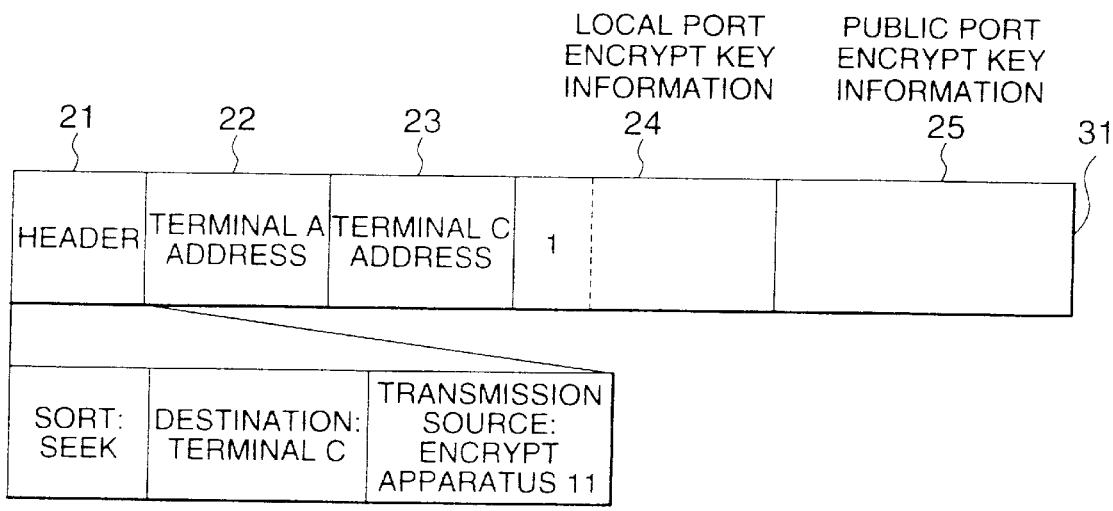
FIG. 27 schematically represents a frame of a key seek packet shown in FIG. 25.

Next, operations will now be explained with reference to FIG. 25 and FIG. 26. The encrypt apparatus 11 which receives the communication data 41 from the terminal A via the local port 7 retrieves the internally provided encrypt key table 81. Since the processing method of the communication between the terminal A and the terminal C is not registered, this encrypt apparatus 11 stores the received communication data 41 into the communication data buffer 112. Thereafter, the encrypt apparatus 11 edits the key seek packet 31 as indicated in FIG. 27. In other words, in the header 21 of the key seek packet 31, the key seek packet is set to the packet sort, the terminal C is set to the destination address, the transmission source encrypt apparatus 11 is set to the transmission source address, the address of the terminal A is set to the transmission source terminal address 22, and the address of the terminal C is set to the destination terminal address 23. Then, 1" is set to the local port encrypt key information 24, which is equal to the encrypt key ID owned by the encrypt apparatus 11, but nothing is set to the public port encrypt key information 25. Thus, the key seek packet 31 (FIG. 27) is transmitted to the terminal C.

Figure 28:
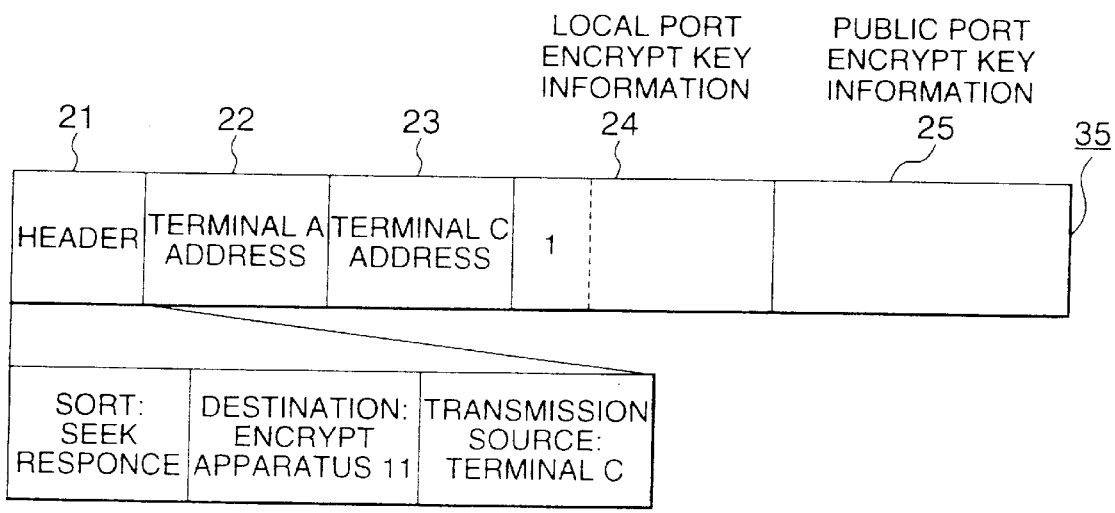
FIG. 28 schematically represents a frame of a key seek response packet shown in FIG. 25.

Next, the terminal C which receives the key seek packet 31 edits the key seek response packet 35 as shown in FIG. 28. That is, this terminal C copies the data portion of the key seek packet 31 to the data portion of the key seek response packet 35. Then, in the header 21 of the key seek response packet 31, the key seek response packet is set to the packet sort, the address of the terminal C is set to the transmission source address, and the address of the encrypt apparatus 11 is set to the destination address, which is transmitted to the encrypt apparatus 11.

Upon receipt of the key seek response packet 35 from the public port 5 (step S11 of FIG. 26), the encrypt apparatus 11 retrieves as to whether or not "1" equal to an ID corresponding to the ID of the own encrypt key is set to the public port encrypt key information 25 (step S12).

In this case, since "1" equal to the ID set by the encrypt apparatus 11 is not set to the public port encrypt key information 25 of the key seek response packet 35, the encrypt apparatus 11 checks as to whether or not there is anencrypted relay section located prior to the own encrypt apparatus. In other words, a check is made as to whether or not there is such an encrypt apparatus, which receives the key seek packet prior to the own encrypt apparatus, having an encrypt key ID coincident with the encrypt key ID registered in the public port encrypt key information 25 among the encrypt apparatuses in which the information has been set to the local port encrypt key information 24. That is to say, a judgment is made as to whether or not the own encrypt apparatus is located in the encrypt section (step S13). There is no encrypt apparatus having the coincident key ID. In other words, since the own encrypt apparatus is not located in the encrypt section, the external terminal communication mode setting unit 111 is referred (step S14). As a result, since the external terminal communication mode is set to the transparent processing method, such an operation that the communication data between the terminal A and the terminal C is transparently relayed is registered into the encrypt key table 81 (step S16).

Then, the communication data 41 stored in the communication data buffer 112, the communication data between the terminal A and the terminal C is transparently relayed (steps S21, S22) in accordance with the content of the encrypt key table 81. Also, the key seek response packet 35 directed to the own encrypt apparatus (step S23) is discarded (step S24). As a result, the communication data 41 is allowed to reach to the terminal C without being encrypted. Also, the communication data 43 from the terminal C is allowed to reach to the terminal A without any encryption while being transparently relayed in accordance with the content of the encrypt key table 81 in the encrypt apparatus 11. As previously explained, the encrypt apparatus 11 transparently relays the communication data 41 and 43 between the terminal A and the terminal C in accordance with the content of the encrypt key table 81 in accordance with the sequence shown in FIG. 25.

Next, operations in such a case that the external terminal communication mode of the encrypt apparatus 11 is set to the discard processing method in the above example will now be described.

When the encrypt apparatus 11 refers to the external terminal communication mode setting unit 111 at the step S14 of FIG. 26 and the discard processing method is set, this encrypt apparatus 11 registers into the encrypt key table 81, such an operation that the communication data between the terminal A and the terminal C is discard-processed (step S15). Thereafter, the encrypt apparatus 11 discards the communication data 41 stored in the communication data buffer 112 in accordance with the content of the encrypt key table 81 (steps S21, S22). Also, the key seek response packet 35 directed to the own encrypt apparatus (step S23) is discarded (step S24).

Figure 29:
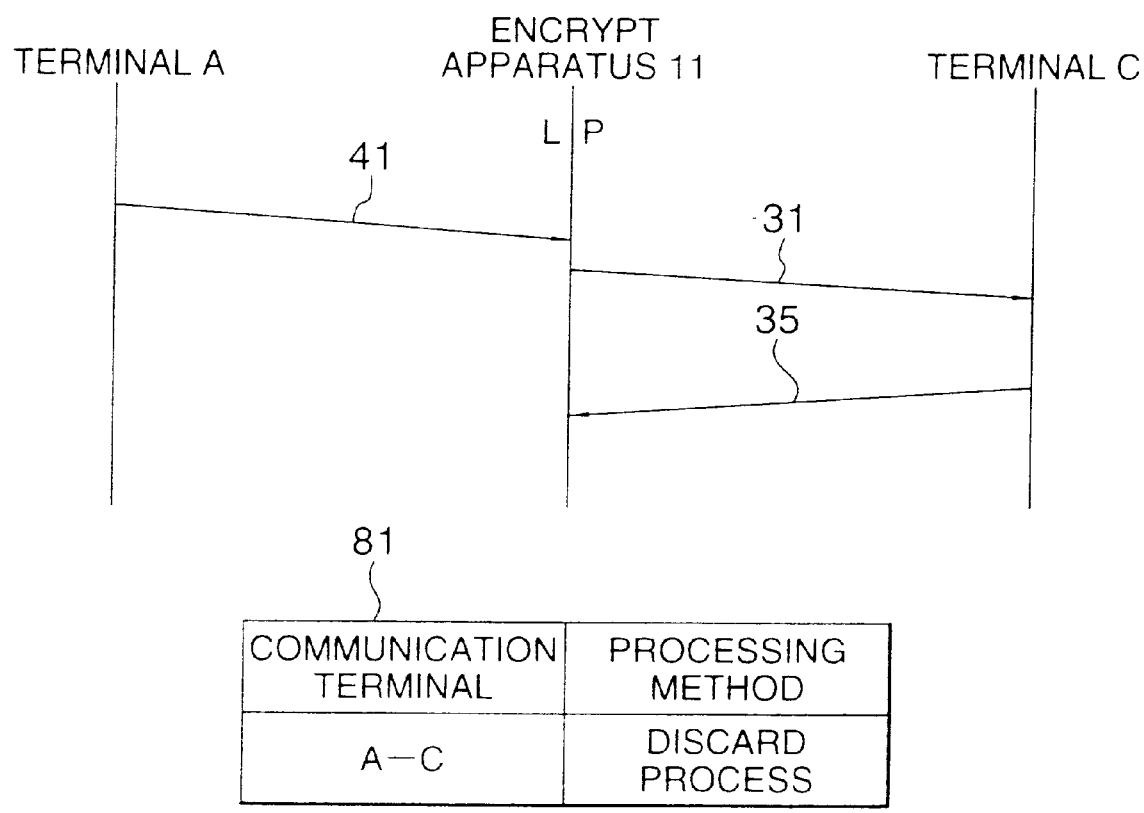
FIG. 29 is a sequence diagram for indicating such an example that an encryption communication is carried out between terminals A and C via one encrypt apparatus where the external terminal communication mode is set to a discard processing in the network structure according to the seventh embodiment of the present invention.

As previously explained, the encrypt apparatus 11 discards the communication data 41 derived from the terminal A in accordance with the content of the encrypt key table 81 in accordance with the sequence shown in FIG. 29. Therefore, in the encrypt apparatus 11 outside the encrypted relay section, the communication data between the terminals can be transparent-relayed, or discarded by setting the external terminal communication mode setting unit 111.

Next, a description will now be made of operation in such a case that a communication is carried out via a plurality of encrypt apparatus between two terminals.

In FIG. 24, when a communication is established from the terminal A to the terminal B, both the encrypt apparatus 11 and the encrypt apparatus 12 own the same encrypt keys and constitute an encrypted relay section. The encrypt apparatus 13 owns a different encrypt key, and further the external terminal communication mode setting unit 111 of the encrypt apparatus 13 is set to the transparent relay processing method.

Figure 30:
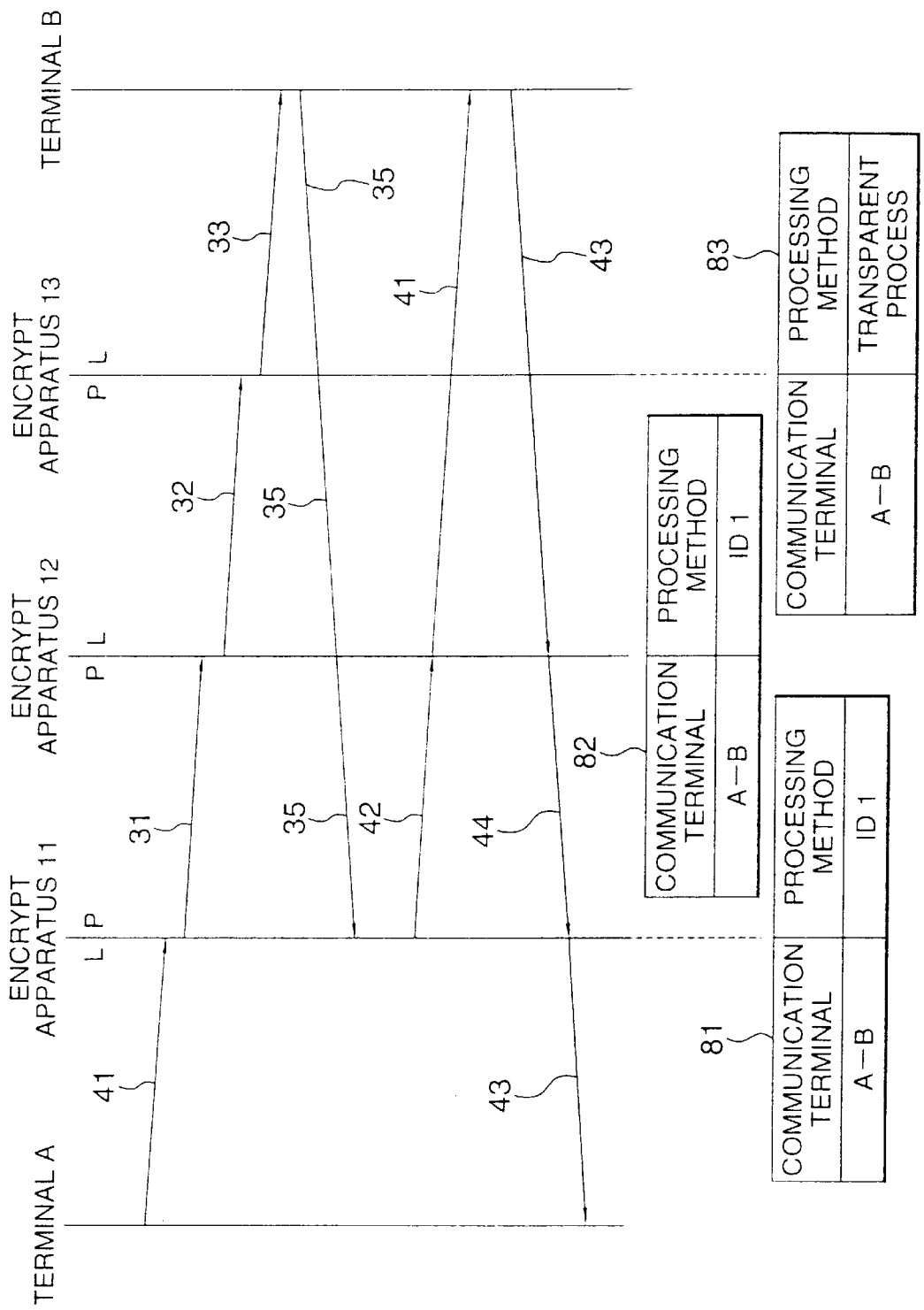
FIG. 30 is a sequence diagram for indicating such an example that an encryption communication is carried out between terminals A and B via plural encrypt apparatuses where the external terminal communication mode is set to the transparent relay in the network structure according to the seventh embodiment of the present invention.

FIG. 30 shows a sequence diagram for explaining a key seek packet used to learn the encrypt key table 81 in such a case that when the data is communicated from the terminal A to the terminal B, no processing method is registered into the encrypt key table 81 of the encrypt apparatus 11 in correspondence with a pair of a transmission source terminal and a destination terminal of the communication data received from the terminal A.

In this drawing, reference numerals 41, 42, 43, 44 are communication data, reference numeral 31 shows a key seek packet transmitted from the encrypt apparatus 11. Also, reference numeral 32 indicates a key seek packet in which an ID of an encrypt key of the encrypt apparatus 12 is added to the key seek packet 31 by the encrypt apparatus 12. Reference numeral 33 is a key seek packet in which an ID of an encrypt key of the encrypt apparatus 13 is added to the key seek packet 32 by the encrypt apparatus 13. Reference numeral 35 shows a key seek response packet sent from the terminal B. Also, reference numeral 81 denotes an encrypt key table of the encrypt apparatus 11, reference numeral 82 shows an encrypt key table of the encrypt apparatus 12, and reference numeral 83 represents an encrypt key table of the encrypt apparatus 13.

Next, operations will now be explained. The encrypt apparatus 11 which receives the communication data 41 from the terminal A to the terminal B via the local port 7 retrieves the internally provided encrypt key table 81. Since the processing method of the communication between the terminal A and the terminal B is not registered, this encrypt apparatus 11 stores the received communication data 41 into the communication data buffer 112.

Figure 31:
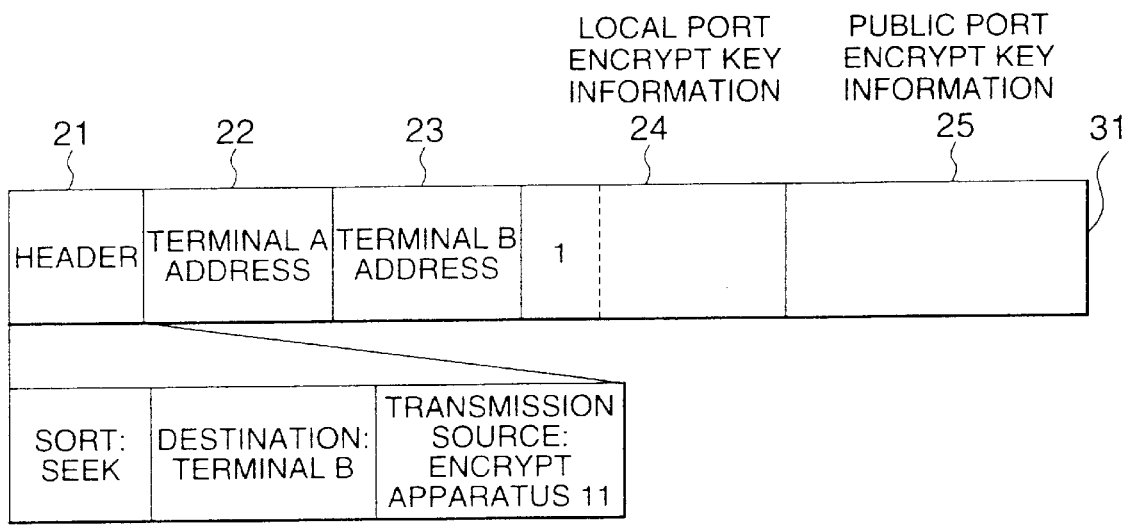
FIG. 31 schematically shows a frame of a key seek packet 31 indicated in FIG. 30.

Thereafter, the encrypt apparatus 11 edits the key seek packet 31 as indicated in FIG. 31. In other words, in the header 21 of the key seek packet 31, the key seek packet is set to the packet sort, the destination terminal B is set to the destination address, transmission source encrypt apparatus 11 is set to the transmission source address, the terminal A address is set to the transmission source terminal address 22, and the address of the terminal B is set to the destination terminal address 23. Then, "1" is set to the local port encrypt key information 24, which is equal to the encrypt key ID owned by the encrypt apparatus 11, but nothing is set to the public port encrypt key information 25. Thus, the key seek packet 31 (FIG. 31) is transmitted to the terminal B.

Figure 32:
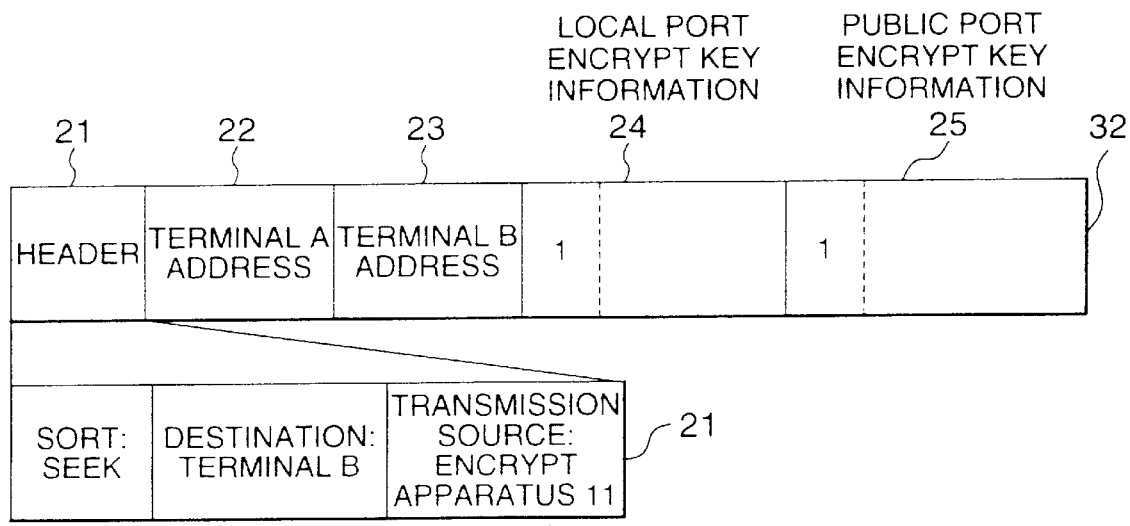
FIG. 32 schematically shows a frame of a key seek packet 32 indicated in FIG. 30.

The encrypt apparatus 12 which receives the key seek packet 31 from the public port 5 additionally sets "1" equal to the ID of the own encrypt key into the public port encrypt key information 25, and then transfers the key seek packet 32 (FIG. 32) to the local port 7.

The encrypt apparatus 13 which receives the key seek packet 32 from the public port 5 additionally sets "2" equal to the ID of the own encrypt key into the public port encrypt key information 25, and then transfers the key seek packet 33 (FIG. 33) to the local port 7.

The terminal B which receives the key seek packet 33 copies the data portion of the key seek packet 33 to the data portion of the key seek response packet 35. This terminal B transmits a key seek response packet 35 shown in FIG. 34 to the encrypt apparatus 11. Then, in the header 21 of this key seek response packet 35, the key seek response packet is set to the packet sort, the address of the terminal B is set to the transmission source adress, and the address of the encrypt apparatus 11 is set to the destination address, as indicated in FIG. 34.

Upon receipt of the key seek response packet 35 from the local port 7 (step S01 of FIG. 26), the encrypt apparatus 13 retrieves as to whether or not "2" equal to an ID corresponding to the ID of the own encrypt key is set to the local port encrypt key information 24 (step S02).

In this case, since "2" equal to the ID set by the encrypt apparatus 13 is not set to the local port encrypt key information 24 of the key seek response packet 35, the encrypt apparatus 13 checks as to whether or not there is an encrypted relay section located after the own encrypt apparatus. In other words, a check is made as to whether or not there is such an encrypt apparatus, which receives the key seek packet prior to the own encrypt apparatus, having an encrypt key ID coincident with the encrypt key ID registered in the local port encrypt key information 24 among the encrypt apparatuses in which the information has been set to the public port encrypt key information 25 (step S03).

In this case, there is no encrypt apparatus having the coincident key ID. In other words, since the own encrypt apparatus is not located in the encrypt section, the encrypt apparatus 13 refers to the external terminal communication mode setting unit 111 (step S04). As a result, since the external terminal communication mode is set to the transparent processing method, such an operation that the communication data between the terminal A and the terminal B is transparently relayed is registered into the encrypt key table 83 (step S06). Since the communication data buffer 112 contains no communication data to be transmitted (step S21) and the destination address of the header 21 of the key seek response packet 35 is not addressed to the own encrypt apparatus 13 (step S23), the encrypt apparatus 13 relays the received key seek response packet 35 to the encrypt apparatus 11 (step S25).

Upon receipt of the key seek response packet 35 from the local port 7 (step S01 of FIG. 26), the encrypt apparatus 12 retrieves as to whether or not "1" equal to an ID of an encrypt key corresponding to the ID of the own encrypt key is set to the local port encrypt key information 24 of the key seek response packet 35 (step S02). In this case, since the encrypt key ID1 set by the encrypt apparatus 11 is set to the local port encrypt key information 24 of the key seek response packet 35, the encrypt apparatus 12 registers into the encrypt key table 82 of FIG. 30, such an operation that the communication data between the terminal A and the terminal B is encrypted/decrypted by using the encrypt key having the ID of "1" (step S7). Since the communication data buffer 112 contains no communication data to be transmitted (step S21) and the destination address of the header 21 of the key seek response packet 35 is not addressed to the own encrypt apparatus 12 (step S23), the encrypt apparatus 12 relays the received key seek response packet 35 to the encrypt apparatus 11 (step S25).

Upon receipt of the key seek response packet 35 from the public port 5 (step S11), the encrypt apparatus 11 retrieves as to whether or not "1" equal to an ID of an encrypt key corresponding to the ID of the own encrypt key is set to the public port encrypt key information 25 of the key seek response packet 35 (step S12). In this case, since the encrypt key ID1 set by the encrypt apparatus 12 is set to the public port encrypt key information 25 of the key seek response packet 35, the encrypt apparatus 11 registers into the encrypt key table 81 of FIG. 30, such an operation that the communication data between the terminal A and the terminal B is encrypted/decrypted by using the encrypt key having the ID of "1" (step S7).

Then, since the communication data 41 to be transmitted is stored in the communication data buffer 112 (step S21), the encrypt apparatus 11 encrypts this communication data 41 by the encrypt/decrypt processing unit 2 by using the encrypt key 1 in accordance with the content of the encrypt key table 81, and then transmits the encrypted data as communication data 42 to the terminal B (step S22) Next, since the destination address of the header 21 of the received key seek response packet 35 is directed to the encrypt apparatus 11 (step S23), this encrypt apparatus 11 discards the key seek response packet 35 (step S24).

As a result, the communication data 41 is encrypted by the encrypt key 1 by the encrypt apparatus 11 in accordance with the content of the encrypt key table 81 to become the communication data 42, and then this communication data 42 is decrypted by the encrypt key 1 by the encrypt apparatus 12 in accordance with the content of the encrypt key table 82 to be returned to the communication data 41. The encrypt apparatus 13 transparently relays this communication data 41 in accordance with the content of the encrypt key table 83, so that this communication data 41 reaches the terminal B. Also, the communication data 43 from the terminal B is transparently relayed by the encrypt apparatus 13 in accordance with the processing content registered in the encrypt key table, and thereafter is encrypted by the encrypt key 1 by the encrypt apparatus 12 (communication data 44), and then the encrypted data is decrypted by the encrypt key 1 by the encrypt apparatus 11, so that the decrypted data reaches the terminal A. As a consequence, when the external terminal communication mode setting unit 111 is set to the transparent relay processing mode in the encrypt apparatus 13 located outside the encrypted relay section, the communication data can be transparently relayed.

Figure 35:
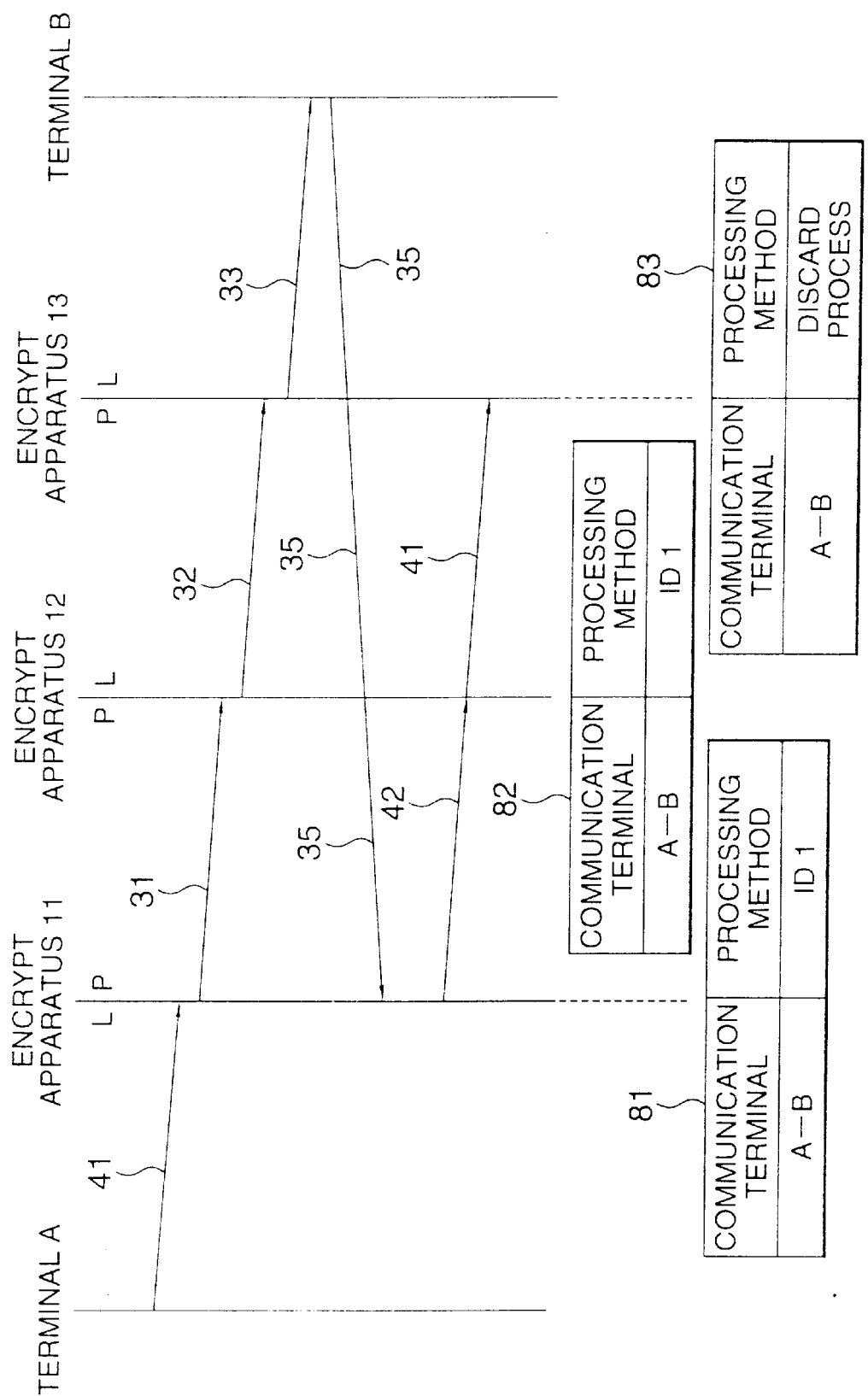
FIG. 35 is a sequence diagram for indicating such an example that an encryption communication is carried out between terminals A and B via plural encrypt apparatuses where the external terminal communication mode is set to the discard processing in the network structure according to the seventh embodiment of the present invention.

Next, FIG. 35 represents a learning process operation of the encrypt key table 83 in such a case that in FIG. 24, when a communication is established from the terminal A to the terminal B, both the encrypt apparatus 11 and the encrypt apparatus 12 own the same encrypt keys and constitute an encrypted relay section. The encrypt apparatus 13 owns a different encrypt key, and further the external terminal communication mode setting unit 111 of the encrypt apparatus 13 is set to the discard processing method. FIG. 35 is a sequence diagram of the key seek packet in this operation. Since the operations of the terminal A, the terminal B, the encrypt apparatus 11, and the encrypt apparatus 12, and further the operations defined until the encrypt apparatus 13 receives the key seek packet are the same as those of the above-described example, descriptions thereof are omitted. Accordingly, operations when the encrypt apparatus 13 receives the key seek response packet from the local port 7 will now be explained. Similarly, these operations will now be explained in accordance with the process flow chart of the encrypt apparatus shown in FIG. 26.

Upon receipt of the key seek response packet 35 from the local port 7 (step S01 of FIG. 26), the encrypt apparatus 13 retrieves as to whether or not "2" equal to an ID corresponding to the ID of the own encrypt key is set to the local port encrypt key information 24 (step S02). In this case, since "2" equal to the ID set by the encrypt apparatus 13 is not set to the local port encrypt key information 24 of the key seek response packet 35, the encrypt apparatus 13 checks as to whether or not there is an encrypted relay section located prior to the own encrypt apparatus. In other words, a check is made as to whether or not there is such an encrypt apparatus, which receives the key seek packet after the own encrypt apparatus, having an encrypt key ID coincident with the encrypt key ID registered in the local port encrypt key information 24 among the encrypt apparatuses in which the information has been set to the public port encrypt key information 25 (step S03). In this example, there is no encrypt apparatus having the coincident key ID. In other words, since the own encrypt apparatus 13 is not located in the encrypted relay section, the external terminal communication mode setting unit 111 is referred (step S04). As a result, since the external terminal communication mode is set to the discard processing method, such an operation that the communication data between the terminal A and the terminal B is discarded is registered into the encrypt key table 83 by the encrypt apparatus 13 (step S05). Since the communication data buffer 112 contains no communication data to be transmitted (step S21) and the destination address of the header 21 of the key seek response packet 35 is not addressed to the own encrypt apparatus 13 (step S23), the encrypt apparatus 13 relays the received key seek response packet 35 to the encrypt apparatus 12 (step S25).

Both the encrypt apparatus 12 and the encrypt apparatus 11 register into the respective encrypt key tables 82 and 81, such an operation that the communication data between the terminal A and the terminal B is encrypted/decrypted by way of the encrypt key 1.

As a result, the communication data 41 sent from the terminal A to the terminal B is encrypted by the encrypt key 1 by the encrypt apparatus 11 in accordance with the content of the encrypt key table 81 to become the communication data 42, and then this communication data 42 is decrypted by the encrypt key 1 by the encrypt apparatus 12 in accordance with the content of the encrypt key table 82 to be returned to the communication data 41. The encrypt apparatus 13 discards this communication data 41 in accordance with the content of the encrypt key table 83. As a consequence, when the external terminal communication mode setting unit 111 is set to the discard processing mode in the encrypt apparatus 13 located outside the encrypted relay section, the communication data can be discarded.

As previously explained, when a communication is established from the terminal A to the terminal B, both the encrypt apparatus 11 and the encrypt apparatus 12 own the same encrypt keys and constitute the encrypted relay section. The encrypt apparatus 13 owns a different encrypt key. As a consequence, since the encrypt apparatus 13 constitutes the not encrypted relay section, the communication data between the terminals can be transparently relayed, or discarded by setting the external terminal communication mode setting unit 111 of the encrypt apparatus 13. Alternatively, similar to the embodiment 5, the key seek packet may be transmitted from the encrypt apparatus located at the nearest position from the transmission source terminal for the communication data.

Embodiment 8

In the embodiment 7, the encryption communication system has been described in which the transparent relay processing method and the discard processing method are set in the external terminal communication mode. In contrast, in an encryption communication system according to an embodiment 8, a semi-transparent processing method is additionally set in the external terminal communication mode. In this specification, an expression "semi-transparent" processing method of the external terminal communication mode implies that the processing method is controlled to select the transparent relay processing operation, or the discard processing operation in accordance with a transfer direction of communication data. In such a case that as to a communication established between a terminal pair, a communication path defined by a communication starting terminal and a communication counter terminal is connected from an encrypted relay section via a not-encrypted relay section to the counter terminal, if the external terminal communication mode is set to the semi-transparent processing method, then the communication data is discarded in an encrypt apparatus of the not-encrypted relay section. Conversely, in such a case that as to a communication established between a terminal pair, a communication path defined by a communication starting terminal and a communication counter terminal is connected from a not-encrypted relay section via an encrypted relay section to the counter terminal, if the external terminal communication mode is set to the semi-transparent processing method, then the communication data is transparent-relayed by an encrypt apparatus of the not-encrypted relay section set to the transparent processing method. Also, as an example where there is no encrypted relay section, when a communication is carried out via a single encrypt apparatus between two terminals, the encrypt apparatus is similarly operated with respect to the semi-transparent processing method of the external terminal communication mode.

A first description will now be made of such a communication example that a communication is carried out between two terminals via a single encrypt apparatus set to a semi-transparent processing method. A second description will be made of another communication example that a communication is carried out between two terminals via a plurality of encrypt apparatuses set to the semi-transparent processing method. As to the single encrypt apparatus communication case, two learning process operations of encrypt key tables will now be described. That is, in one case, while the external terminal communication mode setting unit 111 of the encrypt apparatus 11 is set to the semi-transparent processing method, the terminal A connected to the encrypt apparatus 11 on the side of the local port 7 commences the communication. In the other case, the terminal C connected to the encrypt apparatus on the side of the public port 5 commences the communication.

Figure 36:
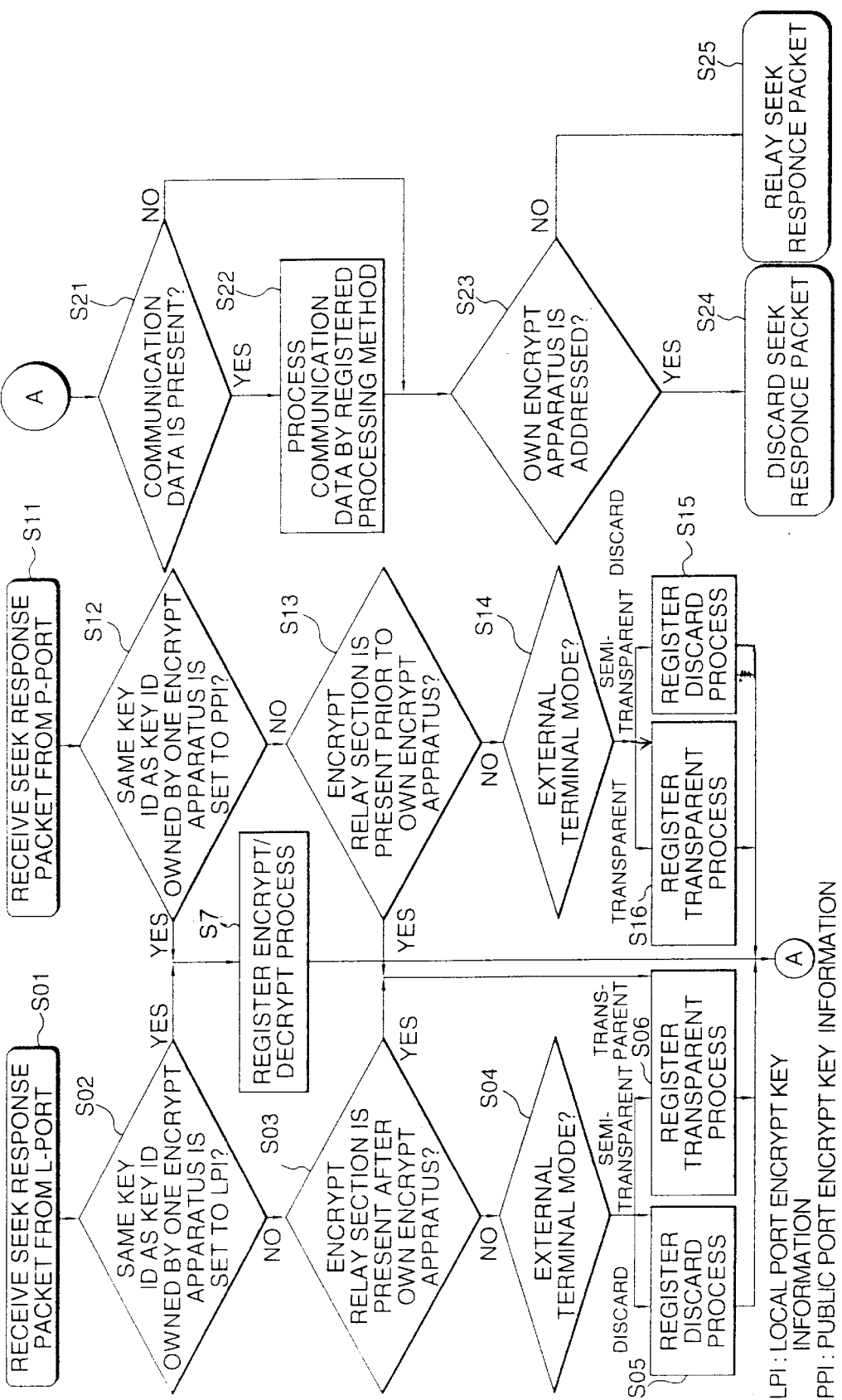
FIG. 36 schematically indicates a process flow operation of a key seek response packet according to the eighth embodiment of the present invention.
Figure 37:
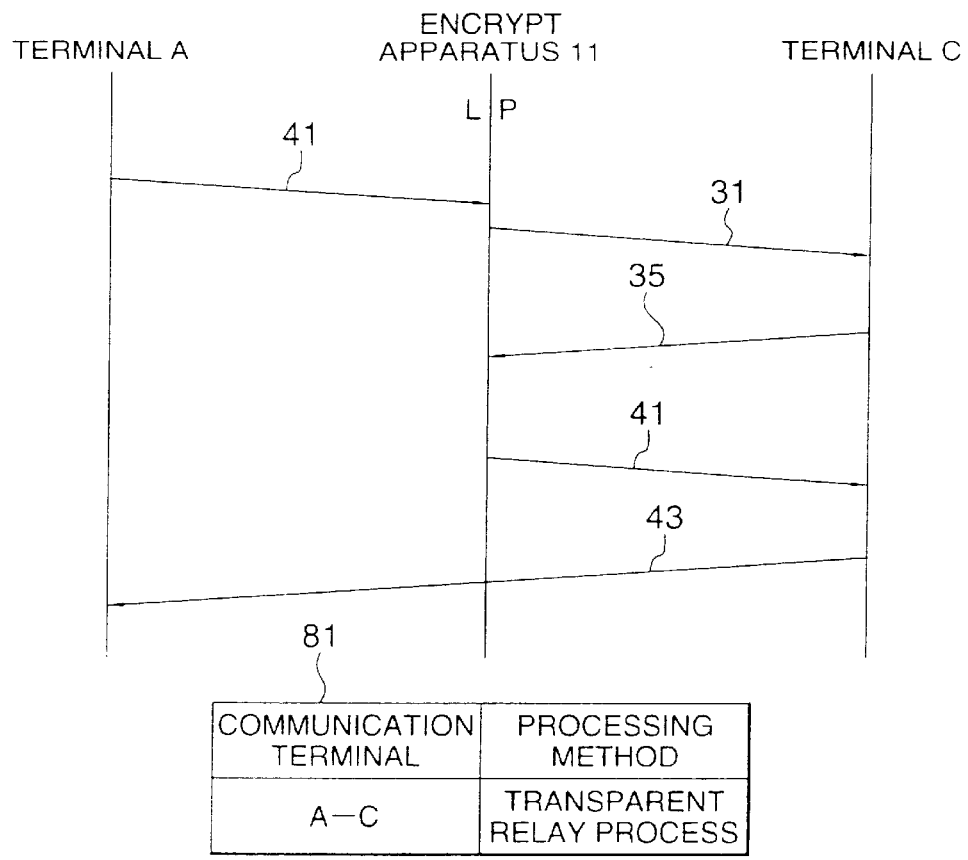
FIG. 37 is a sequence diagram for indicating such an example that an encryption communication is carried out between terminals A and C via one encrypt apparatus where the external terminal communication mode is set to a semi-transparent relay in the network structure according to the eighth embodiment of the present invention.

In the beginning, a description will now be made of a learning process operation of an encrypt key table in such a case that while the external terminal communication mode setting unit 111 of the encrypt apparatus 11 shown in FIG. 24 is set to the semi-transparent processing method, the terminal A connected to the local port 7 of the encrypt apparatus 11 commences the communication. FIG. 36 is a process flow chart of the encrypt apparatus, in which a judgment step for a semi-transparent processing method is added to the step S04 and the step S14 of FIG. 26 explained in the embodiment 7. FIG. 37 shows a key seek sequence. Since process operations of this key seek sequence, i.e., until the encrypt apparatus 11 receives the key seek response packet are similar to those of the embodiment 7 (FIG. 25), descriptions thereof are omitted. Referring now to the process flow chart of the encrypt apparatus of FIG. 36, an explanation will be made of such operations executed by the encrypt apparatus 11 after receiving the key seek response packet from the public port 5.

Upon receipt of the key seek response packet 35 from the public port 5 (step S11 of FIG. 36), the encrypt apparatus 11 retrieves as to whether or not "1" equal to an ID corresponding to the ID of the own encrypt key is set to the public port encrypt key information 25 (step S12). In this case, since "1" equal to the ID set by the encrypt apparatus 11 is not set to the public port encrypt key information 25 of the key seek response packet 35, the encrypt apparatus 11 checks as to whether or not there is such an encrypt apparatus, which receives the key seek packet prior to the own encrypt apparatus, having an encrypt key ID coincident with the encrypt key ID registered in the local port encrypt key information 25 among the encrypt apparatuses in which the information has been set to the public port encrypt key information 24 (step S13).

In this case, there is no encrypt apparatus having the coincident key ID. Next, the external terminal communication mode setting unit 111 is referred. Since the external terminal communication mode is set to the semi-transparent processing method and also the key seek response packet 35 is received from the public port 5 (step S14), such an operation that the communication data between the terminal A and the terminal C is transparently relayed is registered into the encrypt key table 81 (step S16). Then, the communication data 41 stored in the communication data buffer 112 is transparently relayed in accordance with the content of the encrypt key table 81 (steps S21, S22). Also, the key seek response packet 35 directed to the own encrypt apparatus (step S23) is discarded (step S24). As a result, the communication data 41 is allowed to reach to the terminal C without being encrypted. Also, the communication data 43 from the terminal C is allowed to reach to the terminal A while being transparently relayed by the encrypt apparatus 11 in accordance with the content of the encrypt key table 81 without any encryption. As a consequence, the communication data can be transparently relayed in such a case that the external terminal communication mode setting unit 111 of the encrypt apparatus 11 is set to the semi-transparent processing method, and the terminal A connected to the local port 7 of the encrypt apparatus 11 commences the communication.

Figure 38:
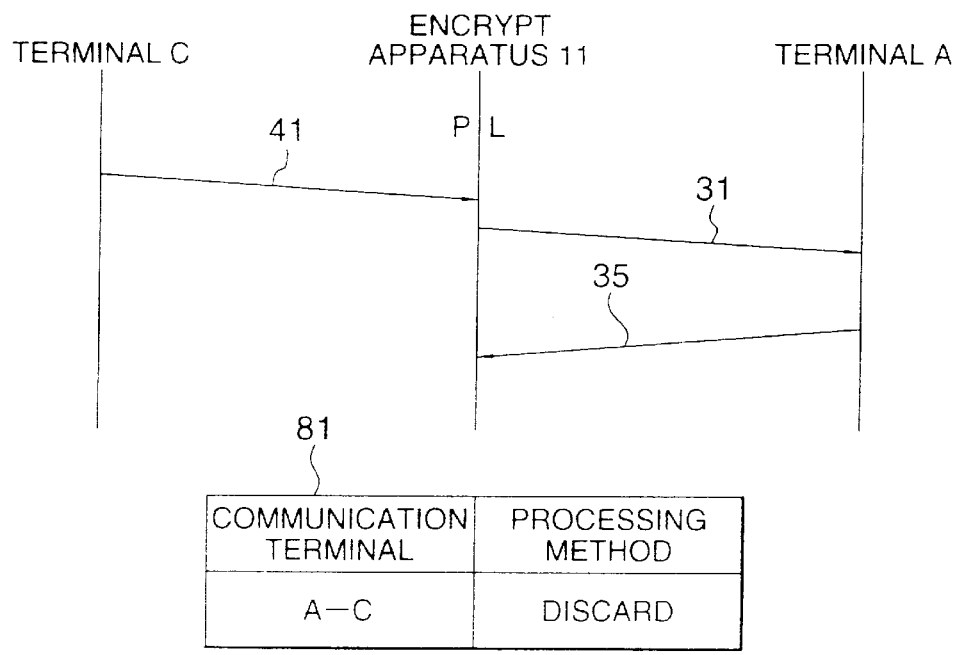
FIG. 38 is a sequence diagram for indicating such an example that an encryption communication is carried out between terminals C and A via one encrypt apparatus where the external terminal communication mode is set to the discard processing in the network structure according to the eighth embodiment of the present invention.

Next, a description will now be made of a learning process operation of an encrypt key table in such a case that while the external terminal communication mode setting unit 111 of the encrypt apparatus 11 shown in FIG. 24 is set to the semi-transparent processing method, and the terminal C connected to the public port 5 side of the encrypt apparatus 11 commences the communication. FIG. 38 shows a sequence of a key seeking operation. Also, in this case, process operations when the respective encrypt apparatuses receive the key seek response packets will be explained with reference to the process flow chart of FIG. 36.

The encrypt apparatus 11 which receives the communication data 41 from the terminal C via the public port 5 retrieves the internally provided encrypt key table 81. Since the processing method of the communication between the terminal A and the terminal C is not registered, this encrypt apparatus 11 stores the received communication data 41 into the communication data buffer 112, and also transmits the key seek packet 31 in which the address of the own encrypt apparatus 11 and the ID1 of the own encrypt key are set to the public port encrypt key information 25 of the key seek packet. In this case, in the header 21 of the key seek packet 31, the key seek packet is set to the packet sort, the address of the encrypt apparatus 11 is set to the transmission source address of the key seek packet, and the terminal A address is set to the destination, and the key seek packet 31 is transmitted to the terminal A.

Figure 39:
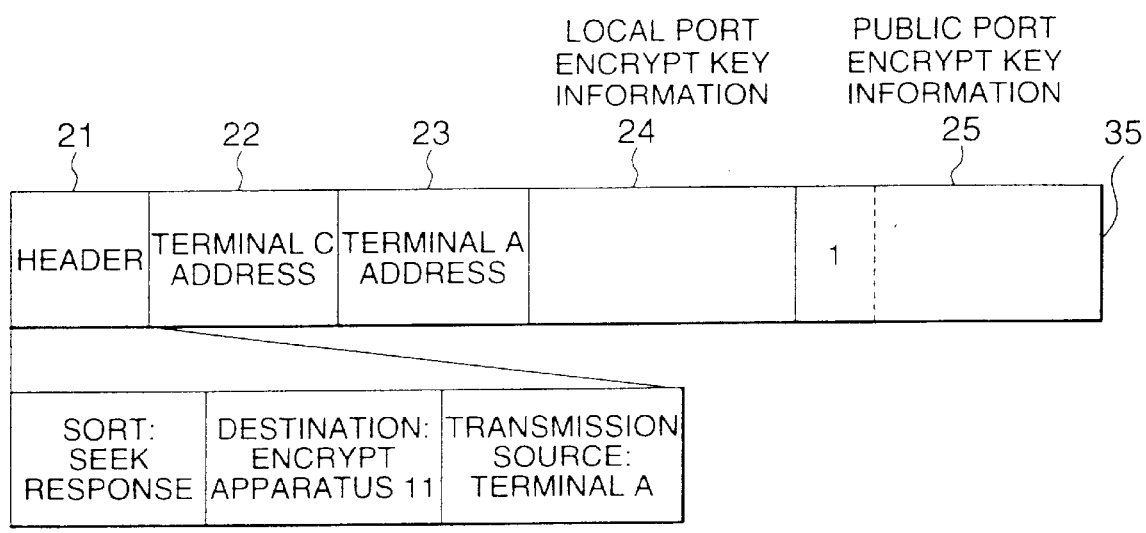
FIG. 39 schematically represents a frame of a key seek response packet 35 indicated in FIG. 38.

The terminal A which receives the key seek packet 31 edits the key seek response packet as shown in FIG. 39. That is to say, the terminal A copies the data portion of the key seek packet 31 to the-data portion of the key seek response packet 35. This terminal A transmits the key seek response packet 35 shown in FIG. 39 to the encrypt apparatus 11. Then, in the header 21 of this key seek response packet 35, the key seek response packet is set to the packet sort, the address of the terminal A is set to the transmission source address, and the address of the encrypt apparatus 11 is set to the destination address, as indicated in FIG. 39.

Upon receipt of the key seek response packet 35 from the local port 7 (step S01 of FIG. 36), the encrypt apparatus 11 retrieves as to whether or not "1" equal to an ID corresponding to the ID of the own encrypt key is set to the local port encrypt key information 24 (step S02). In this case, since "1" equal to the ID set by the encrypt apparatus 11 is not set to the local port encrypt key information 24, the encrypt apparatus 11 checks as to whether or not there is such an encrypt apparatus, which receives the key seek packet after the own encrypt apparatus, having an encrypt key ID coincident with the encrypt key ID registered in the local port encrypt key information 24 among the encrypt apparatuses in which the information has been set to the public port encrypt key information 25 (step S03). In this case, there is no encrypt apparatus having the coincident key ID. Next, the encrypt apparatus 11 refers to the external terminal communication mode setting unit 111. As a result, since the external terminal communication mode is set to the semi-transparent processing method, and the key seek response packet 35 is received from the local port 7 (step S04), such an operation that the communication data between the terminal A and the terminal C is discarded is registered into the encrypt key table 81 (step S05).

Then, the encrypt apparatus 11 discards the communication data 41 stored in the communication data buffer 112 in accordance with the encrypt key table 81 (steps S21, S22), and further discards the key seek response packet 35 (step S24) addressed to the own encrypt apparatus (step S23). As a result, the encrypt apparatus 11 can discard the communication data in such a case that the external terminal communication mode setting unit 111 of the encrypt apparatus 11 is set to the semi-transparent processing method, and the terminal C connected to the public port 5 of the encrypt apparatus 11 commences the communication.

As previously explained, since the external terminal communication mode setting unit 111 of the encrypt apparatus is set to the semi-transparent processing method, the encrypt apparatus can execute; the transparent relay process operation when the communication is commenced from the local port 7 side, and also can execute the discard process operation when the communication is commenced from the public port 5 side. As a result, since the communication data sent from the terminal stored on the side of the public port 5 is discarded, it is possible to prevent unauthorized access issued from the external terminal.

Next, a description will now be made of such an example that a communication is carried out between two terminals via a plurality of encrypt apparatuses whose operation mode is set to the semi-transparent processing method. In other words, a first description will now be made of operations when the communication is commenced from the terminal A and is established with the terminal B, and a second description will be made of operations when the communication is commenced from the terminal B and is established with the terminal A. First, in FIG. 24, when a communication is established from the terminal A to the terminal B, both the encrypt apparatus 11 and the encrypt apparatus 12 own the same encrypt keys and constitute an encrypted relay section. The encrypt apparatus 13 owns a different encrypt key, and further the external terminal communication mode setting unit 111 of the encrypt apparatus 13 is set to the semi-transparent processing method.

Figure 40:
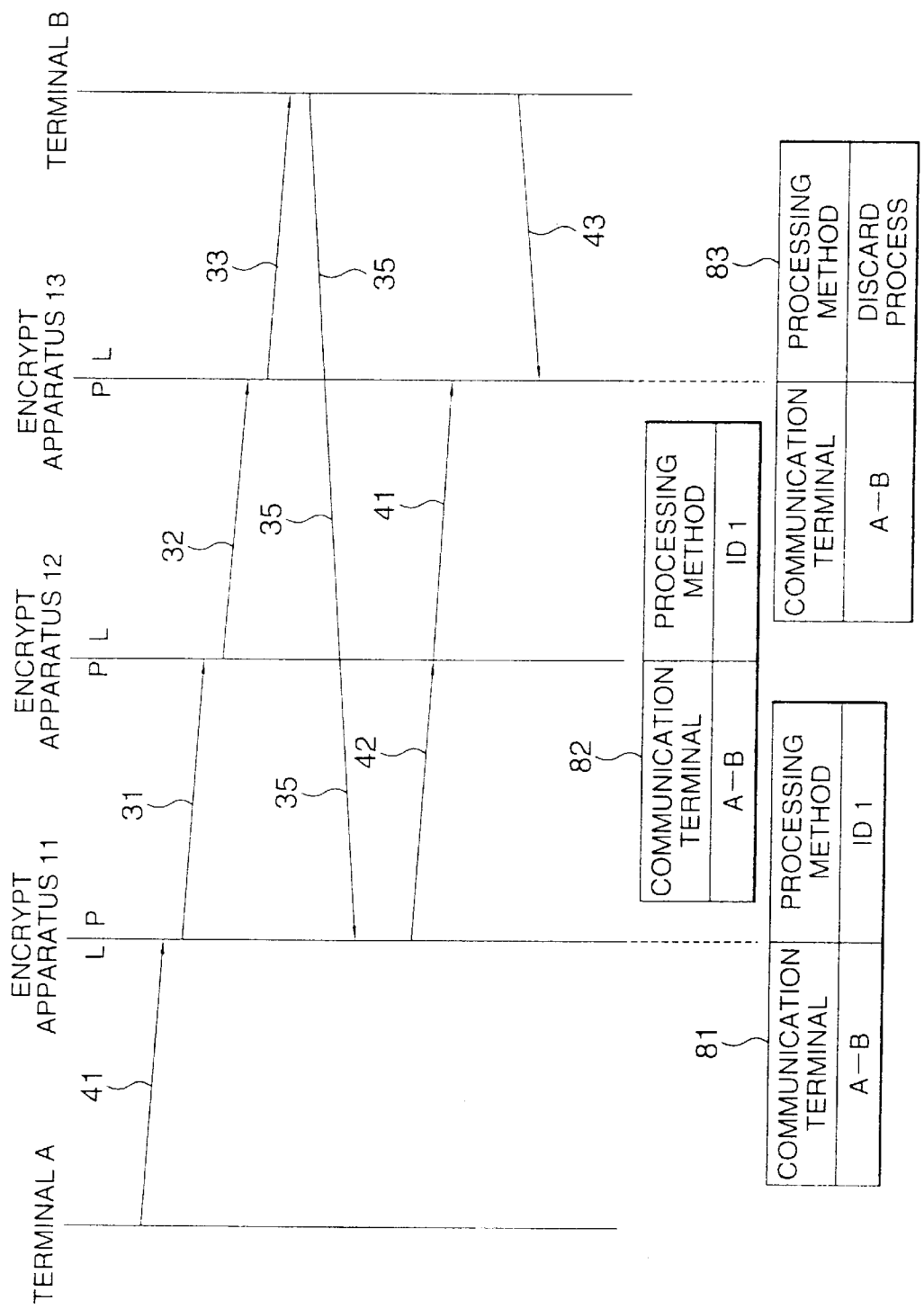
FIG. 40 is a sequence diagram for indicating such an example that an encryption communication is carried out between terminals A and B via plural encrypt apparatuses where the external terminal communication mode is set to the semi-transparent relay in the network structure according to the eighth embodiment of the present invention.

FIG. 40 shows a sequence diagram for explaining a key seek packet used to learn the encrypt key table 81 in such a case that when the data is communicated from the terminal "A" to the terminal "B", no processing method is registered into the encrypt key table 81 of the encrypt apparatus 11 in correspondence with a pair of a transmission source terminal and a destination terminal of the communication data received from the terminal A. In this drawing, reference numerals 41, 42 are communication data, reference numeral 31 shows a key seek packet transmitted from the encrypt apparatus 11. Also, reference numeral 32 indicates a key seek packet in which an ID of an encrypt key of the encrypt apparatus 12 is added to the key seek packet 31 by the encrypt apparatus 12. Reference numeral 33 is a key seek packet in which an ID of an encrypt key of the encrypt apparatus. 13 is added to the key seek packet 32 by the encrypt apparatus 13. Reference numeral 35 shows a key seek response packet sent from the terminal B. Also, reference numeral 81 denotes an encrypt key table of the encrypt apparatus 11, reference numeral 82 shows an encrypt key table of the encrypt apparatus 12, and reference numeral 83 represents an encrypt key table of the encrypt apparatus 13.

Next, operations will now be explained. The encrypt apparatus 11 which receives the communication data 41 from the terminal A to the terminal B via the local port 7 retrieves the internally provided encrypt key table 81. Since the processing method of the communication between the terminal A and the terminal B is not registered, this encrypt apparatus 11 stores the received communication data 41 into the communication data buffer 112.

Thereafter, the encrypt apparatus 11 edits the key seek packet 31 as indicated in FIG. 31. In other words, in the header 21 of the key seek packet 31, the key seek packet is set to the packet sort, the destination terminal B is set to the destination address, transmission source encrypt apparatus 11 is set to the transmission source address, the terminal A address is set to the transmission source terminal address 22, and the address of the terminal B is set to the destination terminal address 23. Then, "1" is set to the local port encrypt key information 24, which is equal to the encrypt key ID owned by the encrypt apparatus 11, but nothing is set to the public port encrypt key information 25. Thus, the key seek packet 31 (FIG. 31) is transmitted to the terminal B. The encrypt apparatus 12 which receives the key seek packet 31 from the public port 5 additionally sets "1" equal to the ID of the own encrypt key into the public port encrypt key information 25, and then transfers the key seek packet 32 (FIG. 32) to the local port 7.

The encrypt apparatus 13 which receives the key seek packet 32 from the public port 5 additionally sets "2" equal to the ID of the own encrypt key into the public port encrypt key information 25, and then transfers the key seek packet 33 (FIG. 33) to the local port 7. The terminal B which receives the key seek packet 33 copies the data portion of the key seek packet 33 to the data portion of the key seek response packet 35. This terminal B transmits a key seek response packet 35 shown in FIG. 34 to the encrypt apparatus 11. Then, in the header 21 of this key seek response packet 35, the key seek response packet is set to the packet sort, the address of the terminal B is set to the transmission source address, and the address of the encrypt apparatus 11 is set to the destination address, as indicated in FIG. 34.

Upon receipt of the key seek response packet 35 from the local port 7 (step S01 of FIG. 36), the encrypt apparatus 13 retrieves as to whether or not "2" equal to an ID corresponding to the ID of the own encrypt key is set to the local port encrypt key information 24 (step S02). In this case, since "2" equal to the ID set by the encrypt apparatus 13 is not set to the local port encrypt key information 24 of the key seek response packet 35, the encrypt apparatus 13 checks as to whether or not there is such an encrypt apparatus, which receives the key seek packet after the own encrypt apparatus, having an encrypt key ID coincident with the encrypt key ID registered in the local port encrypt key information 24 among the encrypt apparatuses in which the information has been set to the public port encrypt key information 25 (step S03). That is, a judgment is made as to whether or not the own encrypt apparatus is within the encrypt section. In this case, there is no encrypt apparatus having the coincident key ID. In other words, the own encrypt apparatus is not located in the encrypt section.

Next, the encrypt apparatus 13 refers to the external terminal communication mode setting unit 111 (step S04). As a result, since the external terminal communication mode is set to the semi-transparent processing method and the key seek response packet 35 is received from the local port 7, such an operation that the communication data between the terminal A and the terminal B is discarded is registered into the encrypt key table 83 (step S05) Since the communication data buffer 112 contains no communication data to be transmitted (step S21) and the destination address of the header 21 of the key seek response packet 35 is not addressed to the own encrypt apparatus 13 (step S23), the encrypt apparatus 13 relays the received key seek response packet 35 to the encrypt apparatus 11 (step S25).

Upon receipt of the key seek response packet 35 from the local port 7 (step S01), the encrypt apparatus 12 retrieves as to whether or not "1" equal to an ID of an encrypt key corresponding to the ID of the own encrypt key is set to the local port encrypt key information 24 of the key seek response packet 35 (step S02). In this case, since the encrypt key ID1 set by the encrypt apparatus 11 is set to the local port encrypt key information 24 of the key seek response packet 35, the encrypt apparatus 12 registers into the encrypt key table 82 of FIG. 40, such an operation that the communication data between the terminal A and the terminal B is encrypted/decrypted by using the encrypt key having the ID of "1" (step S7) . Since the communication data buffer 112 contains no communication data to be transmitted (step S21) and the destination address of the header 21 of the key seek response packet 35 is not addressed to the own encrypt apparatus 12 (step S23), the encrypt apparatus 12 relays the received key seek response packet 35 to the encrypt apparatus 11 (step S25).

Upon receipt of the key seek response packet 35 from the public port 5 (step S11), the encrypt apparatus 11 retrieves as to whether or not "1" equal to an ID of an encrypt key corresponding to the ID of the own encrypt key is set to the public port encrypt key information 25 of the key seek response packet 35 (step S12). In this case, since the encrypt key ID1 set by the encrypt apparatus 12 is set to the public port encrypt key information 25 of the key seek response packet 35, the encrypt apparatus 11 registers into the encrypt key table 81 of FIG. 40, such an operation that the communication data between the terminal A and the terminal B is encrypted/decrypted by using the encrypt key having the ID of "1" (step S7). Then, since the communication data 41 to be transmitted is stored in the communication data buffer 112 (step S21), the encrypt apparatus 11 encrypts this communication data 41 by the encrypt/decrypt processing unit 2 by using the encrypt key 1 in accordance with the content of the encrypt key table 81, and then transmits the encrypted data as communication data 42 to the terminal B (step S22). Next, since the destination address of the header 21 of the received key seek response packet 35 is directed to the encrypt apparatus 11 (step S23), this encrypt apparatus 11 discards the key seek response packet 35 (step S24).

As a result, the communication data 41 is encrypted by the encrypt key 1 by the encrypt apparatus 11 in accordance with the content of the encrypt key table 81 to become the communication data 42, and then this communication data 42 is decrypted by the encrypt key 1 by the encrypt apparatus 12 in accordance with the content of the encrypt key table 82 to be returned to the communication data 41. The encrypt apparatus 13 discards this communication data 41 in accordance with the content of the encrypt key table 83. Also, the communication data 43 from the terminal B is discarded by the encrypt apparatus 13. As a consequence, when the communication is established from the terminal A to the terminal B, both the encrypt apparatus 11 and the encrypt apparatus 12 own the same encrypt keys and constitute the encrypted relay section. The encrypt apparatus 13 owns the different encrypt key, and further forms the not-encrypted relay section. Thus, if the external terminal communication mode setting unit 111 of the encrypt apparatus 13 is set to the semi-transparent relay processing method, then the communication data between the terminal A and the terminal B can be discarded.

Figure 41:
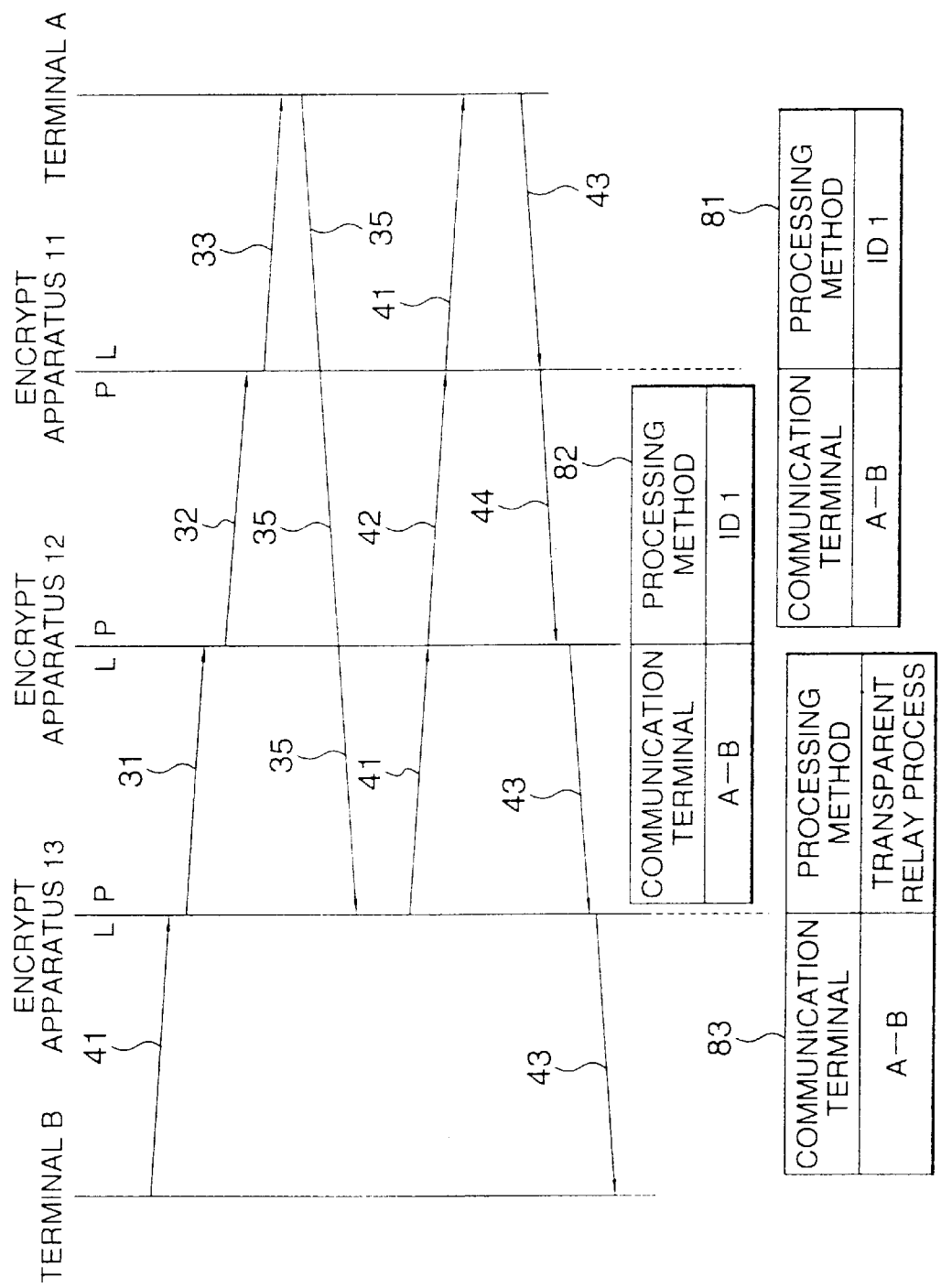
FIG. 41 is a sequence diagram for indicating such an example that an encryption communication is carried out between terminals B and A via plural encrypt apparatuses where the external terminal communication mode is set to the semi-transparent relay in the network structure according to the eighth embodiment of the present invention.

Next, FIG. 41 represents a learning process operation of the encrypt key table 83 in which a case that in FIG. 24, when a communication is established from the terminal B to the terminal A, both the encrypt apparatus 11 and the encrypt apparatus 12 own the same encrypt keys and constitute an encrypted relay section. The encrypt apparatus 13 owns a different encrypt key, and further the external terminal communication mode setting unit 111 of the encrypt apparatus 13 is set to the semi-transparent processing method. Similarly, these operations will now be explained in accordance with the process flow chart of the encrypt apparatus shown in FIG. 36.

A communication network is identical to that shown in FIG. 24, and a sequential operation when communication data is transmitted from the terminal B to the terminal A will now be explained. FIG. 41 shows a sequence diagram for explaining a key seek packet used to learn the encrypt key table 83 in such a case that when the data is communicated from the terminal "B" to the terminal "A", no processing method is registered into the encrypt key table 83 of the encrypt apparatus 13 in correspondence with a pair of a transmission source terminal and a destination terminal of the communication data received from the terminal B. In this drawing, reference numerals 41, 42, 43, 44 are communication data, reference numeral 31 shows a key seek packet transmitted from the encrypt apparatus 13. Also, reference numeral 32 indicates a key seek packet in which an ID of an encrypt key of the encrypt apparatus 12 is added to the key seek packet 31 by the encrypt apparatus 12. Reference numeral 33 is a key seek packet in which an ID of an encrypt key of the encrypt apparatus 11 is added to the key seek packet 32 by the encrypt apparatus 11. Reference numeral 35 shows a key seek response packet transmitted from the terminal A. Also, reference numeral 81 denotes an encrypt key table of the encrypt apparatus 11, reference numeral 82 shows an encrypt key table of the encrypt apparatus 12, and reference numeral 83 represents an encrypt key table of the encrypt apparatus 13.

Next, operations will now be explained. The encrypt apparatus 13 which receives the communication data 41 from the terminal B to the terminal A via the local port 7 retrieves the internally provided encrypt key table 83. Since the processing method of the communication between the terminal A and the terminal B is not registered, this encrypt apparatus 13 stores the received communication data 41 into the communication data buffer 112.

Figure 42:
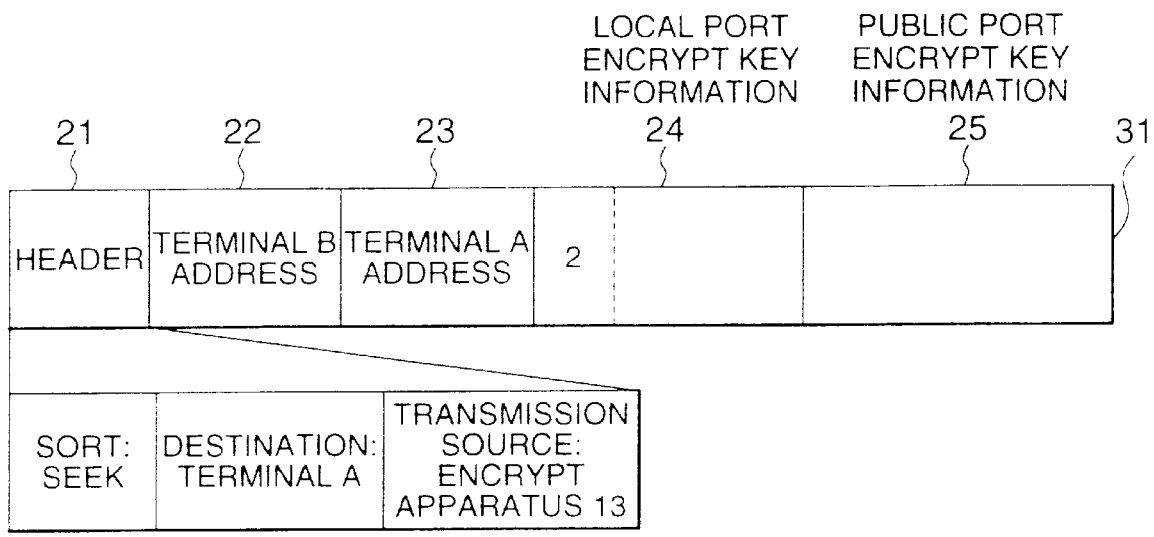
FIG. 42 schematically represents a key seek packet 31 shown in FIG. 41.
Figure 43:
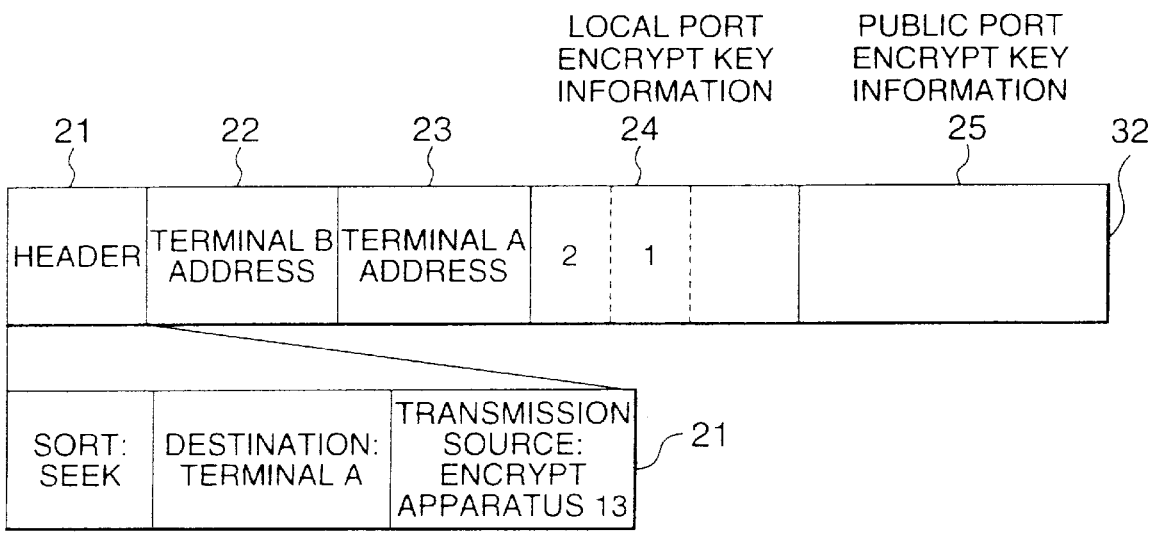
FIG. 43 schematically shows a key seek packet 32 indicated in FIG. 41.

Thereafter, the encrypt apparatus 13 edits the key seek packet 31 as indicated in FIG. 42. In other words, in the header 21 of the key seek packet 31, the key seek packet is set to the packet sort, the destination terminal A is set to the destination address, the transmission source encrypt apparatus 13 is set to the transmission source address, the terminal B address is set to the transmission source terminal address 22, and the address of the terminal A is set to the destination terminal address 23. Then, "2" is set to the local port encrypt key information 24, which is equal to the encrypt key ID owned by the encrypt apparatus 13, but nothing is set to the public port encrypt key information 25. Thus, the key seek packet 31 (FIG. 42) is transmitted to the terminal A. The encrypt apparatus 12 receives the key seek packet 31 from the local port 7, and additionally sets "1" equal to the ID of the own encrypt key into the local port encrypt key information 24, and then transfers the key seek packet 32 (FIG. 43) to the public port 5.

Figure 44:
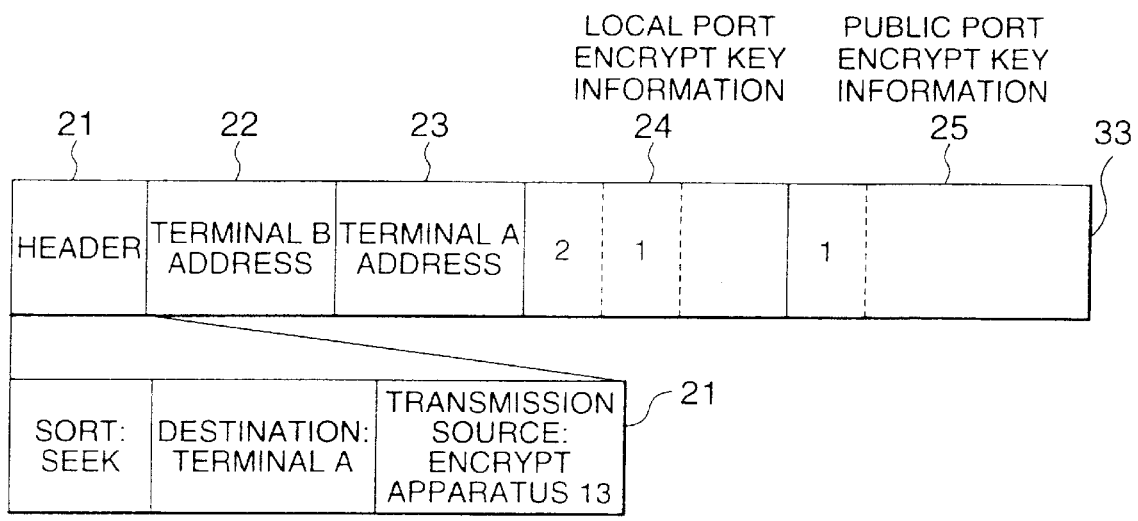
FIG. 44 schematically represents a key seek packet 33 shown in FIG. 41.
Figure 45:
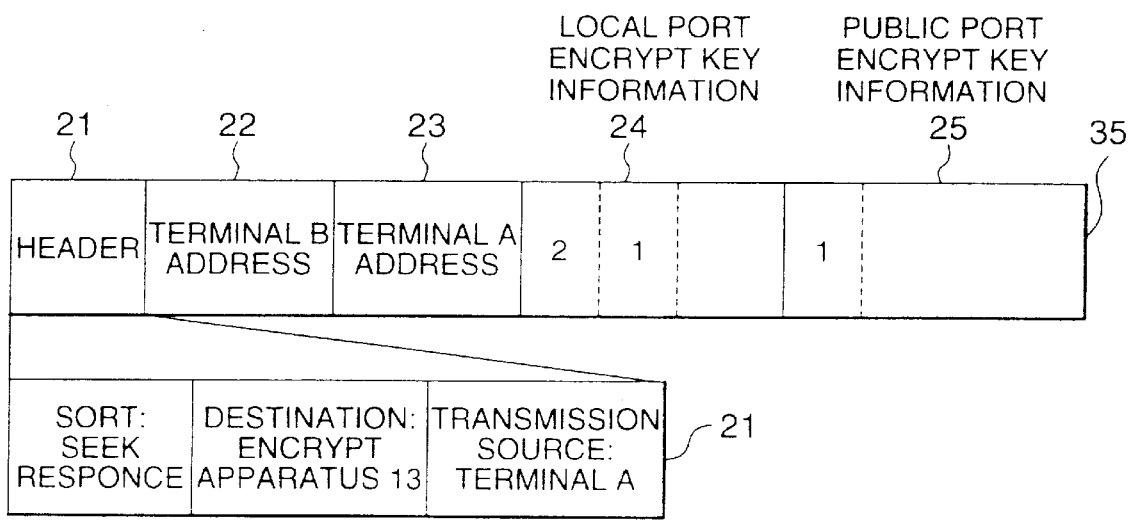
FIG. 45 schematically shows a key seek response packet 35 indicated in FIG. 41.
Figure 46:
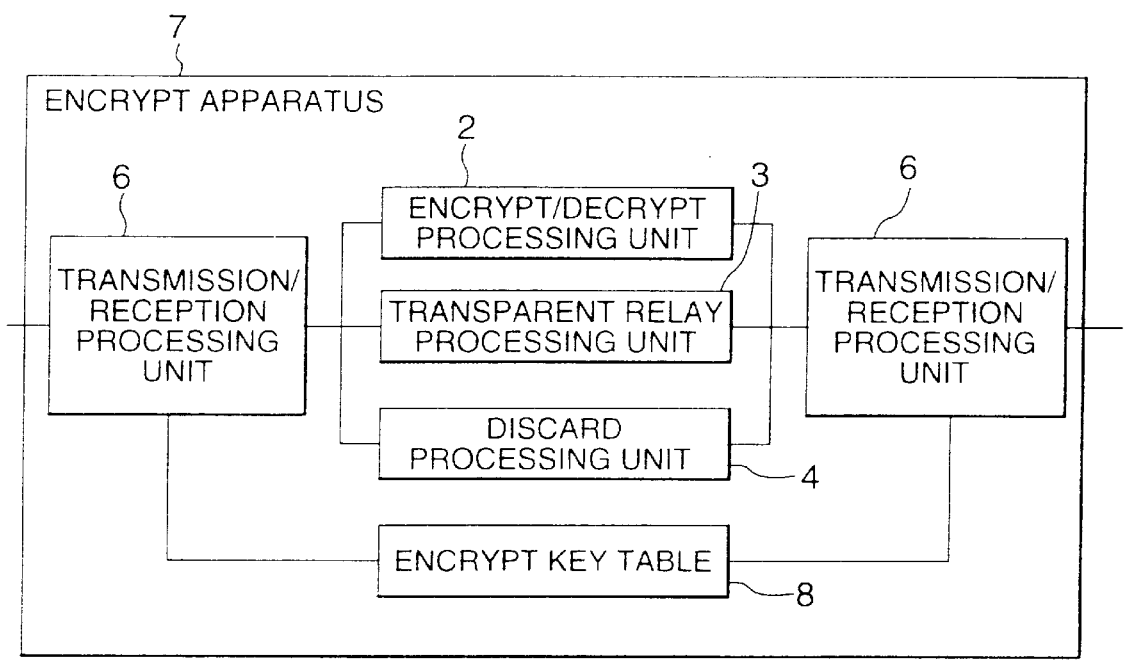
FIG. 46 schematically indicates the arrangement of the conventional encrypt apparatus.
Figure 47:
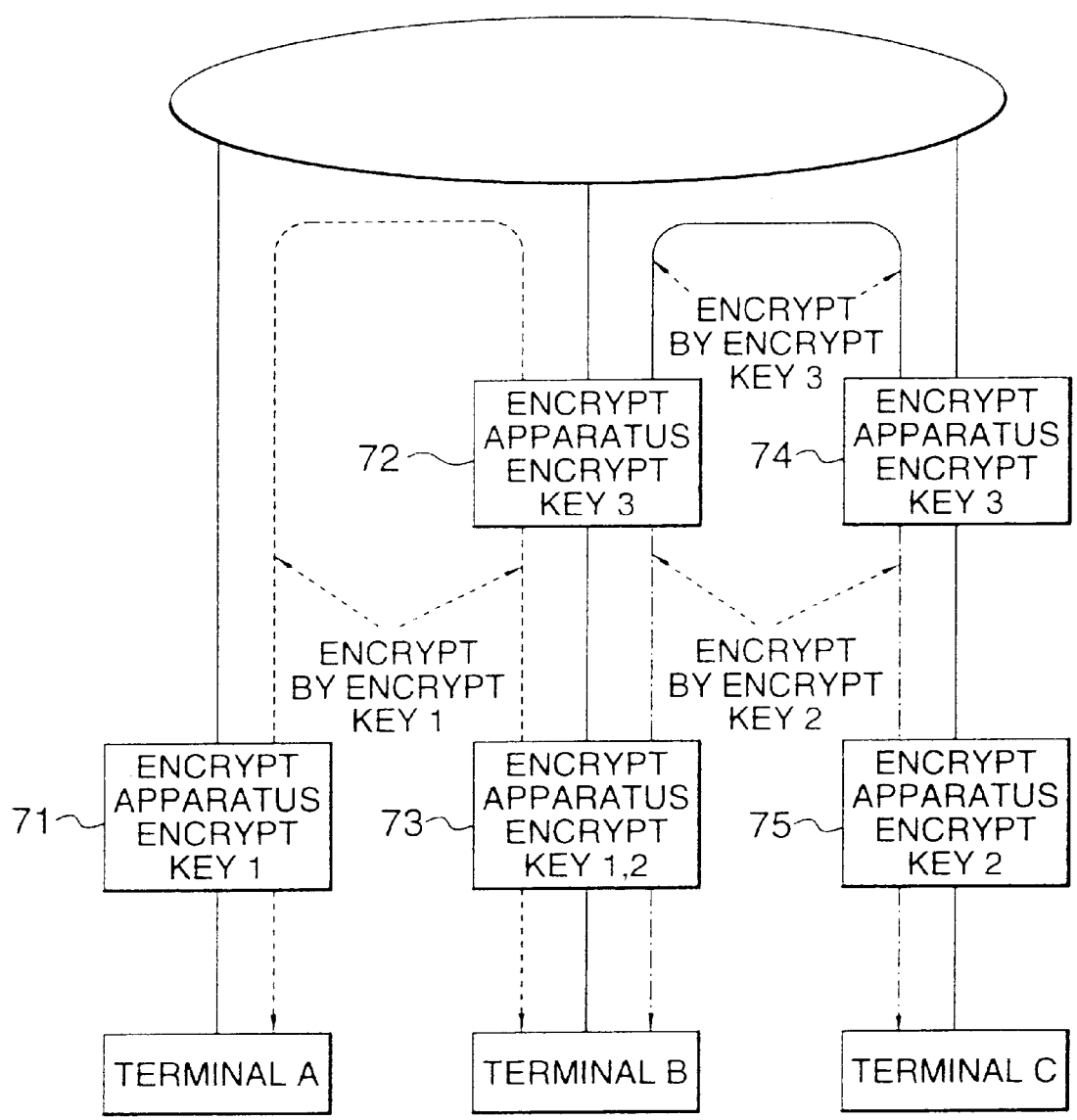
FIG. 47 schematically represents the structure of the conventional network.

The encrypt apparatus 11 which receives the key seek packet 32 from the public port 5 additionally sets "1" equal to the ID of the own encrypt key into the public port encrypt key information 25, and then transfers the key seek packet 33 (FIG. 44) to the local port 7. The terminal A which receives the key seek packet 33 copies the data portion of the key seek packet 33 to the data portion of the key seek response packet 35. This terminal A transmits a key seek response packet 35 shown in FIG. 45 to the encrypt apparatus 11. Then, in the header 21 of this key seek response packet 35, the key seek response packet is set to the packet sort, the address of the terminal A is set to the transmission source address, and the address of the encrypt apparatus 13 is set to the destination address, as indicated in FIG. 45.

Upon receipt of the key seek response packet 35 from the local port 7 (step S01 of FIG. 36), the encrypt apparatus 11 retrieves as to whether or not "1" equal to an ID corresponding to the ID of the own encrypt key is set to the local port encrypt key information 24 (step S02). In this case, since the encrypt key ID1 set by the encrypt apparatus 12 is set to the local port key information 24 of the key seek response packet 35, the encrypt apparatus 11 registers into the encrypt key table 81 of FIG. 41, such an operation that the communication data between the terminal A and the terminal B is encrypted/decrypted by using the encrypt key having the ID of "1" (step S7). Since the communication data buffer 112 contains no communication data to be transmitted (step S21) and the destination address of the header 21 of the key seek response packet 35 is not addressed to the own encrypt apparatus 11 (step S23), the encrypt apparatus 11 relays the received key seek response packet 35 to the encrypt apparatus 12 (step S25).

Upon receipt of the key seek response packet 35 from the public port 5 (step S11), the encrypt apparatus 12 retrieves as to whether or not "1" equal to an ID of an encrypt key corresponding to the ID of the own encrypt key is set to the public port encrypt key information 25 of the key seek response packet 35 (step S12). In this case, since the encrypt key ID1 set by the encrypt apparatus 11 is set to the public port encrypt key information 25 of the key seek response packet 35, the encrypt apparatus 12 registers into the encrypt key table 82 of FIG. 41, such an operation that the communication data between the terminal A and the terminal B is encrypted/decrypted by using the encrypt key having the ID of "1" (step S7). Since the communication data buffer 112 contains no communication data to be transmitted (step S21) and the destination address of the header 21 of the key seek response packet 35 is not addressed to the own encrypt apparatus 12 (step S23), the encrypt apparatus 12 relays the received key seek response packet 35 to the encrypt apparatus 13 (step S25).

Upon receipt of the key seek response packet 35 from the public port 5 (step S11), the encrypt apparatus 13 retrieves as to whether or not "2" equal to an ID of an encrypt key corresponding to the ID of the own encrypt key is set to the public port encrypt key information 25 of the key seek response packet 35 (step S12). In this case, since this encrypt key ID is not to the public port encrypt key information 25 of the key seek response packet 35, the encrypt apparatus 13 checks as to whether or not there is an encrypted relay section located prior to the own encrypt apparatus. In other words, a check is made as to whether or not there is such an encrypt apparatus, which receives the key seek packet prior to the own encrypt apparatus, having an encrypt key ID coincident with the encrypt key ID registered in the public port encrypt key information 25 among the encrypt apparatuses in which the information has been set to the local port encrypt key information 24. That is to say, a judgment is made as to whether or not the own encrypt apparatus is located in the encrypt section (step S13). In this case, there is no encrypt apparatus having the coincident key ID. In other words, since the own encrypt apparatus is not located in the encrypt section, the external terminal communication mode setting unit 111 is referred by the encrypt apparatus 13 (step S14). As a result, since the external terminal communication mode is set to the semi-transparent processing method, and the key seek response packet 35 is received from the public port 5, such an operation that the communication data between the terminal A and the terminal B is relayed is registered into the encrypt key table 83 (step S16).

Then, since the communication data buffer 112 contains the communication data 41 to be transmitted (step S21), the encrypt apparatus 13 transparently relays this communication data 41 in accordance with the content of the encrypt key table 83, and transmits this relayed communication data 41 to the terminal A (step S22). Next, since the destination address of the header 21 of the received key seek response packet 35 is directed to the encrypt apparatus 13 (step S23), this encrypt apparatus 13 discards the key seek response packet 35 (step S24).

As a result, the communication data 41 which has been stored in the communication data buffer 112 and is transmitted from the terminal B is transparently relayed by the encrypt apparatus 13 in accordance with the content of the encrypt key table 83. Then, this communication data 41 is encrypted by the encrypt key 1 by the encrypt apparatus 12 in accordance with the content of the encrypt key table 82 to become the communication data 42, and then this communication data 42 is decrypted by the encrypt key 1 by the encrypt apparatus 11 in accordance with the content of the encrypt key table 81 to be returned to the communication data 41. This communication data 41 is transmitted to the terminal A. Also, the communication data 43 transmitted from the terminal A is encrypted by the encrypt key 1 by the encrypt apparatus 11 in accordance with registration of the encrypt key table 81 (communication data 44), and then the encrypted data is decrypted by the encrypt key 1 by the encrypt apparatus 12, so that the decrypted data is transparently relayed by the encrypt apparatus 13 and then reaches the terminal B.

As a result, when a communication is established from the terminal A to the terminal B, both the encrypt apparatus 11 and the encrypt apparatus 12 own the same encrypt keys and constitute the encrypted relay section. The encrypt apparatus 13 owns the different encrypt key, and further forms the not-encrypted relay section. Thus, if the external terminal communication mode setting unit 111 of the encrypt apparatus 13 is set to the semi-transparent relay processing method, then the communication data between the terminal B and the terminal A can be transparently relayed.

As previously described, when the communication is performed from the sender terminal A to the terminal B, if the encrypt apparatus located in the not-encrypted relay section sets the external terminal communication setting unit 111 to the semi-transparent processing method, this encrypt apparatus can discard the communication data between the terminal A and the terminal B. Also, when the communication is performed from the sender terminal B to the terminal A, if the encrypt apparatus located in the notencrypted relay section sets the external terminal communication setting unit 111 to the semi-transparent processing method, this encrypt apparatus can transparently relay the communication data from the terminal B and the terminal A. As to a relationship between the sender terminal and the semi-transparent processing method, in the case that the terminal A corresponds to the sender terminal and the encrypt apparatus 13 is set to the semi-transparent processing method, as indicated in FIG. 24, the key seek packet sent from the encrypt apparatus 11 for storing the terminal A is received from the public port 5 of the encrypt apparatus 13, and the key seek response packet is received from the local port 7, so that the semi-transparent processing method is discard-processed. Conversely, in the case that the terminal B corresponds to the sender terminal and the encrypt apparatus 13 is set to the semi-transparent processing method, the key seek response packet for the key seek packet sent from the encrypt apparatus 13 for storing the terminal B is received from the public port 5, so that the semi-transparent processing method is transparent-relay-processed. As a consequence, when the external terminal communication mode setting unit 111 is set to the semi-transparent processing method, since the transparent-relay-process operation, or the discard process operation is automatically selected, it is possible to surely prevent the unauthorized access. It should be noted that similar to the embodiment 5, the key seek packet may be transmitted from such an encrypt apparatus located at the nearest position from the transmission source terminal of the communication data.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. An encryption communication system comprising:

a transmission source terminal for transmitting communication data from an own terminal via a communication network to a destination terminal;

a first encrypt apparatus including a first encrypt key table used to register thereinto encrypt key information for instructing a processing method of communication data in correspondence with a pair of the transmission source terminal and the destination terminal, a communication data buffer for temporarily storing the communication data, and a first automatic learn processing unit for storing said received communication data into said communication data buffer and for editing a key seek packet used to acquire encrypt key information to thereby transmit the edited key seek packet in such a case that encrypt key information for instructing the processing method of the communication data between said transmission source terminal and said destination terminal is not registered into said first encrypt key table;

a second encrypt apparatus including a second automatic learn processing unit for additionally setting encrypt key information of an own apparatus to said received key seek packet to thereby transmit the additionally set key seek packet; and said destination terminal editing a key seek response packet to be transmitted, said key seek response packet being used to notify the encrypt key information acquired based upon said received key seek packet; wherein:

said second encrypt apparatus includes a second encrypt key table used to register thereinto encrypt key information for designating a processing method of communication data in correspondence with a pair of a transmission source terminal and a destination terminal; and said second encrypt apparatus causes said second automatic learn processing unit to register into said second encrypt key table, such encrypt key information used to instruct any one of an encrypt/decrypt processing method, a transparent relay processing method, and a discard processing method as the processing method for the communication data between said transmission source terminal and said destination terminal based upon the encrypt key information of said received key seek response packet in such a case that the encrypt key information for instructing the processing method of the communication data between said transmission source terminal and said destination terminal is not registered into said second encrypt key table, and then transmits said key seek response packet; and said first encrypt apparatus causes said first automatic learn processing unit to register into said first encrypt key table, such encrypt key information used to instruct any one of the encrypt/decrypt processing method, the transparent relay processing method, and the discard processing method as the processing method for the communication data between said transmission source terminal and said destination terminal based upon the encrypt key information of said received key seek response packet, and also discards said key seek response packet, wherein:

in such a case that the encrypt key information for instructing the processing method of the communication data between said transmission source terminal and said destination terminal is not registered into said second encrypt key table, said second encrypt apparatus causes said second automatic learn processing unit to register into said second encrypt key table, such encrypt key information used to instruct the encrypt/decrypt processing method, as the processing method for the communication data between said transmission source terminal and said destination terminal when the key seek response packet received from said destination terminal contains the same encrypt key information as the encrypt key information of the own apparatus, and then transmits said key seek response packet; and in such a case that the key seek response packet received from said second encrypt apparatus contains the same encrypt key information as the encrypt key information of the own apparatus, said first encrypt apparatus causes said first automatic learn processing unit to register into said first encrypt key table, such encrypt key information used to instruct the encrypt/decrypt processing method as the processing method for the communication data between said transmission source terminal and said destination terminal, and then discards said key seek response packet.

2. An encryption communication system as claimed in claim 1 wherein:

each of said first and second encrypt apparatuses includes a local port and a public port;

each of said key seek packet and said key seek response packet contains local port encrypt key information and public port encrypt key information;

in such a case that said key seek packet is received from said local port, said first or second encrypt apparatus causes either said first automatic learn processing unit or said second automatic learn processing unit to set an encrypt key owned by the own apparatus into said local port encrypt key information of said key seek packet to said destination terminal; and in such a case that said key seek packet is received from said public port, said first or second encrypt apparatus causes either said first automatic learn processing unit or said second automatic learn processing unit to relay such a key seek packet in which the encrypt key owned by the own apparatus is set into said public port encrypt key information of said key seek packet to said destination terminal;

in the case that said key seek response packet is received from said public port, if the same encrypt key as the encrypt key owned by the own apparatus is contained in said public port encrypt key information, and in the case that said key seek response packet is received from said local port, if the same encrypt key as the encrypt key owned by the own apparatus is contained in said local port encrypt key information, then said first or second encrypt apparatus causes said first or second automatic learn processing unit to register into said first or second encrypt key table, such encrypt key information for instructing the encryption, or decryption with employment of said same encrypt key;

in the case that said key seek response packet is received from said public port, if the same encrypt key as the encrypt key owned by the own apparatus is not contained in said public port encrypt key information, and in the case that said key seek response packet is received from said local port, if the same encrypt key as the encrypt key owned by the own apparatus is not contained in said local port encrypt key information, then said first or second encrypt apparatus causes said first or second automatic learn processing unit to register into said first or second encrypt key table, such encrypt key information for instructing a transparent relay process operation when the same encrypt key is contained in said public port encrypt key information among encrypt keys contained in said local port encrypt key information; and further in the case that said key seek response packet is received from said public port, if the same encrypt key as the encrypt key owned by the own apparatus is not contained in said public port encrypt key information, and in the case that said key seek response packet is received from said local port, if the same encrypt key as the encrypt key owned by the own apparatus is not contained in said local port encrypt key information, then said first or second encrypt apparatus caused said first or second automatic learn processing unit to register into said first or second encrypt key table, such encrypt key information for instructing a discard process operation when the same encrypt key is contained in said public port encrypt key information among encrypt keys contained in said local port encrypt key information.

3. The encryption communication system as claimed in claim 2 wherein:

in such a case that said key seek response packet is received from said public port, said first or second encrypt apparatus causes said first or second automatic learn processing units to register into said first or second encrypt key table, such encrypt key information for instructing a transparent relay process operation when no encrypt key is contained in said public port encrypt key information.

4. An encryption communication system comprising:

a transmission source terminal for transmitting communication data from an own terminal via a communication network to a destination terminal;

a first encrypt apparatus including a first encrypt key table used to register thereinto encrypt key information for instructing a processing method of communication data in correspondence with a pair of the transmission source terminal and the destination terminal, a communication data buffer for temporarily storing the communication data, and a first automatic learn processing unit for storing said received communication data into said communication data buffer and for editing a key seek packet used to acquire encrypt key information to thereby transmit the edited key seek packet in such a case that encrypt key information for instructing the processing method of the communication data between said transmission source terminal and said destination terminal is not registered into said first encrypt key table;

a second encrypt apparatus including a second automatic learn processing unit for additionally setting encrypt key information of an own apparatus to said received key seek packet to thereby transmit the additionaliv set key seek packet; and said destination terminal editing a key seek response packet to be transmifted, said key seek response packet being used to notify the encrypt kev information acquired based upon said received key seek packet; wherein:

said second encrypt apparatus includes a second encrypt key table used to register thereinto encrypt key information for designating a processing method of communication data in correspondence with a pair of a transmission source terminal and a destination terminal; and said second encrypt apparatus causes said second automatic learn processing unit to register into said second encrypt key table, such encrypt keV information used to instruct any one of an encrypt/decrypt processing method, a transparent relay processing method, and a discard processing method as the processing method for the communication data between said transmission source terminal and said destination terminal based upon the encrypt key information of said received key seek response packet in such a case that the encrypt key information for instructing the processing method of the communication data between said transmission source terminal and said destination terminal is not registered into said second encrypt key table, and then transmits said key seek response packet; and said first encrypt apparatus causes said first automatic learn processing unit to register into said first encrypt key table, such encrypt key information used to instruct any one of the encrypt/decrypt processing method, the transparent relay processing method, and the discard processing method as the processing method for the communication data between said transmission source terminal and said destination terminal based upon the encrypt key information of said received key seek response packet. and also discards said key seek response packet, wherein:

said first and second encrypt key tables contain holding time used to hold the encrypt key information for instructing said processing methods of the communication data registered with respect to each of said pairs; and unless the encrypt key information registered in said first or second encrypt key table is accessed by said first or second automatic learn processing unit for a time period longer than said holding time, said first and second encrypt apparatuses delete this encrypt key information from said first or second encrypt key table.

5. The encryption communication system as claimed in claim 3 wherein:

each of said first and second encrypt apparatuses includes an external terminal communication mode setting unit for designating either the transparent relay process operation, or the discard process operation;

when said key seek response packet is received from said public port, if said public port encrypt key information does not contain the same encrypt key owned by the own apparatus and the own apparatus is not within an encrypt section, then said first and second encrypt apparatuses cause said first or second automatic learn processing unit to register into said first or second encrypt key table, such encrypt key information for instructing the transparent relay process operation, or the discard process operation based upon a content set in said external terminal communication mode setting unit; and when said key seek response packet is received from said local port, if said local port encrypt key information does not contain the same encrypt key owned by the own apparatus and the own apparatus is not within the encrypt section, then said first and second encrypt apparatuses cause said first or second automatic learn processing unit to register into said first or second encrypt key table, such encrypt key information for instructing the transparent relay process operation, or the discard process operation based upon a content set in said external terminal communication mode setting unit.

6. The encryption communication system as claimed in claim 2 wherein:

each of said first and second encrypt apparatuses includes an external terminal communication mode setting unit for designating the transparent relay process operation, the semi-transparent relay process operation, or the discard process operation;

when said key seek response packet is received from said public port, if said public port encrypt key information does not contain the same encrypt key owned by the own apparatus and the own apparatus is not within an encrypt section, then said first and second encrypt apparatuses cause said first or second automatic learn processing unit to register into said first or second encrypt key table, such encrypt key information for instructing the transparent relay process operation in such a case that a content set in said external terminal communication mode setting unit is equal to the semi-transparent relay process operation; and when said key seek response packet is received from said local port, if said local port encrypt key information does not contain the same encrypt key owned by the own apparatus and the own apparatus is not within an encrypt section, then said first and second encrypt apparatuses cause said first or second automatic learn processing unit to register into said first or second encrypt key table, such encrypt key information for instructing the discard process operation in such a case that a content set in said external terminal communication mode setting unit is equal to the semi-transparent relay process operation.

7. An encryption communication system comprising:

a transmission source terminal for transmitting communication data from an own terminal via a communication network to a destination terminal;

an encrypt apparatus including an encrypt key table used to register thereinto encrypt key information for instructing a processing method of communication data in correspondence with a pair of the transmission source terminal and the destination terminal, a communication data buffer for temporarily storing the communication data, and an automatic learn processing unit for storing said received communication data into said communication data buffer and for editing a key seek packet used to acquire encrypt key information to thereby transmit the edited key seek packet in such a case that encrypt key information for instructing the processing method of the communication data between said transmission source terminal and said destination terminal is not registered into said encrypt key table; and said destination terminal editing a key seek response packet to be transmitted, said key seek response packet being used to notify the encrypt key information acquired based upon said received key seek packet; wherein:

said encrypt apparatus causes said automatic learn processing unit to register into said encrypt key table, such encrypt key information used to instruct any one of a transparent relay processing method and a discard processing method as the processing method for the communication data between said transmission source terminal and said destination terminal based upon the encrypt key information of said received key seek response packet, and then discards said key seek response packet, wherein:

said encrypt apparatus includes a local port and a public port;

each of said key seek packet and said key seek response packet contains local port encrypt key information and public port encrypt key information;

in such a case that said communication data is received from said local port, said encrypt apparatus causes said first automatic learn processing unit to set an encrypt key owned by the own apparatus into said local port encrypt key information of said key seek packet; and in such a case that said communication data is received from said public port, said encrypt apparatus causes said automatic learn processing unit to relay such a key seek packet in which the encrypt key owned by the own apparatus is set into said public port encrypt key information of said key seek packet to said destination terminal; and in the case that said key seek response packet is received from said public port, if the encrypt key is not contained in said public port encrypt key information, then said encrypt apparatus causes said automatic learn processing unit to register into said encrypt key table, such encrypt key information for instructing a transparent relay process operation.

8. The encryption communication system as claimed in claim 7 wherein:

said encrypt apparatus includes an external terminal communication mode setting unit for designating either the transparent relay process operation, or the discard process operation;

when said key seek response packet is received from said public port, if said public port encrypt key information does not contain the same encrypt key owned by the own apparatus and the own apparatus is not within an encrypt section, then said encrypt apparatus causes said automatic learn processing unit to register into said encrypt key table, such encrypt key information for instructing the transparent relay process operation, or the discard process operation based upon a content set in said external terminal communication mode setting unit; and when said key seek response packet is received from said local port, if said local port encrypt key information does not contain the same encrypt key owned by the own apparatus and the own apparatus is not within the encrypt section, then said encrypt apparatus causes said automatic learn processing unit to register into said encrypt key table, such encrypt key information for instructing the transparent relay process operation, or the discard process operation based upon a content set in said external terminal communication mode setting unit.

9. The encryption communication system as claimed in claim 7 wherein:

said encrypt apparatus includes an external terminal communication mode setting unit for designating the transparent relay process operation, the semi-transparent relay process operation, or the discard process operation;

when said key seek response packet is received from said public port, if said public port encrypt key information does not contain the same encrypt key owned by the own apparatus and the own apparatus is not within an encrypt section, then said encrypt apparatus causes said automatic learn processing unit to register into said encrypt key table, such encrypt key information for instructing the transparent relay process operation in such a case that a content set in said external terminal communication mode setting unit is equal to the semi-transparent relay process operation; and when said key seek response packet is received from said local port, if said local port encrypt key information does not contain the same encrypt key owned by the own apparatus and the own apparatus is not within an encrypt section, then said encrypt apparatus causes said automatic learn processing unit to register into said encrypt key table, such encrypt key information for instructing the discard process operation in such a case that a content set in said external terminal communication mode setting unit is equal to the semi-transparent relay process operation.

\* \* \* \* \*